(12) United States Patent
Kato

(10) Patent No.: US 11,646,497 B2
(45) Date of Patent: *May 9, 2023

(54) WIRELESS COMMUNICATION DEVICE

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 172 days.

This patent is subject to a terminal disclaimer.

(21) Appl. No.: 17/177,508

(22) Filed: Feb. 17, 2021

(65) Prior Publication Data

US 2021/0194139 A1    Jun. 24, 2021

Related U.S. Application Data

(63) Continuation of application No. 16/185,322, filed on Nov. 9, 2018, now Pat. No. 10,957,984, which is a (Continued)

(30) Foreign Application Priority Data

| Apr. 20, 2017 | (JP) | ............................... JP2017-083957 |
| Oct. 20, 2017 | (JP) | ............................... JP2017-203663 |
| Jan. 24, 2018 | (JP) | ............................... JP2018-009946 |

(51) Int. Cl.
*H01Q 9/42* (2006.01)
*H01Q 1/22* (2006.01)
(Continued)

(52) U.S. Cl.
CPC ......... *H01Q 9/42* (2013.01); *G06K 19/07773* (2013.01); *H01Q 1/2225* (2013.01);
(Continued)

(58) Field of Classification Search
CPC .......... H01Q 9/42; H01Q 1/2225; H01Q 1/36; H01Q 1/48; H01Q 5/321; H01Q 7/00;
(Continued)

(56) References Cited

U.S. PATENT DOCUMENTS 5,363,114 A * 11/1994 Shoemaker .............. H01Q 1/38
343/906
8,424,769 B2    4/2013 Kato
(Continued)

FOREIGN PATENT DOCUMENTS

| CN | 102301528 A | 12/2011 |
| JP | 2006338563 A | 12/2006 |

(Continued)

OTHER PUBLICATIONS

International Search Report issued for PCT/JP2018/016363, dated Jun. 26, 2018.

(Continued)

*Primary Examiner* — David E Lotter
(74) *Attorney, Agent, or Firm* — ArentFox Schiff LLP

(57) ABSTRACT

A wireless communication device for transmitting/receiving a high-frequency signal having a predetermined communication frequency. The wireless communication device includes an antenna pattern having an inductance component, an RFIC element connected electrically to the antenna pattern and a capacitive coupling portion capacitively coupling specific confronting regions facing each other of the antenna pattern at multiple points on the antenna pattern, to make up an LC parallel resonant circuit.

20 Claims, 36 Drawing Sheets

Related U.S. Application Data continuation of application No. PCT/JP2018/016363, filed on Apr. 20, 2018.

(51) Int. Cl.
*H01Q 7/00* (2006.01)
*H01Q 1/36* (2006.01)
*H01Q 1/48* (2006.01)
*H01Q 9/06* (2006.01)
*H01Q 5/321* (2015.01)
*G06K 19/077* (2006.01)
*H01Q 23/00* (2006.01)
*H01Q 25/00* (2006.01)

(52) U.S. Cl.
CPC ............... *H01Q 1/36* (2013.01); *H01Q 1/48* (2013.01); *H01Q 5/321* (2015.01); *H01Q 7/00* (2013.01); *H01Q 9/065* (2013.01); *H01Q 23/00* (2013.01); *H01Q 25/005* (2013.01)

(58) Field of Classification Search
CPC ...... H01Q 9/065; H01Q 23/00; H01Q 25/005; G06K 19/07773
See application file for complete search history.

(56) References Cited

U.S. PATENT DOCUMENTS

| | | |
|---|---|---|
| 2007/0132593 A1 | 6/2007 | Yamazaki |
| 2008/0143480 A1 | 6/2008 | Egbert et al. |
| 2011/0279340 A1 | 11/2011 | Kato et al. |
| 2012/0006904 A1 | 1/2012 | Kato et al. |
| 2014/0320367 A1* | 10/2014 | Alkhateeb ............ H01Q 1/38 343/804 |
| 2015/0302290 A1* | 10/2015 | Saito ............ G06K 19/07752 235/488 |
| 2016/0037622 A1 | 2/2016 | Shinagawa et al. |

FOREIGN PATENT DOCUMENTS

| | | |
|---|---|---|
| JP | 2007089054 A | 4/2007 |
| JP | 2007164528 A | 6/2007 |

OTHER PUBLICATIONS

Written Opinion of the International Searching Authority issued for PCT/JP2018/016363, dated Jun. 26, 2018.
Written Opinion of the International Searching Authority issued for PCT/JP2018/016364, dated Jun. 26, 2018.

* cited by examiner

*Fig.*6

WIRELESS COMMUNICATION DEVICE

CROSS REFERENCE TO RELATED APPLICATIONS

This application is a continuation application of U.S. application Ser. No. 16/185,322, filed Nov. 9, 2018, which is a continuation application of International Application No. PCT/JP2018/016363, with an international filing date of Apr. 20, 2018, which claims priority to Japanese Patent Application No. 2017-083957 filed on Apr. 20, 2017, Japanese Patent Application No. 2017-203663 filed on Oct. 20, 2017, and Japanese Patent Application No. 2018-009946 filed on Jan. 24, 2018, the entire contents of each of the applications are incorporated herein by reference.

TECHNICAL FIELD

The present disclosure relates to a wireless communication device having an antenna and, more particularly, by induction field or radio wave, to a wireless communication device utilizing a radio frequency identification (RFID) technology performing short-range communication for non-contact reading and writing of semiconductor memory data.

BACKGROUND

It is conceived to automate merchandise accounting by attaching an "RFID tag" that is a wireless communication device to a commodity. According to this automated settlement system, when a basket containing goods with the "RFID tag" is placed on a checkout counter, information from the "RFID tag" is read to display a commodity price.

A wide variety of commodities are dealt in stores such as supermarkets and some of foodstuffs as commodities may be warmed up immediately after the purchase thereof so that the purchaser can eat and drink on the spot. Examples of commodities warmed up to eat and drink are foodstuffs such as a lunchbox and a cup noodle. These commodities are considered to be heated up using an electromagnetic wave heating apparatus, i.e. a so-called "microwave oven" at the stores.

In the "RFID tag", a radio-frequency integrated circuit (RFIC) chip and a metal material such as an antenna pattern that is a metal film are formed on a paper material or a resin material. Therefore, in the case where with such an "RFID tag" attached to a commodity, the commodity is heated up by the "microwave oven", for example, in the case where a lunchbox with the "RFID tag" is heated up, electromagnetic waves from the "microwave oven" are absorbed in not only the lunchbox but also the "RFID tag" so that the metal material portions are subjected to concentration of electric fields and discharge with eddy current flowing through the metal material, whereupon the metal itself may be heated up and sublimate or the paper material or the resin material forming the tag may ignite, resulting in a risk of ignition of the "RFID tag".

For the purpose of reducing the risk of ignition in the "RFID tag" as described above, a configuration of "flame-retardant tag" has been proposed (see Patent Document 1).

Patent Document 1: Japanese Laid-Open Patent Publication No. 2006-338563.

In the "flame-retardant tag" disclosed in Patent Document 1, a substrate mounted with an IC chip and the antenna pattern is made of a flame-retardant material. Hence, due to the flame-retardant material, the substrate itself is extinguished in several seconds or several tens of seconds after ignition, but the metal material portions formed on the substrate have a high possibility to continuously discharge, not providing a configuration capable of securely preventing the risk of ignition of the substrate and the potential to ignite the goods.

SUMMARY OF THE INVENTION

It is an object of the present disclosure to provide a wireless communication device configured to prevent the risk of ignition in an article having the wireless communication device attached thereto even though the article with the wireless communication device is irradiated with an electromagnetic wave in a higher frequency band than a predetermined communication frequency.

Thus, a wireless communication device of an exemplary aspect is disclosed the includes an antenna pattern having an inductance component; an RFIC element connected electrically to the antenna pattern; and a capacitive coupling portion capacitively coupling specific confronting regions facing each other of the antenna pattern at a plurality of points on the antenna pattern, to make up an LC parallel resonant circuit.

According to the present disclosure, a wireless communication device can be provided that is configured to preventing the risk of ignition in an article with the wireless communication device even though the article is irradiated with an electromagnetic wave in a higher frequency band than a predetermined communication.

DETAILED DESCRIPTION

Figure 1:
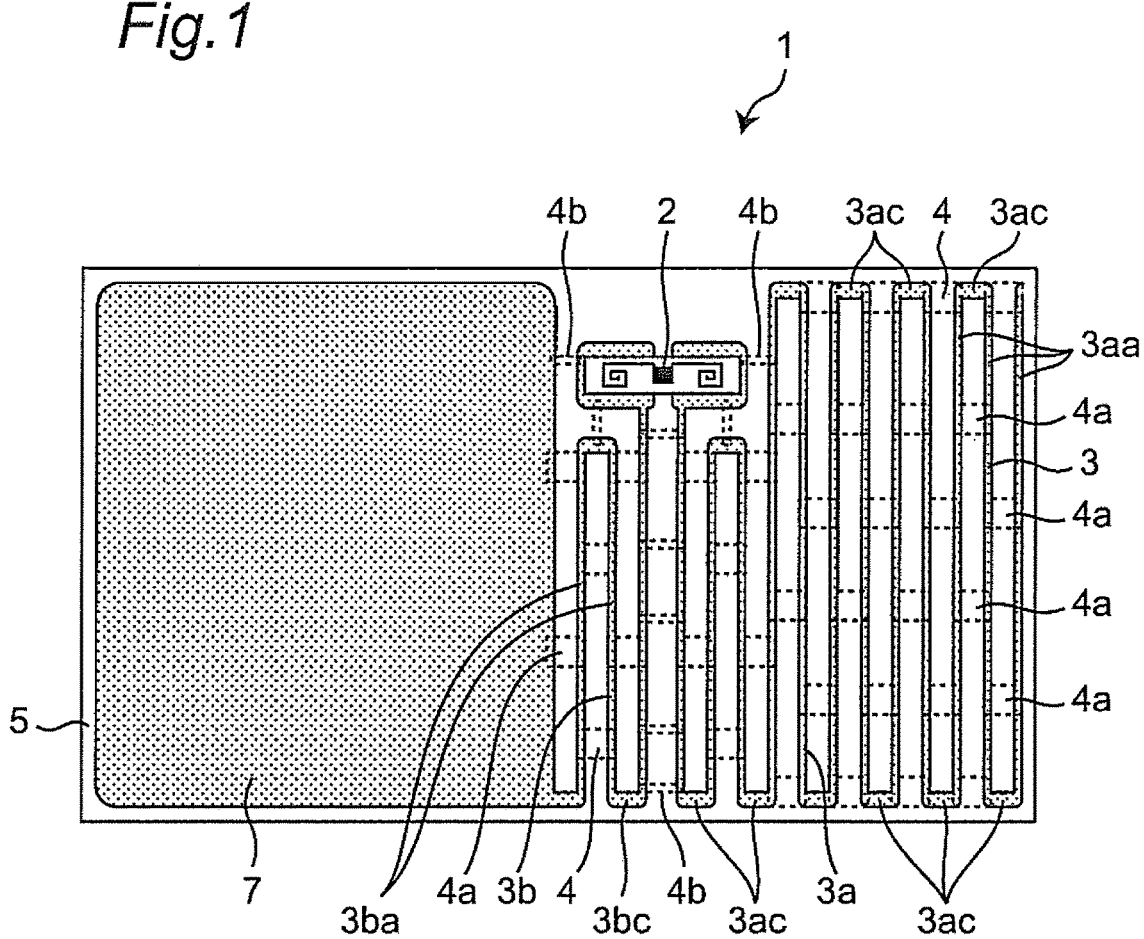
FIG. 1 is a plan view showing a wireless communication device (RFID tag) of a first embodiment.

As an initial mater, it is noted that configurations of various exemplary aspects of a wireless communication device according to the present disclosure will be described below.

Specifically, a wireless communication device of a first exemplary aspect is provided for transmitting/receiving a high-frequency signal having a predetermined communication frequency. In this aspect, the device includes an antenna pattern having an inductance component; an RFIC element connected electrically to the antenna pattern; and a capacitive coupling portion capacitively coupling specific confronting regions facing each other of the antenna pattern at a plurality of points on the antenna pattern, to make up an LC parallel resonant circuit.

Advantageously, the configured wireless communication device of the first exemplary aspect can suppress the occurrence of discharge in the wireless communication device even when a commodity with the wireless communication device is irradiated with an electromagnetic wave in the band of higher frequencies than the communication frequency, thereby making it possible to prevent the risk of ignition in the commodity with the wireless communication device.

In the exemplary aspect, the antenna pattern may be of either a rectilinear shape or a curvilinear shape. In a continuous antenna pattern having pairs of confronting regions, the antenna pattern on one hand may lie in a direction intersecting the direction in which the antenna pattern on the other extends. Accordingly, each pair of confronting regions lying on the continuous antenna pattern may include the case of parallel relationship to each other and the case of tilt of either one, and further include the case where curves confront each other.

In the wireless communication device of a second exemplary aspect, the antenna pattern may be in the form of a meander having a plurality of turn portions, and the capacitive coupling portion making up the LC parallel resonant circuit may be configured to capacitively couple adjacent turn portions of the antenna pattern.

In the wireless communication device of a third exemplary aspect, the antenna pattern may be disposed on one surface of an antenna substrate made of a dielectric, and the capacitive coupling portion may be disposed on the other surface of the antenna substrate.

In the wireless communication device of a fourth exemplary aspect, the antenna pattern and the capacitive coupling portion may be disposed on one surface of an antenna substrate, and the capacitive coupling portion may be a conductor plate disposed between the specific confronting portions facing each other.

In the wireless communication device of a fifth exemplary aspect, the antenna pattern and the capacitive coupling portion may be laminated via a dielectric on one surface of the antenna substrate.

In the wireless communication device of a sixth exemplary aspect, the line length of the LC parallel resonant circuit may be formed shorter than ½ wavelength of the predetermined communication frequency.

In the wireless communication device of a seventh exemplary aspect, the line length of the LC parallel resonant circuit may be formed shorter than ½ wavelength of a frequency used in electromagnetic wave heating.

In the wireless communication device of an eighth exemplary aspect, the LC parallel resonant circuit may use as a resonant frequency a frequency higher than the predetermined communication frequency.

In the wireless communication device of a ninth exemplary aspect, the LC parallel resonant circuit may use as the resonant frequency a frequency used in electromagnetic wave heating.

In the wireless communication device of a tenth exemplary aspect, the LC parallel resonant circuit may use as the resonant frequency a frequency of a band of 2.4 to 2.5 GHz that is a frequency band used in electromagnetic wave heating.

In the wireless communication device of an eleventh exemplary aspect, the antenna pattern may have a line width narrower than the line width of the capacitive coupling portion.

In the wireless communication device of a twelfth exemplary aspect, the antenna pattern may be in the form of a meander having a plurality of turn portions, and in an amplitude direction of the meander, the length of the antenna pattern may be longer than the length of the capacitive coupling portion.

The wireless communication device of a thirteenth exemplary aspect may comprise a resin antenna substrate having the antenna pattern formed thereon.

The wireless communication device of a fourteenth exemplary aspect may comprise a film stuck on the resin antenna substrate, the film having a heat resistance higher than that of the antenna substrate.

In the wireless communication device of a fifteenth exemplary aspect, the antenna pattern may be configured from a dipole antenna having two dipole elements, and the capacitive coupling portion making up the LC parallel resonant circuit may be disposed on each of the dipole elements.

In the wireless communication device of a sixteenth exemplary aspect, a part of a current path of the antenna pattern making up the LC parallel resonant circuit may be formed slimmer than the other portions on the current path.

In the wireless communication device of a seventeenth exemplary aspect, a part of a current path of the antenna pattern making up the LC parallel resonant circuit may be formed thinner than the other portions on the current path.

In the wireless communication device of an eighteenth exemplary aspect, the antenna pattern may be configured to use a communication frequency in a UHF band.

In the wireless communication device of a nineteenth exemplary aspect, the antenna pattern may be configured to use a communication frequency in an HF band.

In the wireless communication device of a twentieth exemplary aspect, the resonant frequency by the antenna pattern in the absence of the capacitive coupling portion may be higher than the communication frequency.

A wireless communication device of a twenty-first exemplary aspect is a wireless communication device for transmitting/receiving a high-frequency signal having a communication frequency. In this aspect, the wireless communication device includes an antenna pattern having confronting regions facing each other; an RFIC element connected electrically to the antenna pattern; and a looped conductor pattern arranged between each pair of the confronting regions of the antenna pattern, the circumference of the conductor pattern being smaller than ½ wavelength of the communication frequency.

In the wireless communication device of the twenty-first exemplary aspect as configured in this manner, when the commodity with the wireless communication device is irradiated with an electromagnetic wave in the band of higher frequencies than the communication frequency, the looped conductor pattern acts as an magnetic field antenna to generate a magnetic field. This allows the magnetic field antenna to be formed at a position proximal to the antenna pattern receiving the electromagnetic wave in the band of higher frequencies than the communication frequency. This degrades the antenna radiation efficiency in the frequency band higher than the communication frequency, enabling the energy received by the antenna pattern to be reduced. In consequence, the risk of ignition in the commodity with the wireless communication device can be prevented.

In the wireless communication device of a twenty-second exemplary aspect, the antenna pattern may be in the form of a meander, and each pair of the confronting regions of the antenna pattern may have rectilinear portions parallel to each other.

In the wireless communication device of a twenty-third exemplary aspect, the conductor pattern may be disposed between each pair of adjacent turn portions of the antenna pattern.

In the wireless communication device of a twenty-fourth exemplary aspect, the conductor pattern may have a longitudinal direction and a lateral direction, and the length of the conductor pattern in the longitudinal direction may be formed into ¼ wavelength or less of the frequency used in electromagnetic wave heating.

In the wireless communication device of a twenty-fifth exemplary aspect, a plurality of the conductor patterns may be arranged spaced apart from each other between respective pairs of the confronting regions of the antenna pattern.

In the wireless communication device of a twenty-sixth exemplary aspect, when the antenna pattern is irradiated with an electromagnetic wave of a higher frequency than the communication frequency, a potential difference may increase between respective pairs of the confronting regions of the antenna pattern between the plurality of conductor patterns.

In the wireless communication device of a twenty-seventh exemplary aspect, the conductor patterns having different circumferences may be arranged along rectilinear portions of the antenna pattern.

In the wireless communication device of a twenty-eighth exemplary aspect, a first resonant frequency by the conductor pattern and a part of the antenna pattern including the confronting regions sandwiching the conductor pattern therebetween differs from a second resonant frequency by the other conductor pattern and another part of the antenna pattern including confronting regions sandwiching therebetween the other conductor arranged next to the conductor pattern.

In the wireless communication device of a twenty-ninth exemplary aspect, the first resonant frequency may be a frequency used in electromagnetic wave heating.

In the wireless communication device of a thirtieth exemplary aspect, the first resonant frequency may be a frequency of a zone of 2.4 GHz ore more and 2.5 GHz or less that is a frequency band used in electromagnetic wave heating.

In the wireless communication device of a thirty-first exemplary aspect, a difference between a circumference of the conductor pattern and ½ wavelength of the first resonant frequency higher than the communication frequency may be smaller than a difference between the circumference of the conductor pattern and ½ wavelength of the communication frequency.

In convenience stores and supermarkets selling goods to which a wireless communication device is attached, a wide variety of goods such as foods and daily commodities are dealt in. Of recent years, for the convenience stores, various experiments have been carried out toward the practical use of "unmanned convenience store" which automates accounting for items purchased and bagging.

In order to automate accounting of goods at "unmanned convenience store", it is envisaged that "RFID tag" as a wireless communication device is attached to all the goods. The system is such that when a shopping basket holding goods with "RFID tag" is placed on a checkout stand at "unmanned convenience store", information from "RFID tag" is read for display of a purchase price. The purchaser puts cash or inserts a credit card for purchase price at a predetermined position to finish the payment, and thereafter receives the goods automatically packed in a shopping bag, whereby purchase of goods at "unmanned convenience store" can be completed.

Exemplary embodiments as specific exemplifications of a wireless communication device according to the present disclosure will now be described with reference to the accompanying drawings. Although a lunch box is described as an exemplification of an item to which "RFID tag" i.e. a wireless communication device of the following embodiments is attached, the item having the wireless communication device according to the exemplary aspect attached thereto can be all of items handled in shops such as so-called "convenience stores". The exemplary embodiments relate to a goods sales system in which the wireless communication device having the same configuration is attached to all goods.

Although a microwave heating apparatus described in the embodiments below is described as a so-called "microwave oven" performing dielectric heating, the microwave heating apparatus of the present disclosure is a heating apparatus having a dielectric heating function.

First Embodiment

FIG. 1 is a plan view showing a RFID tag 1 that is a wireless communication device of a first exemplary embodiment. The RFID tag 1 is configured for wireless communication (transmission/reception) using a high-frequency signal with a UHF-band communication frequency (carrier frequency) and can provide wireless communication in a wide frequency band. As used herein, the UHF band means a frequency band of 860 MHz to 960 MHz. The UHF-band communication frequency is an example of "first frequency for communication" in the present disclosure. As shown, the RFID tag 1 includes an RFIC package 2 described later, an antenna pattern 3, a line-to-line capacitance pattern 4 as a capacitive coupling portion, and an antenna substrate 5 of dielectric. In the RFID tag 1 of the first embodiment, the antenna substrate 5 is made of a flame-retardant film having a flexibility and is of a substantially rectangular shape. If the antenna substrate 5 is not made of a flame-retardant film material, the film thickness of the antenna substrate 5 may be 38 μm or less. As a result, the antenna substrate 5 melts and deforms before combustion and therefore cannot keep its base shape. The antenna pattern 3 has a line width of 100 μm to 300 μm and, if 150 μm or less, it can easily be disconnected simultaneously with deformation of the antenna substrate 5. The antenna substrate 5 has on its front surface (i.e., the first main surface) the antenna pattern 3 created by a film of a conductive material, such as aluminum foil or copper foil. The antenna pattern 3 formed on the front surface (first main surface) of the antenna substrate 5 is mounted with the RFIC package 2 such that the RFIC package 2 and the antenna pattern 3 are electrically connected to each other. The electrical connection means that the two are connected to or coupled with each other such that a high-frequency signal is transmitted to allow operation, and is not limited to DC connection.

The flame-retardant film material used as the antenna substrate 5 in the first embodiment can be a film of a resin material such as polyethylene telephthalate (PET) resin or polyphenylene sulfide (PPS) resin to which a halogen-based flame-retardant material is added or a flame-retardant coating material is applied. The material of the antenna substrate 5 may be a high-performance resin material such as polyethylene naphthalate (PEN) having a heat resistance. Furthermore, heat-resistant material film may be applied to the dielectric antenna substrate 5 so as to further enhance the heat resistance as the antenna substrate 5 between the antenna pattern 3 and the line-to-line capacitance pattern 4.

On the other hand, the antenna substrate 5 has on its back surface (second main surface) the line-to-line capacitance pattern 4 as the capacitive coupling portion made of a dielectric material such as aluminum foil or copper foil. The line-to-line capacitance pattern 4 formed on the back surface (i.e., the second main surface) of the antenna substrate 5 capacitively couples specific regions of the antenna pattern 3 with each other at a plurality of points of the antenna pattern 3 having an inductance component. As a result, a plurality of LC parallel resonant circuits S are formed, each being configured from an inductance component formed in a part of the antenna pattern 3 and a capacitance component formed between the line-to-line capacitance pattern 4 and a part of the antenna pattern 3, resulting in a substantially series or parallel connection configuration. FIG. 1 shows an example of the antenna substrate 5 made of a transparent material, in which the antenna pattern 3 and the line-to-line capacitance pattern 4 (i.e., broken line indications in FIG. 1) formed on the front and back of the antenna substrate 5 are depicted. The antenna substrate 5 may not be made of the transparent material and may be made of a material capable of a capacitive coupling having at a desired capacitance between the antenna pattern 3 and the line-to-line capacitance pattern 4.

Figure 2A:
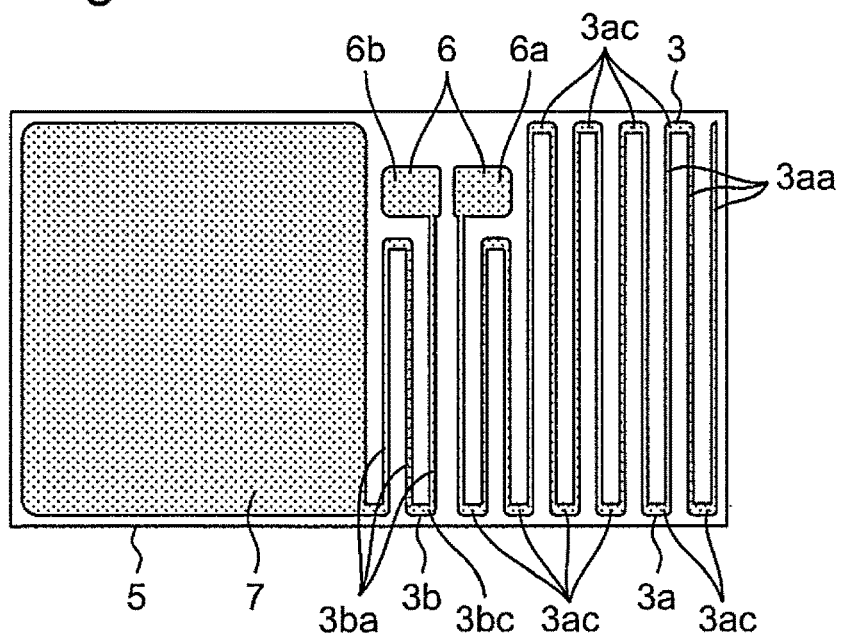
FIG. 2A is a diagram showing a front surface (first main surface) of an antenna substrate in the wireless communication device of the first embodiment.
Figure 2B:
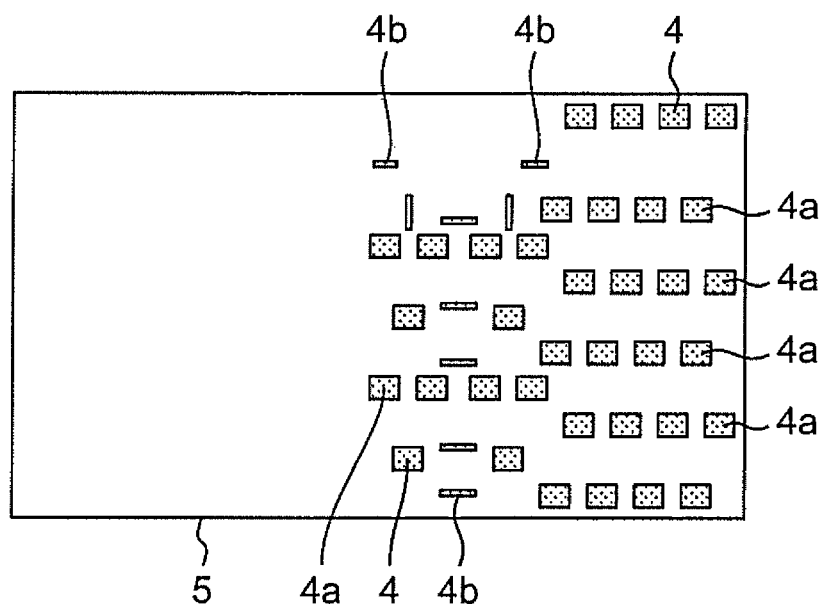
FIG. 2B is a diagram showing a back surface (second main surface) of the antenna substrate in the wireless communication device of the first embodiment.

FIG. 2 shows the front surface (first main surface) and the back surface (second surface) of the antenna substrate 5. FIG. 2A shows the antenna pattern 3 formed on the front surface (first main surface) of the antenna substrate 5, while FIG. 2B shows the line-to-line capacitance pattern 4 as the capacitive coupling portion formed on the back surface (second main surface) of the antenna substrate 5.

As shown in FIG. 2A, the antenna pattern 3 in the first embodiment comprises two land patterns 6 (i.e., references 6a and 6b) in contact with the RFIC package 2 for electrical connection. The antenna pattern 3 has a first antenna element 3a and a second antenna element 3b to make up a dipole field antenna.

As shown in FIG. 2A, the first antenna element 3a has a substantially linear shape pattern and is led from the first land pattern 6a to extend in a meandering manner. The extension of the first land pattern 6a is directed toward longitudinal one end of the antenna substrate 5, with the tip in the extending direction of the first land pattern 6a being disposed at the longitudinal end of the antenna substrate 5. The first antenna element 3a has a λ/4 length of the communication frequency. If the communication frequency is 920 MHz for example, the length from the first land pattern 6a in the first antenna element 3a up to the end of the antenna substrate 5 is approx. 50 mm.

The second antenna element 3b of the antenna pattern 3 is led from the second land pattern 6b to extend toward the longitudinal other end of the antenna substrate 5 in a meandering manner, with the tip in the extending direction of the second antenna element 3b having a widened portion 7. This widened portion 7 is a portion attached to an article and, if attached to an article whose exterior surface has an exposed metal material, e.g. a can product, allows the article exterior surface to function as a part of the antenna.

As shown in FIG. 2B, the line-to-line capacitance pattern 4 as the capacitive coupling portion formed on the back surface (second main surface) of the antenna substrate 5 has a plurality of line-to-line capacitance electrodes 4a and 4b different in shape in the configuration of the first embodiment. The line-to-line capacitance pattern 4 has a first line-to-line capacitance electrode 4a of a widened shape and a second line-to-line capacitance electrode 4b of a narrowed shape. The widely-shaped first line-to-line capacitance electrode 4a capacitively couples specific confronting regions 3aa with each other in the meandering first antenna element 3a, and similarity capacitively couples specific confronting regions 3ba with each other in the meandering second antenna element 3b. The first line-to-line capacitance electrode 4a is disposed so as to capacitively couple at least adjacent turn portions in the first antenna element 3a and the second antenna element 3b.

On the other hand, the narrowly-shaped second line-to-line capacitance electrode 4b is disposed so as to capacitively couple a specific region in the first antenna element 3a and a specific region in the second antenna element 3b. The narrowly-shaped second line-to-line capacitance electrode 4b is disposed so as to capacitively couple the first land pattern 6a with a specific region in the first antenna element 3a and is disposed so as to capacitively couple the second land pattern 6b with a specific region (including the widened portion 7) in the second antenna element 3b.

The thus configured antenna pattern 3 on the front surface (first main surface) of the antenna substrate 5 and line-to-line capacitance pattern 4 on the back surface (second main surface) of the antenna substrate 5 have a shape preventing concentration of the electric field and have no sharp edges particularly at bent portions and edge portions of the outer periphery, the entirety being formed from gentle curved surfaces.

Figure 3A:
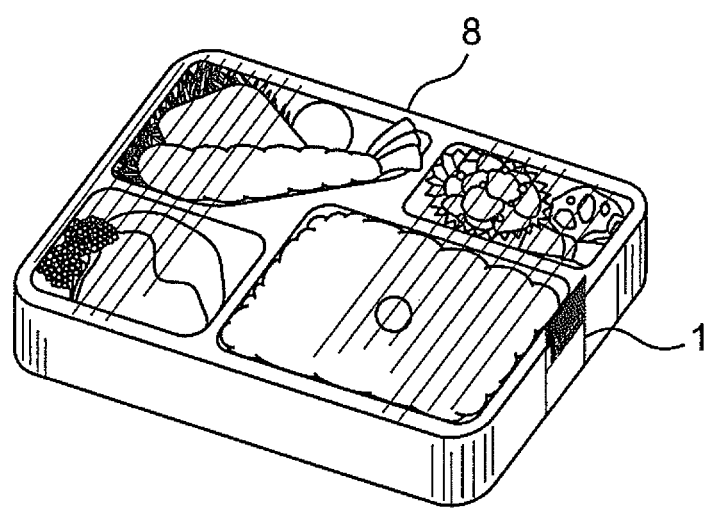
FIG. 3A is a diagram showing an exemplification of the wireless communication device of the first embodiment attached to an article.
Figure 3B:
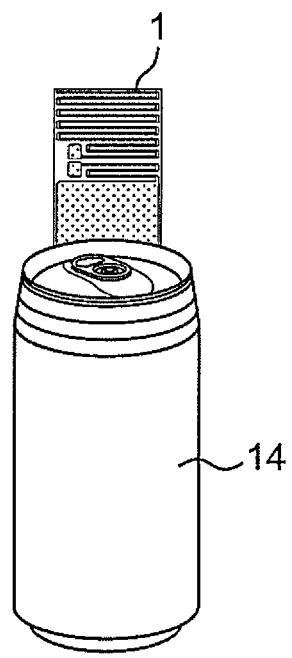
FIG. 3B is a diagram showing an exemplification of the wireless communication device of the first embodiment attached to an article.

The RFID tag 1 in the first exemplary embodiment can be applied to all items dealt in "convenience stores", for example, and the RFID tag 1 of the same configuration is used for all of the items. For this reason, a lunch box heated by "microwave oven" as microwave heating apparatus will be described as an exemplification of goods in an exemplary of the first embodiment. Such a lunch box also uses the RFID tag 1 having the widened portion 7 that allows a metal material on the article exterior surface to function as a part of the antenna. FIG. 3A is a perspective view showing the case where the RFID tag 1 is attached to a lunch box 8 as an exemplification of an article configured from an insulator material. FIG. 3B shows an example where the RFID tag 1 is attached to a metal can 14 as an example of an article whose exterior surface is made of a metal material.

Figure 4:
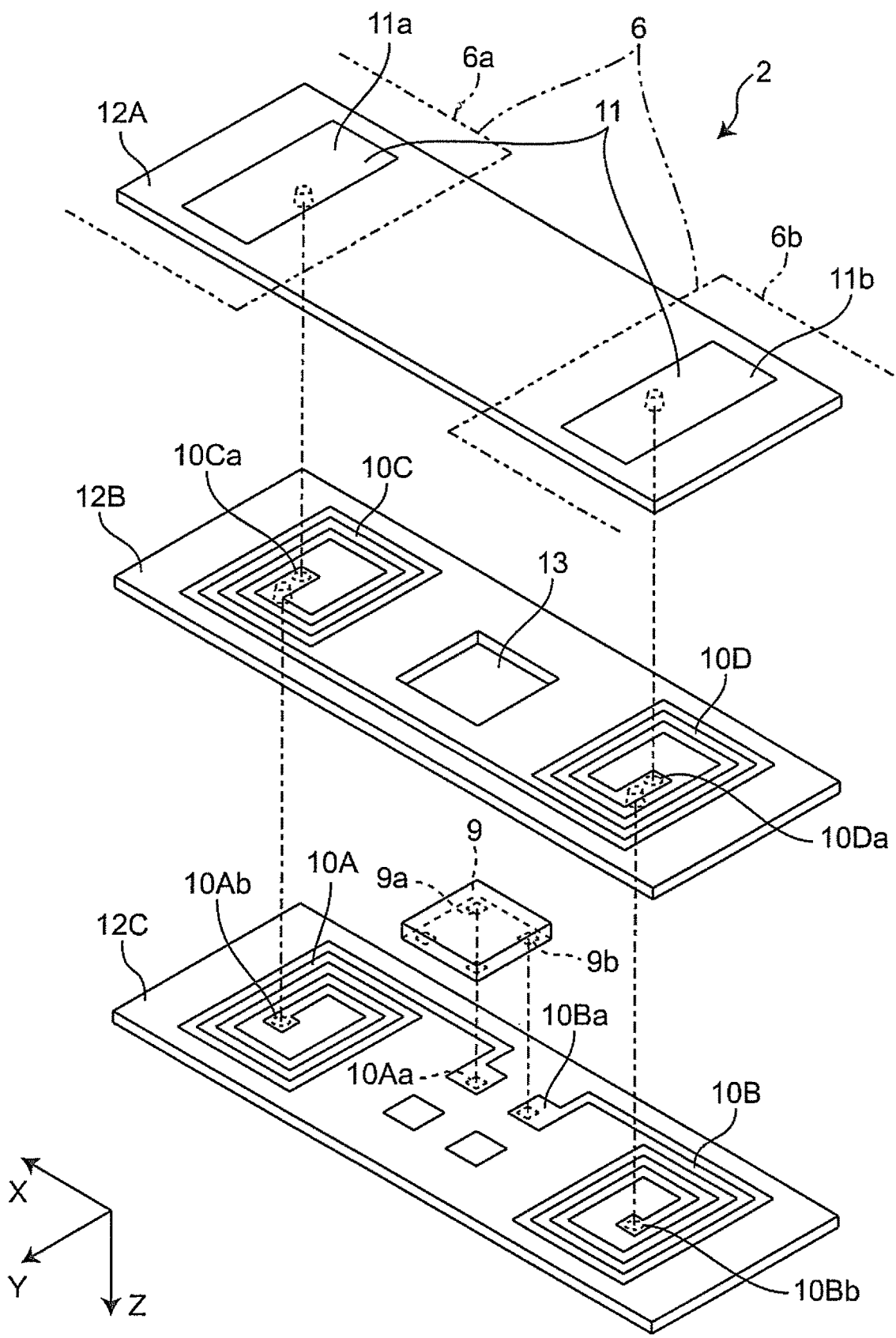
FIG. 4 is an exploded perspective view showing an RFIC package in the wireless communication device of the first embodiment.

FIG. 4 is an exploded perspective view showing a configuration of the RFIC package 2 mounted on the land patterns 6 (6a and 6b) of the antenna pattern 3. As shown in FIG. 4, the RFIC package 2 in the first embodiment is configured from a multi-layered substrate comprised of three layers. Specifically, the multi-layered substrate of the RFIC package 2 is made of a resin material such as polyimide and liquid crystal polymer and is configured from three laminated insulating sheets 12A, 12B, and 12C having a flexibility. The insulating sheets 12A, 12B, and 12C have a substantially square shape in plan view and, in the first embodiment, have a substantially rectangular shape. The RFIC package 2 shown in FIG. 4 shows the state where the RFIC package 2 shown in FIG. 1 is turned over with three layers decomposed.

As shown in FIG. 4, the RFIC package 2 includes, on its three-layered substrate (insulating sheets 12A, 12B, and 12C) at desired positions, an RFIC chip 9, a plurality of inductance elements 10A, 10B, 10C, and 10D, and external connection terminals 11 (11a and 11b).

The external connection terminals 11 (11a and 11b) are formed on the first insulating sheet 12A that is the lowermost layer (substrate confronting the antenna pattern 3) and are formed at positions confronting the land patterns 6 (6a and 6b) of the antenna pattern 3. The four inductance elements 10A, 10B, 10C, and 10D are formed separately two by two on the second insulating sheet 12B and the third insulating sheet 12C, respectively. In other words, the first inductance element 10A and the second inductance element 10B are formed on the third insulating sheet as the uppermost layer (undermost layer in FIG. 4), while the third inductance element 10C and the fourth inductance element 10D are formed on the second insulating sheet 12B as the intermediate layer.

In the RFIC package 2 of the first embodiment, the external connection terminals 11 (11a and 11b) and the four inductance elements 10A, 10B, 10C, and 10D are configured from a conductor pattern made of a conductive material such as aluminum foil or copper foil.

As shown in FIG. 4, the RFIC chip 9 is mounted on the third insulating sheet 12C as the uppermost layer at its center portion in the longitudinal direction (X-direction in FIG. 4). The RFIC chip 9 has a structure in which various types of elements are incorporated in a semiconductor substrate made of a semiconductor such as silicon. The first inductance element 10A formed spirally on the third insulating sheet 12C on its one side (left in X-axis direction in FIG. 4) is connected via a land 10Aa to an input/output terminal 9a on one hand of the RFIC chip 9. The second inductance element 10B formed spirally on the third insulating sheet 12C on the other side (right in X-axis direction in FIG. 4) is connected via a land 10Ba to an input/output terminal 9b on the other of the RFIC chip 9.

The third inductance element 10C in spiral shape is formed on the second insulating sheet 12B as the intermediate layer on its one side (left in X-axis direction in FIG. 4), while the fourth inductance element 10D in spiral shape is formed on the second insulating sheet 12B on the other side (right in X-axis direction in FIG. 4). An outer peripheral end of the spirally-shaped third inductance element 10C connects directly to an outer peripheral end of the spirally-shaped fourth inductance element 10D. On the other hand, an inner peripheral end (land 10Ca) of the third inductance element 10C connects, via an interlayer connection conductor such as a through-hole conductor passing through the second insulating sheet 12B, to an inner peripheral end (land 10Ab) of the spirally-shaped first inductance element 10A on the third insulating sheet 12C. The inner peripheral end (land 10Ca) of the third inductance element 10C connects, via an interlayer connection conductor such as a through-hole conductor extending through the first insulating sheet 12A as the lowermost layer, to the first external connection terminal 11a on the first instructing sheet 12A.

An inner peripheral end (land 10Da) of the fourth inductance element 10D connects, via an interlayer connection conductor such as a through-hole conductor extending through the second insulating sheet 12B, to an inner peripheral end (land 10Bb) of the spirally-shaped second inductance element 10B on the third insulating sheet 12C. The inner peripheral end (land 10Da) of the fourth inductance element 10D connects, via an interlayer connection conductor such as a through-hole conductor extending through the first insulating sheet 12A, to the second external connection terminal 11b on the first insulating sheet 12A.

The first external connection terminal 11a on the first insulating sheet 12A is disposed so as to be connected to the first land pattern 6a of the first antenna element 3a formed on the antenna substrate 5. Moreover, the second external connection terminal 11b on the first insulating sheet 12A is disposed so as to be connected to the second land pattern 6b of the ax antenna element 3b formed on the antenna substrate 5.

As further shown, a through-hole 13 is formed in the second insulating sheet 12B as the intermediate layer, for receiving the RFIC chip 9 mounted on the third insulating sheet 12C. The RFIC chip 9 is formed from a semiconductor material and is disposed between the first inductance element 10A and the second inductance element 10B and between the third inductance element 10C and the fourth inductance element 10D. This allows the RFIC chip 9 to function as a shield, suppressing the magnetic field coupling and the capacitive coupling between the first inductance element 10A and the second inductance element 10B, while simultaneously suppressing the magnetic field coupling and the capacitive coupling between the third inductance element 10C and the fourth inductance element 10D. As a result, the RFIC package 2 in the first embodiment restrains the pass band of the communication signal from narrowing, rendering the pass band wide.

Figure 5:
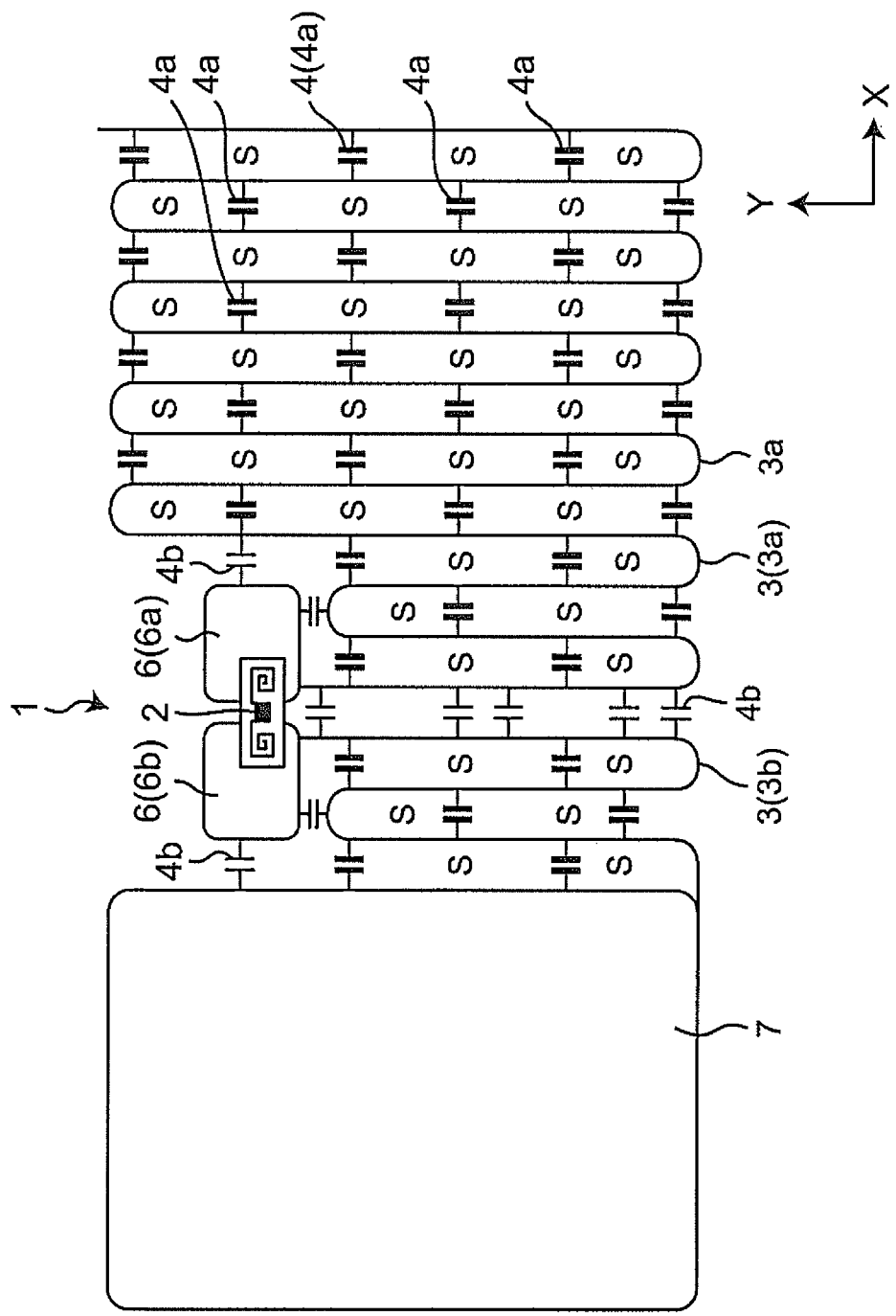
FIG. 5 is a diagram schematically showing, in the form of circuit diagram symbols, a capacitive coupling portion for an antenna pattern in the wireless communication device of the first embodiment.

FIG. 5 is a diagram schematically showing, by circuit symbols, the line-to-line capacitance pattern 4 that is the capacitive coupling portion capacitively coupled with the antenna pattern 3 to which the RFIC package 2 is connected in the RFID tag 1 of the first embodiment. As shown in FIG. 5, the antenna pattern 3 is configured such that the meandering first antenna element 3a and second antenna element 3b extend with a plurality of turn portions from the land pattern 6 mounted with the RFIC package 2. More specifically, the meandering first antenna element 3a extends from the first land pattern 6a finally toward an end on one hand in the longitudinal direction (+X direction) in the antenna substrate 5. The meandering second antenna element 3b extends from the second land pattern 6b finally toward an end on the other in the longitudinal direction (−X direction) in the antenna substrate 5. The tip region in the extension direction of the second antenna element 3b is a widened portion 7 with a wide width that works as a portion attached to goods. The widened portion 7 is a region attached to a metal portion of a can product, etc. for example, to thereby further enhance the characteristics of the antenna.

As shown in FIG. 5, the line-to-line capacitance pattern 4 capacitively coupling specific regions with each other in the first antenna element 3a and the second antenna element 3b comprises the first line-to-line capacitance electrode 4a having a large capacitance and the second line-to-line capacitance electrode 4b having a smaller capacitance than the first line-to-line capacitance electrode 4a. The first line-to-line capacitance electrode 4a capacitively couples specific regions with each other in the first antenna element 3a, to obtain the LC parallel resonant circuits S in the form of a loop circuit as a minimum path configured from the first line-to-line capacitance electrode 4a and the first antenna element 3a. Thus, the plurality of LC parallel resonant circuits are formed in series or in parallel with the path of the first antenna element 3a. Similarly, the first line-to-line capacitance electrode 4a capacitively couples specific regions with each other in the second antenna element 3b, to form the plurality of LC parallel resonant circuits S in series or in parallel with the path of the second antenna element 3b.

Since the RFID tag 1 of the first exemplary embodiment is intended for a lunch box, etc. in the convenience store as target goods, the case is assumed where the RFID tag 1 is dielectrically heated by a so-called "microwave oven" that is an electromagnetic wave heating device for cooking. Electromagnetic waves (microwave use frequencies) used in the "microwave oven" are in a frequency band of 2.4 to 2.5 GHz that is the band of higher frequencies than the communication frequency, and therefore a "band elimination filter" is disposed as a circuit for remarkably attenuating this frequency band level in the RFID tag 1 of the first embodiment. The "band elimination filter" is a filter circuit attenuating the band of higher frequencies than the communication frequency and attenuates a higher frequency band than 1.1 GHz for example. In particular, it remarkably attenuates frequencies (2.4 to 2.5 GHz) of electromagnetic waves for heating used in the "microwave oven".

Figure 6:
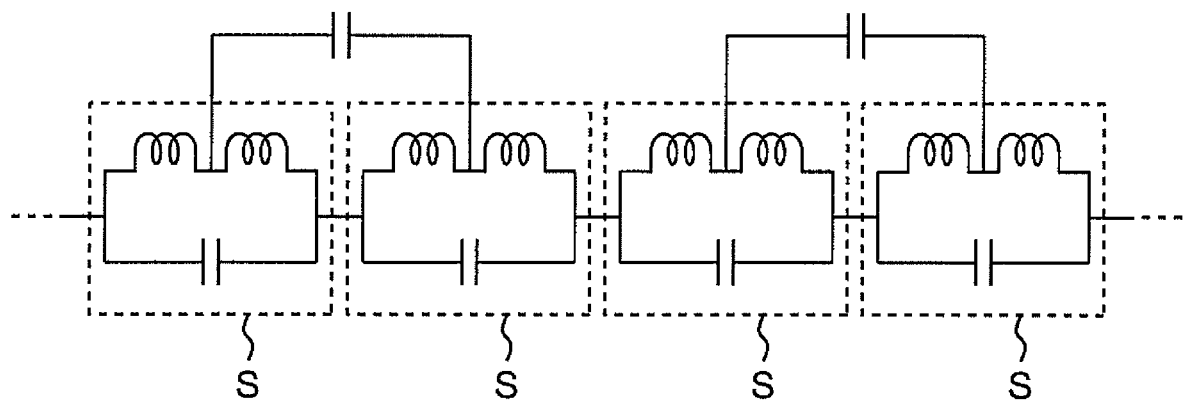
FIG. 6 is a pseudo-equivalent circuit showing a partial configuration of a plurality of LC parallel resonant circuits in the wireless communication device of the first embodiment.
Figure 7:
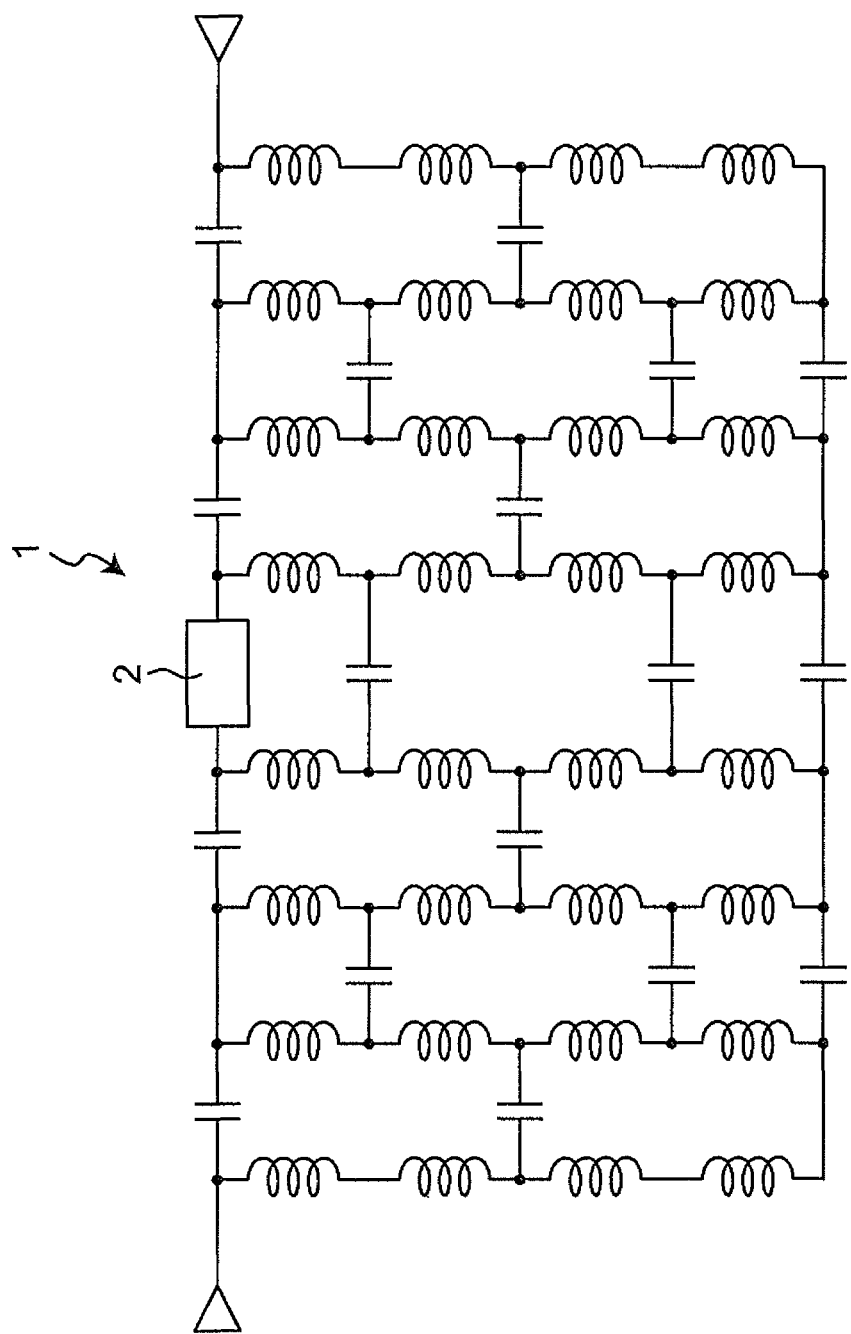
FIG. 7 is an equivalent circuit diagram showing an overall configuration example of the plurality of LC parallel resonant circuits in the wireless communication device of the first embodiment.

As shown in FIG. 5, in the RFID tag 1 of the first embodiment, multi-stage (a plurality of) LC parallel resonant circuits S are formed along paths of the first antenna element 3a and the second antenna element 3b, these LC parallel resonant circuits S making up the "band elimination filter". Each LC parallel resonant circuit S in the plurality of LC parallel resonant circuits S is set so as to resonate with frequencies in the frequency band of 2.4 to 2.5 GHz. The line length of each LC parallel resonant circuit S is set to be shorter than ½ frequency of the frequency used as the predetermined communication frequency. As shown in FIG. 5, the LC parallel resonant circuits S are arranged so as to configure a series circuit and a parallel circuit, with each LC parallel resonant circuit S being magnetically coupled or electric field coupled with the other, to thereby greatly the electromagnetic wave level in a wide band of 2.4 to 2.5 GHz band. FIG. 6 is a diagram showing, in the form of a pseudo-equivalent circuit, a partial configuration example of the plurality of LC parallel resonant circuits S in the RFID tag 1 of the first embodiment. FIG. 7 is a diagram showing, in the form of an equivalent circuit, an overall configuration example of the plurality of LC parallel resonant circuits S in the wireless communication device of the first embodiment.

Figure 8:
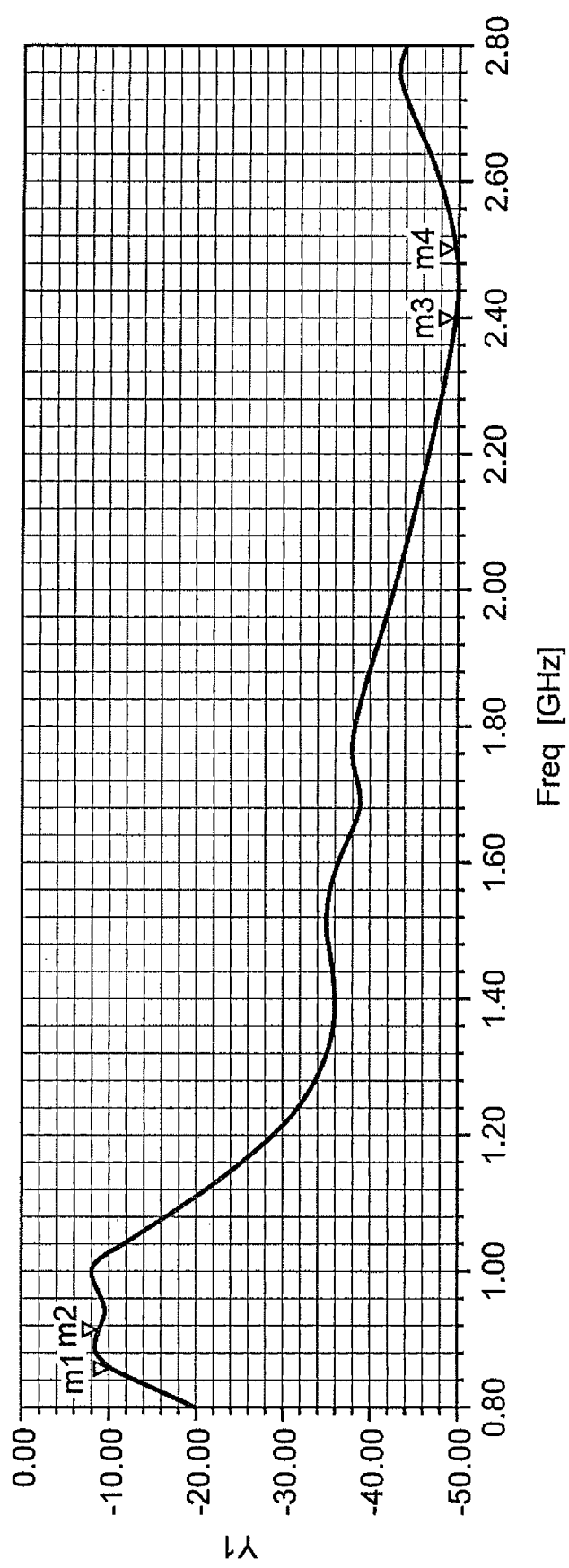
FIG. 8 is a frequency characteristic diagram showing the result of simulation experiments in the wireless communication device of the first embodiment.
Figure 9:
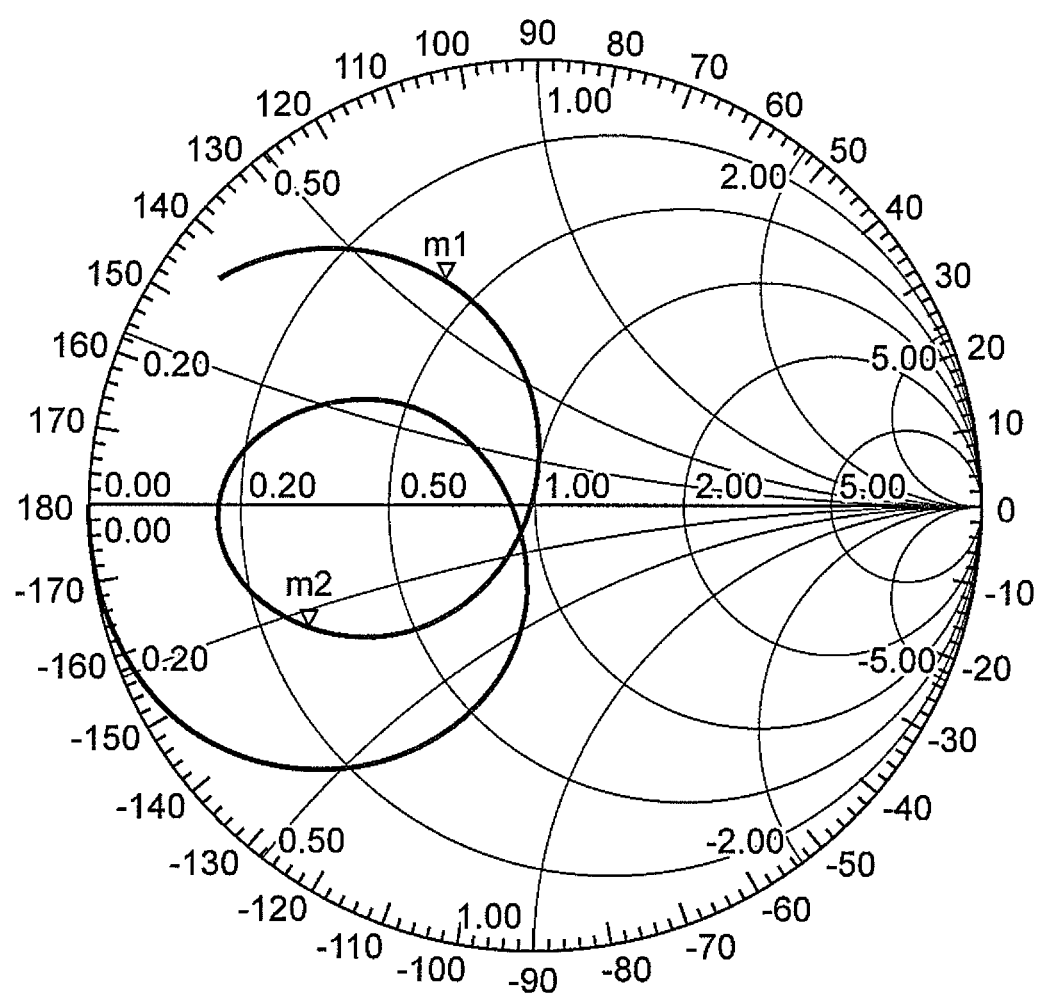
FIG. 9 is a Smith chart of the simulation experiments on the wireless communication device of the first embodiment.

FIG. 8 is a frequency characteristic diagram showing the result of simulation experiments performed for the RFID tag 1 of the first embodiment. FIG. 9 is an exemplary Smith chart in the simulation experiments on the RFID tag 1 of the first embodiment. In the frequency characteristic diagram shown in FIG. 8, the frequency of 0.86 GHz indicated by ▼m1 had a power feed level of −10.2 dB, while the frequency of 0.92 GHz indicated by ▼m2 had a power feed level of −9.1 B. For the frequency of 2.4 GHz indicated by ▼m3 that is the frequency of electromagnetic waves for heating used in the "microwave oven", the power feed level is −49.6 dB, while for the frequency of 2.5 GHz indicated by ▼m4, it is −49.4 dB, from which it can be understood that the feed level is attenuated to a great extent. It can also be understood that the band of higher frequencies than the communication frequency is attenuated without being limited to 2.4 to 2.5 GHz. For example, regarding the frequency of approx. 1.2 GHz or more, the feed level is attenuated to −30 dB or below.

As shown in the Smith chart of FIG. 9, at the frequency of 0.86 GHz indicated by ▼m1 and the frequency of 0.92 GHz indicated by ▼m2, it is in the receivable state for impedance characteristics. As to the RFID tag 1 of the first embodiment, it is obtained from the simulation experiments that at the frequency of 2.4 GHz indicated by ▼m3 and the frequency of 2.5 GHz indicated by ▼m4, it is in the substantially short-circuited state (a marker lies at a point 0Ω at the left end in the Smith chart).

As described above, it can be understood in the RFID tag 1 of the first exemplary embodiment that a high-frequency signal (radio signal) having UHF-band communication frequencies (900 MHz band, e.g. 920 MHz) is in a transmittable/receivable frequency band whereas the heating frequencies (2.4 to 2.5 GHz) used in the "microwave oven" as the electromagnetic wave heating apparatus is in a frequency band where the power feed level is attenuated to a great extent (approx. −50 dB).

Although in the RFID tag 1 of the first embodiment, the feed level is attenuated to a great extent (approx. −50 dB) at the heating frequencies (2.4 to 2.5 GHz) used in the "microwave oven", the feed level is not completely zero. Specifically, when the RFID tag 1 of the first embodiment is dielectrically heated together with an article by the "microwave oven", an extremely small current flows through the antenna pattern 3 (3a and 3b).

Figure 10A:
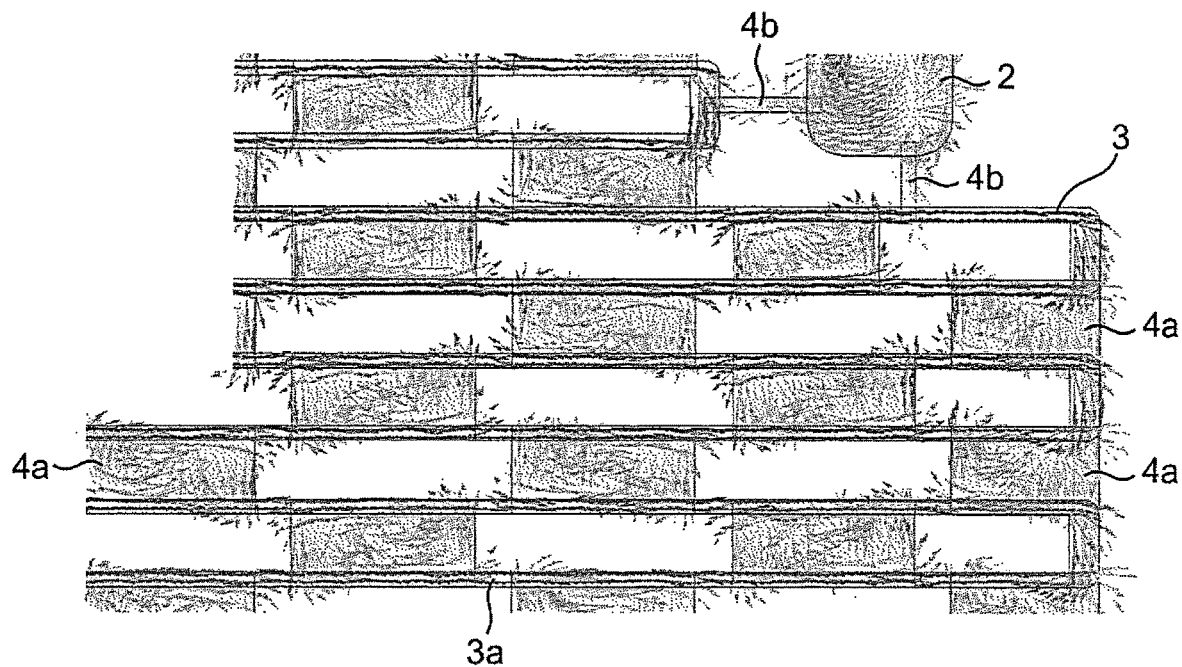
FIG. 10A is a diagram showing how current flows when receiving a signal of a UHF-band communication frequency (920 MHz) in the wireless communication device of the first embodiment.
Figure 10B:
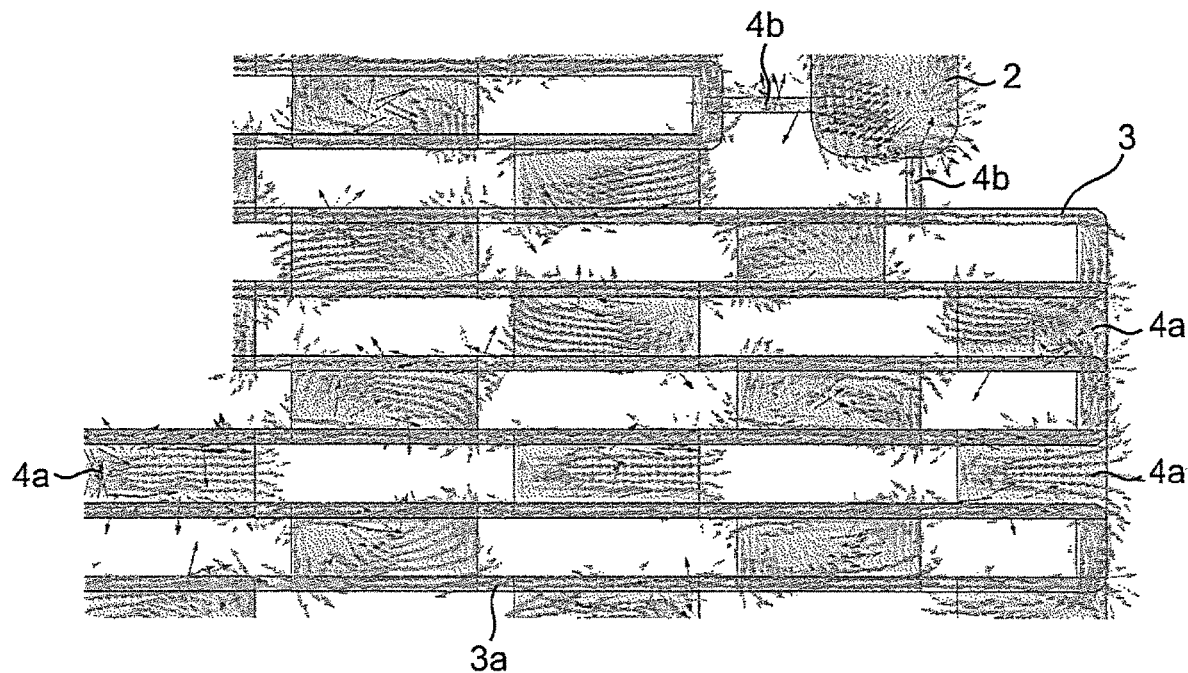
FIG. 10B is a diagram showing how current flows when receiving a signal of a heating frequency (2.4 GHz) used in an electromagnetic wave heating apparatus ("microwave oven") in the wireless communication device of the first embodiment.

FIG. 10 is a diagram obtained from simulation experiments of the RFID tag 1 of the first embodiment on how current flows (FIG. 10A) when receiving a signal of a UHF-band communication frequency (920 MHz) and on how current flows (FIG. 10B) when receiving a signal of a heating frequency (2.4 GHz) used in the "microwave oven". FIG. 10 shows, by black and white achromatic colors, the colored result of the magnitude of current flowing through the antenna pattern 3 (3a and 3b) and the line-to-line capacitance patterns 4 (4a and 4c) upon reception. Although for this reason the discrimination is not easy in FIG. 10, as is apparent from the result of experiments by the inventors, current flowing when receiving the signal of the heating frequency (2.4 GHz) was remarkably smaller than current flowing when receiving the signal of the communication frequency (920 MHz). Since in FIG. 10 the color of the antenna pattern 3 (3a and 3b) in FIG. 10A becomes deeper than that in FIG. 10B, it can be understood that current flowing when receiving the signal of the communication frequency (920 MHz) is larger than current flowing when receiving the signal of the heating frequency (2.4 GHz).

Figure 11:
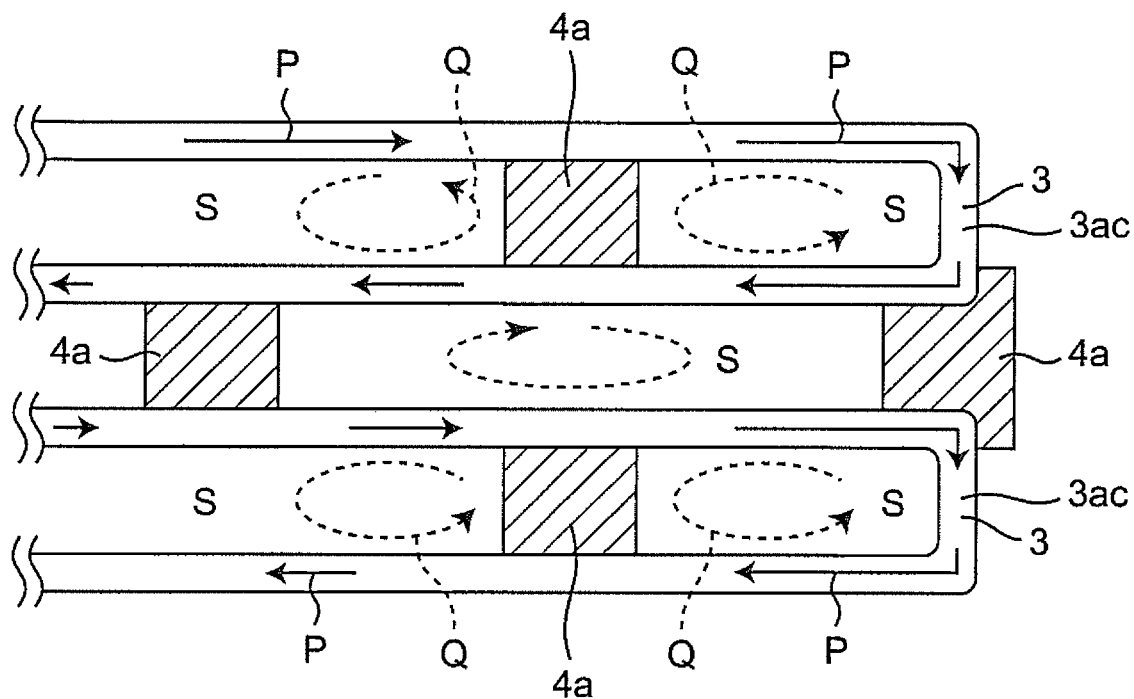
FIG. 11 is a diagram showing the direction in which current tries to flow when the antenna pattern and the capacitive coupling portion (line-to-line capacitance pattern) receive a signal having the heating frequency in the wireless communication device of the first embodiment.

FIG. 11 is a diagram showing directions in which, when the antenna pattern 3 and the line-to-line capacitance patterns 4 (first line-to-line capacitance electrode 4a) receive the signal of the heating frequency (2.4 GHz), current tries to flow through the patterns (3 and 4). In FIG. 11, a solid-line arrow P indicates the direction of current flowing through the antenna pattern 3 when receiving the signal of the heating frequency (2.4 GHz). A broken-line arrow Q indicates the direction of current which, when current indicated by the solid-line arrow P flows through the antenna pattern 3, flows through the "band elimination filter" as the plurality of LC parallel resonant circuits S composed of the antenna pattern 3 and the line-to-line capacitance patterns 4.

As shown in FIG. 11, when the RFID tag 1 is dielectrically heated to receive the signal of the heating frequency (2.4 GHz) to allow current indicated by the solid-line arrow P to flow through the antenna pattern 3, current indicated by the broken-line arrow Q tries to flow through the antenna pattern 3 in each LC parallel resonant circuit S in the plurality of LC parallel resonant circuits S. Specifically, in each LC parallel resonant circuit S, current tries to flow in the opposite direction (broken-line arrow Q) to the direction P (solid-line arrow) of current flowing through the antenna pattern 3. This results in a state where current-flows trying to flow through the antenna pattern 3 and the LC parallel resonant circuit S, respectively, offset each other, whereupon a phenomenon can be suppressed that the antenna pattern 3 generates heat to a high temperature by a large current released from the antenna pattern 3 receiving electric power of the electromagnetic wave heating apparatus. In the configuration of the RFID tag 1, even if the antenna pattern 3 is partly disconnected as a result of partial heat generation of the antenna pattern 3 and subsequent partial sublimation of the antenna pattern 3, since the LC parallel resonant circuits S are formed on the entire antenna pattern, the phenomenon can be suppressed that a large current is fed into the antenna pattern 3 by the electromagnetic wave heating apparatus, even though the antenna pattern 3 severed by the disconnection receives electric power of the electromagnetic wave heating apparatus. Thus, due to the establishment of the relationship shown in FIG. 11 between the LC parallel resonant circuits S and the antenna pattern 3 in the configuration of the RFID tag 1, the phenomenon continues to be suppressed that the electromagnetic wave heating apparatus feeds into the antenna pattern 3 a large current enough to disconnect (divide) the antenna pattern into pieces that is enough short to the degree that the antenna pattern 3 cannot finally receive electric power of the electromagnetic wave heating apparatus. As a result, even though the RFID tag 1 of the first embodiment receives the signal of the heating frequency (2.4 GHz), current flowing through the antenna pattern 3 is attenuated to a great extent (e.g. approx. −50 dB). Furthermore, in the loop circuit of the LC parallel resonant circuits S having the line-to-line capacitance electrodes 4a arranged on the turn portions of the antenna pattern 3, current not offset by current flowing through the antenna pattern 3 flows through the line-to-line capacitance electrodes 4a. Since this current causes a magnetic field, a part of electric power fed to the LC parallel resonant circuits S is lost as magnetic field energy. As a result, the RFID tag 1 of the first embodiment can have a circuit configuration allowing a remarkable attenuation for the band of the heating frequency (2.4 GHz) by the "band elimination filter" composed of the plurality of LC parallel resonant circuits S. The RFID tag 1 of the first embodiment has a circuit configuration similarly allowing a remarkable attenuation for the heating frequency band (2.4 to 2.5 GHz) used in the "microwave oven" as the electromagnetic wave heating apparatus.

Figure 12A:
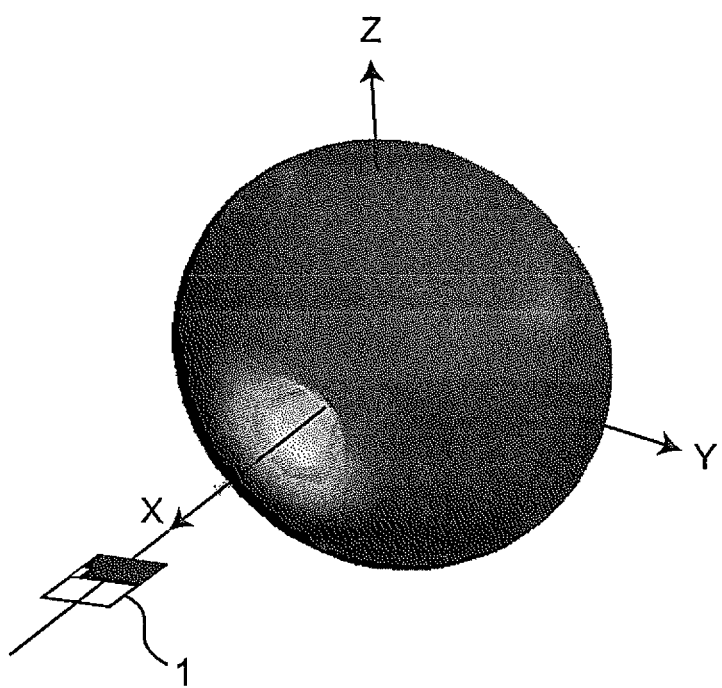
FIG. 12A is a diagram showing gains for all directions related to the wireless communication device of the first embodiment.
Figure 12B:
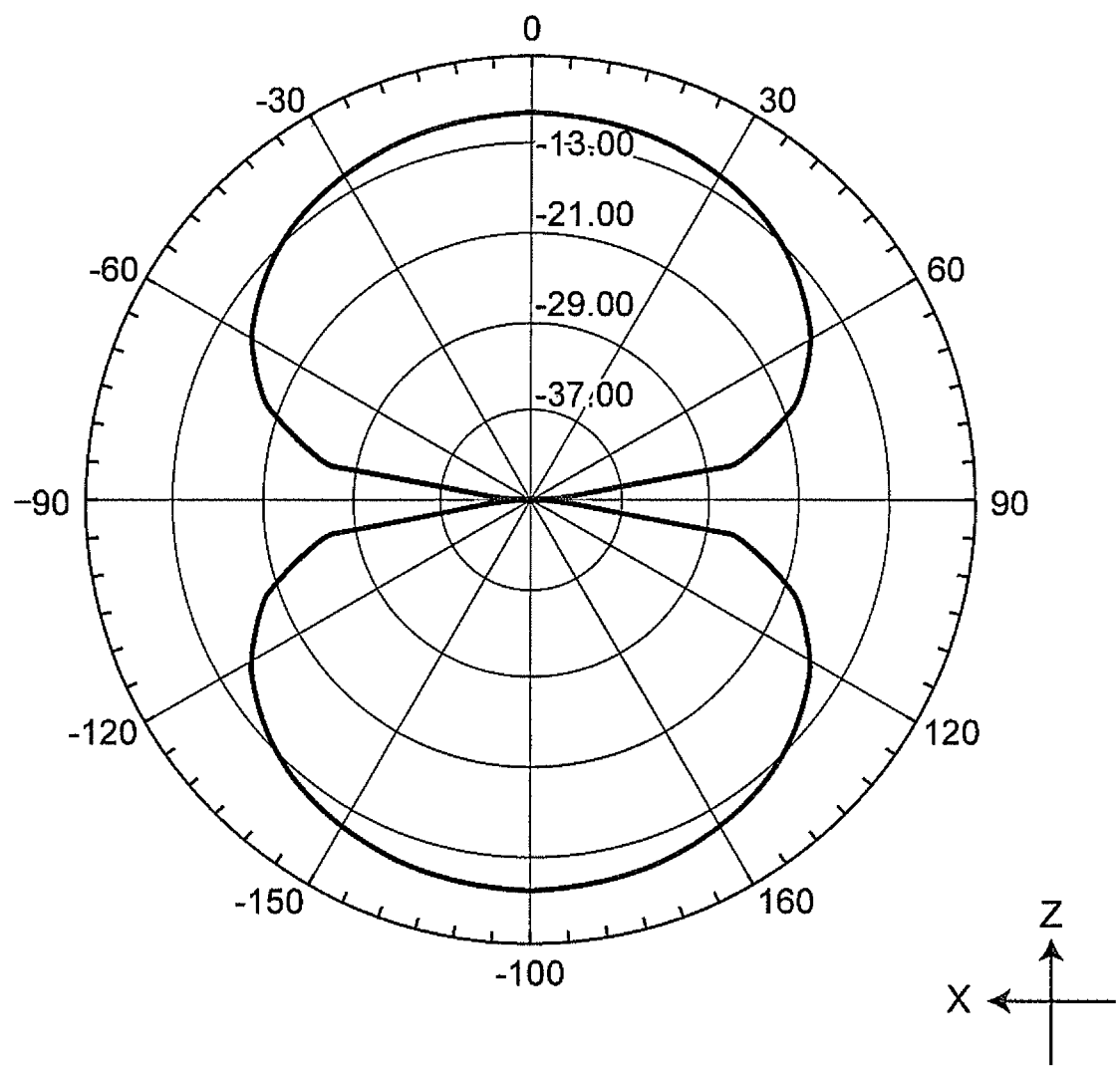
FIG. 12B is a diagram showing the gain of the wireless communication device of the first embodiment.

FIG. 12 is a diagram showing gains for all directions related to the RFID tag 1 of the first embodiment. It is noted that the X-direction in FIG. 12 indicates the longitudinal direction of the RFIC package 2 in the RFID tag 1. As shown in FIG. 12, the RFID tag 1 has a higher gain in Y-direction and Z-direction and has a wide directivity in Y-direction and Z-direction. The RFIC package 2 has a slightly lower gain in its longitudinal direction (X-direction) only as compared with the other directions but has a generally wide directivity.

Although in the RFID tag 1 of the first embodiment, all LC parallel resonant circuits S in the plurality of LC parallel resonant circuits S configured from the antenna pattern 3 and the line-to-line capacitance patterns 4 are set so as to resonate with frequencies of the frequency band (2.4 to 2.5 GHz) used in the electromagnetic wave heating apparatus, in the exemplary embodiments of the present disclosure, all of the LC parallel resonant circuits S need not necessarily resonate with frequencies used in the electromagnetic wave heating apparatus. Configuration may be such that in the case where the RFID tag 1 is dielectrically heated by the electromagnetic wave heating apparatus, current flowing through the antenna pattern 3 can be attenuated to a great extent.

As described above, the RFID tag 1 of the first exemplary embodiment is a wireless communication device for transmitting/receiving a high-frequency signal having a predetermined communication frequency. In this aspect, the wireless communication device includes the antenna pattern 3 having an inductance component; the RFIC chip 9 electrically connected to the antenna pattern 3; and the line-to-line capacitance pattern 4 as a capacitive coupling portion that capacitively couples together specific confronting regions 3aa each facing the other of the antenna pattern 3, at a plurality of points of the antenna pattern 3. Using such a simple configuration, even though the RFID tag 1 is irradiated with an electromagnetic wave having a frequency higher than the communication frequency, the LC parallel resonant circuits S function as the band elimination filter so that the irradiated electromagnetic wave higher than the communication frequency can greatly be attenuated.

In the RFID tag 1 of the first embodiment that is a wireless communication device, the "band elimination filter" is provided that is composed of the plurality of LC parallel resonant circuits S each including the antenna pattern 3 as a metal film body disposed on both sides of the dielectric and the line-to-line capacitance pattern 4 as the capacitive coupling portion. For this reason, the RFID tag of the first embodiment is configured such that remarkable attenuation can be achieved for frequencies in the frequency band (2.4 to 2.5 GHz) used in the electromagnetic wave heating apparatus.

Due to the formation of the line-to-line capacitance pattern 4 on the antenna pattern 3, the resonant frequency of the RFID tag 1 is adjusted to the UHF-band communication frequency. The resonant frequency by the antenna pattern 3 without formation of the line-to-line capacitance pattern 4 is higher than the communication frequency, e.g. approx. 1.1 GHz.

Advantageously, the RFID tag 1 of the first embodiment is configured such that when dielectrically heated by the electromagnetic wave heating apparatus, a current flows through the loop circuit as a minimum path composed of the antenna pattern 3 and the line-to-line capacitance pattern 4, this loop circuit acting as a small-sized magnetic field antenna at the frequency of the electromagnetic wave heating apparatus so as to less receive the electric field energy radiated from the electromagnetic wave heating apparatus. Thus, the loop circuit alone is configured to be hard to ignite by the electromagnetic wave heating apparatus and be able to lose, as the magnetic field energy, the received electric field energy (electric power). In consequence, the RFID tag 1 of the first embodiment becomes configured to be able to greatly attenuate the power feed level at the time of dielectric heating. Although the antenna pattern 3 is gradually heated by a minute current flowing through the antenna pattern 3 irrespective of the remarkable attenuation of the power feed level, the antenna pattern 3 can easily be disconnected by deformation of the antenna substrate 5 by setting the line width of the antenna pattern 3 to about 100 μm to 300 μm. As a result, the antenna substrate 5 deforms by heating of the antenna pattern 3 to disconnect the antenna pattern 3, so that the antenna pattern 3 goes disconnected till the time when the antenna pattern 3 becomes unable to receive more electromagnetic wave of the dielectric heating, whereby the entire tag cannot burn in spite of the dielectric overheating of the RFID tag.

The RFID tag 1 of the first embodiment is configured such that concentration of the electric field is suppressed by the curved surface shape of the antenna pattern 3 and the line-to-line capacitance pattern 4 and further such that the widely shaped first line-to-line capacitance electrode 4a capacitively couples at least the adjacent turn portions in the first antenna element 3a and the second antenna element 3b. Consequently, when the RFID tag 1 is dielectrically heated by the electromagnetic wave heating apparatus, the concentration of electric field can be suppressed in the turn portions of the first antenna element 3a and the second antenna element 3b in particular.

By using the above configuration, also when an article with the RFID tag 1 of the first embodiment is dielectrically heated in the electromagnetic wave heating apparatus (microwave oven), the occurrence of discharge in the RFID tag 1 is greatly suppressed, thereby preventing the risk of ignition in the article.

Second Embodiment

Hereinafter, description will be given of an RFID tag 21 that is a wireless communication device of a second exemplary embodiment. As regards the RFID tag 21 of the second embodiment, differences from the RFID tag 1 of the first embodiment will mainly be described. In description of the second embodiment, elements having similar configurations, operations, and functions to those of the first embodiment are designated by the same reference numerals and, in some cases, may not again be described for avoiding duplicate description.

Figure 13:
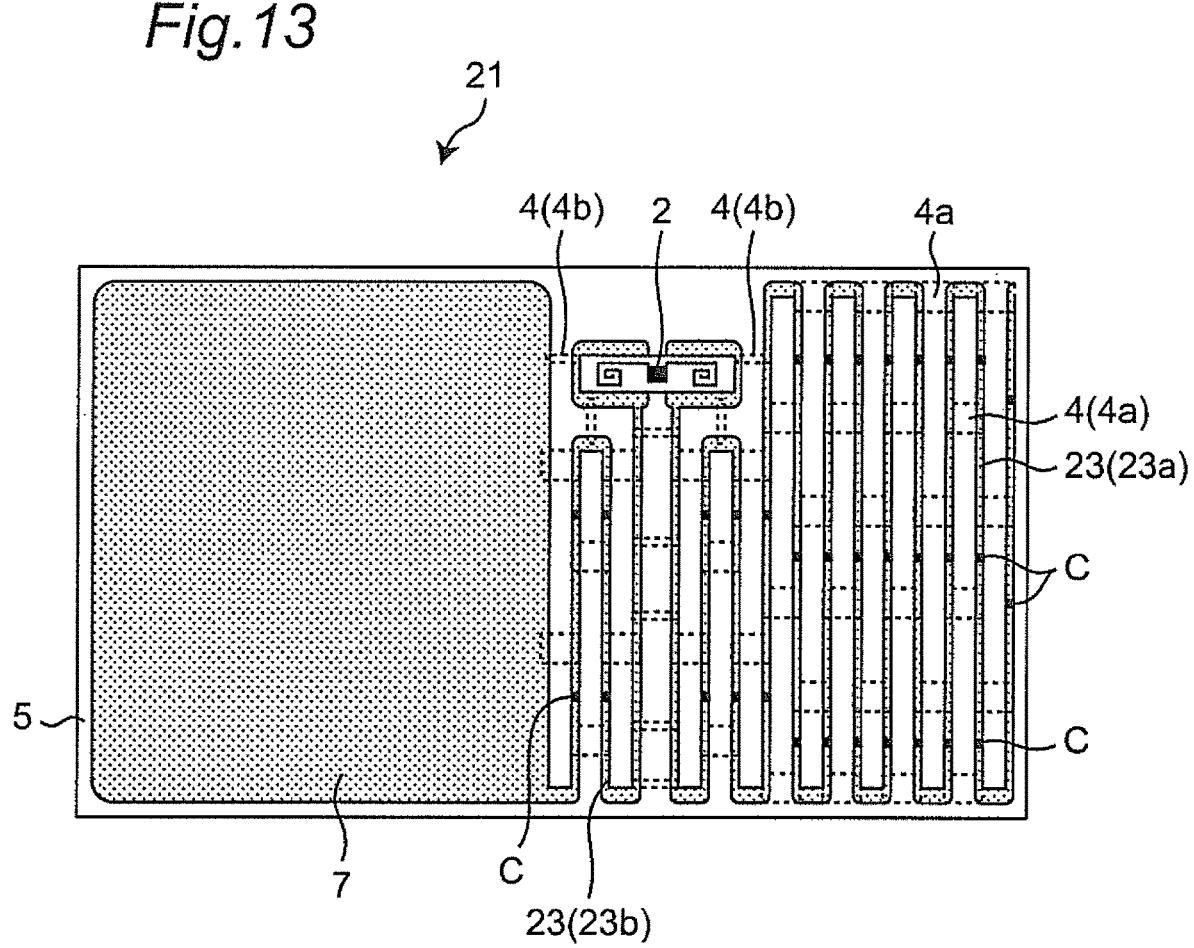
FIG. 13 is a plan view showing a configuration of a wireless communication device (RFID tag) of a second embodiment.

The RFID tag 21 of the second embodiment differs in configuration of an antenna pattern 23 from the RFID tag 1 of the first embodiment, but the other configurations are substantially the same as those of the RFID tag 1 of the first embodiment. FIG. 13 is a plan view showing a configuration of the RFID tag 21 of the second embodiment. The RFID tag 21 is configured to make wireless communication by a high-frequency signal having a UHF-band communication frequency (carrier frequency) and is configured to be capable of wireless communication in a wide frequency band.

The RFID tag 21 of the second embodiment differs from the RFID tag 1 of the first embodiment in that the linear antenna pattern 23 has at specific regions a reduced sectional shape (sectional shape cut in a direction orthogonal to the extending direction). The RFID package 2 and the antenna substrate 5 in the second embodiment are substantially the same as those of the RFID tag 1 of the first embodiment.

As described in the first embodiment, configuration is such that in the case where the RFID tag 21 is dielectrically heated in the "microwave oven" that is an electromagnetic wave heating apparatus, the RFID tag 21 attenuates the power feed level of the heating frequencies (2.4 to 2.5 GHz) used in the "microwave oven" to a great extent (approx. −50 dB). Regardless of such a configuration of the RFID tag 21 in which the power feed level of the heating frequencies (2.4 to 2.5 GHz) is greatly attenuated, an extremely small current flows through the antenna pattern 23 because the power feed level is not zero. As a result, the antenna pattern 23 generates heat by its own resistance. Particularly, in the case where the RFID tag as the wireless communication device is dielectrically heated by the "microwave oven" over a long period of time (several minutes), the antenna pattern itself comes to have a high temperature, and hence the antenna substrate, etc. may possibly ignite.

In the second embodiment, configuration is such that in the case where the RFID tag 21 as the wireless communication device is dielectrically heated by the "microwave oven" over a long period of time (several minutes), the antenna pattern 23 sublimates and severs at its specific portion. The RFID tag 21 of the second embodiment has a reduced sectional area on the linear antenna pattern 23 at its specific site (disconnection forming portion C). In other words, the antenna pattern 23 has at its disconnection forming portion C a smaller sectional area other than the other portions, of a section cut at its specific site in a direction orthogonal to the extending direction thereof. The disconnection forming portion C having a reduced sectional area can be formed by slimming (narrowing) or thinning the line of the antenna pattern 23.

The specific configuration of the disconnection forming portion C can be for example a configuration where the wiring width at a specific site on the antenna pattern 23 is formed to be partly slimmer to about 100 μm to 50 μm, for example, as compared with the other portions, or a configuration where the thickness is thinned to 9 μm to 6 μm. Thus, a fragile point is formed that easily break when the antenna substrate 5 deforms. In this manner, the disconnection forming portion C having a smaller sectional area than the other portions on the antenna pattern 23 is preferably a site between the line-to-line capacitance patterns that are capacitive coupling portions in the LC parallel resonant circuits S configured as the "band elimination filter". According to the exemplary aspect, each LC parallel resonant circuit S in the plurality of LC parallel resonant circuits S is set so as to resonate with frequencies in the frequency band of 2.4 to 2.5 GHz. The line length of each LC parallel resonant circuit S is set to be shorter than ½ frequency of the frequency used as the predetermined communication frequency and further to be ¼ wavelength (λ/4) or less of the frequency band of the heating electromagnetic wave (2.4 to 2.5 GHz). FIG. 13 shows an example in which the disconnection forming portion C is formed on the line of the antenna pattern 3 between the line-to-line capacitance patterns 4 making up the LC parallel resonant circuits S.

Accordingly, in the case where the RFID tag 21 is dielectrically heated for a long period of time and consequently the antenna pattern 23 sublimates and severs at the disconnection forming portion C, the line length of the disconnected portions of the antenna pattern 23 becomes ¼ wavelength (λ/4) or less of the frequency band of the heating electromagnetic wave (2.4 to 2.5 GHz), making it hard to receive the electromagnetic wave as the heating electromagnetic wave (2.4 to 2.5 GHz), whereby the LC parallel resonant circuit S is prevented from further rising in temperature by the frequency (2.4 to 2.5 GHz) of the heating electromagnetic wave used in the "microwave oven".

In the RFID tag 21 of the second embodiment, the antenna substrate 5 is disposed between the antenna pattern 23 and the line-to-line capacitance pattern 24 so as to reliably secure the dielectric capacitance between the antenna pattern 23 and the line-to-line capacitance pattern 24 even in the case where the antenna pattern 23 rises in temperature to warm the antenna substrate 5, the antenna substrate 5 being made of a heat-resistant adhesive label, e.g. a material such as a polyester-based resin or a polyimide-based resin having a 200° C. or more of heat-resistance temperature and a 5 minutes or more of durability. A film body formed from a heat-resistant material may intervene between the antenna substrate 5 and the antenna pattern 23 and/or between the antenna substrate 5 and the line-to-line capacitance pattern 24, so as to further enhance the heat resistance.

The thus configured RFID tag 21 of the second embodiment prevents the risk of ignition therein even in the case where an article with the RFID tag 21 is dielectrically heated in the electromagnetic wave heating apparatus (microwave oven), thereby providing a wireless communication device having a high safety and a high reliability.

Third Embodiment

Hereinafter, description will be given of an RFID tag 31 that is a wireless communication device of a third exemplary embodiment. As regards the RFID tag 31 of the third embodiment, differences from the RFID tag 1 of the first embodiment will mainly be described. In description of the third embodiment, elements having similar configurations, operations, and functions to those of the first embodiment are designated by the same reference numerals and, in some cases, may not again be described for avoiding duplicate description.

Figure 14:
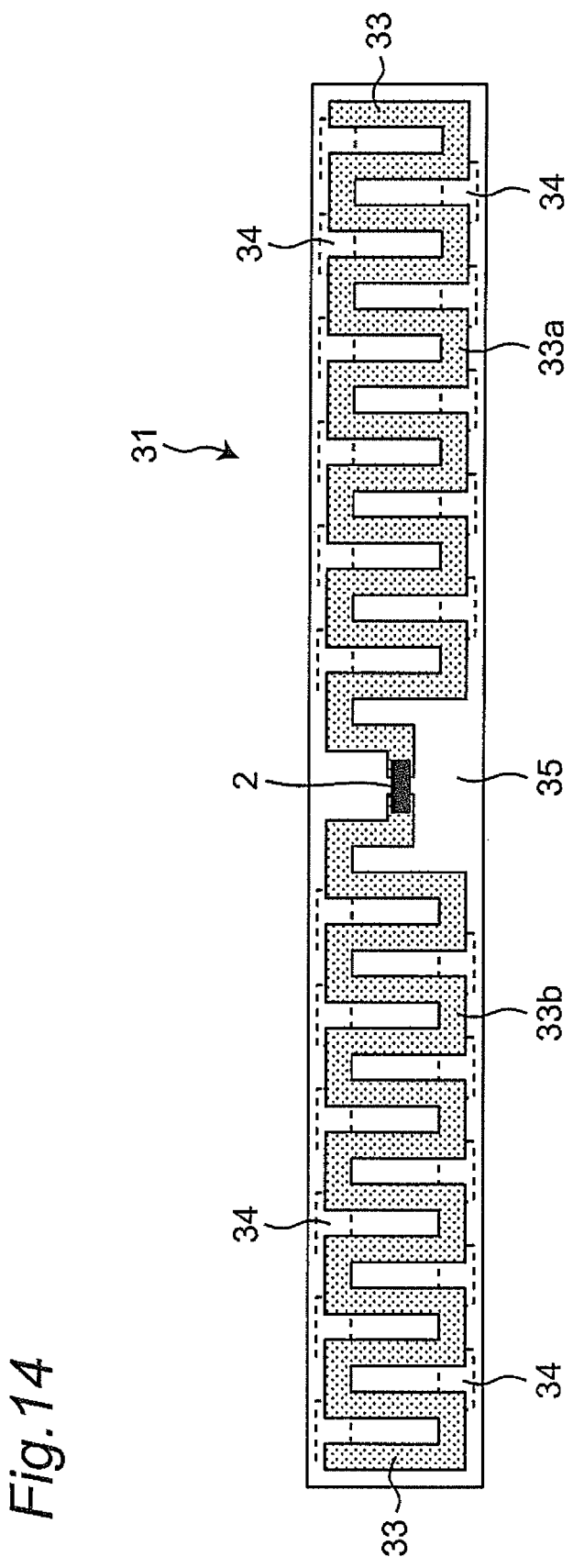
FIG. 14 is a plan view showing a configuration of a wireless communication device (RFID tag) of a third embodiment.

The RFID tag 31 of the third embodiment differs greatly in shape of the meandering antenna pattern 33 from the RFID tag 1 of the first embodiment. FIG. 14 is a plan view showing a configuration of the RFID tag 31 of the third embodiment. The RFID tag 31 is configured for wireless communication using a high-frequency signal having a UHF-band communication frequency (carrier frequency) and is configured to be capable of wireless communication in a wide frequency band.

The RFID tag 31 of the third embodiment has a more elongated shape in plan view than the RFID tag 1 of the first embodiment and is mounted at its center with the RFIC package 2. More specifically, an antenna substrate 35 of the RFID tag 31 has an elongated shape, with an antenna pattern 33 (first antenna element 33a and second antenna element 33b) being disposed on both sides of the RFIC package 2 mounted on the antenna substrate 35 at its center. The first antenna element 33a is formed on the antenna substrate 35 in a region (right-hand region in FIG. 14) on one hand in the longitudinal direction and extends toward one end in the longitudinal direction in a meandering manner. On the other hand, the second antenna element 33b is formed on the antenna substrate 35 in a region (left-hand region in FIG. 14) on the other in the longitudinal direction and extends toward the other end in the longitudinal direction in a meandering manner.

In the RFID tag 31 of the third embodiment, a line-to-line capacitance pattern 34 as a capacitive coupling portion is disposed so as to capacitively couple adjacent turn portions together in the meandering first antenna element 33a and second antenna element 33b. In this manner, the RFID tag 31 of the third embodiment comprises multi-stage (a plurality of) LC parallel resonant circuits S formed along respective paths of the first antenna element 33a and second antenna element 33b having an inductance component, these LC parallel resonant circuits S making up the "band elimination filter". Each LC parallel resonant circuit S of the plurality of LC parallel resonant circuits S in the third embodiment is also set so as to resonate with frequencies in the frequency band of 2.4 to 2.5 GHz used in the "microwave oven". The line length of each LC parallel resonant circuit S is set to be shorter than ½ frequency of the frequency used as the predetermined communication frequency.

The RFID tag 31 of the third embodiment is formed such that in a loop circuit as a minimum path configured from the antenna pattern 33 and the line-to-line capacitance patterns 34, the line length between the line-to-line capacitance patterns 34 disposed at confronting turn portions is shorter than ½ frequency of the frequency used as the predetermined communication frequency and further is ¼ wavelength or less of the frequencies (λ) of the frequency band (2.4 to 2.5 GHz) used in the "microwave oven". That is, the line length between the turn portions on the paths of the first antenna element 33a and the second antenna element 33b is set shorter to be ¼ wavelength (λ/4: approx. 30 to 34 mm) or less of the wavelength (λ) of the frequency band (2.4 to 2.5 GHz). Thus, the RFID tag 31 of the third embodiment can have a simple configuration like a small tape with narrow width, enabling a low-price, easy-to-handle wireless communication device to be constructed.

Figure 15:
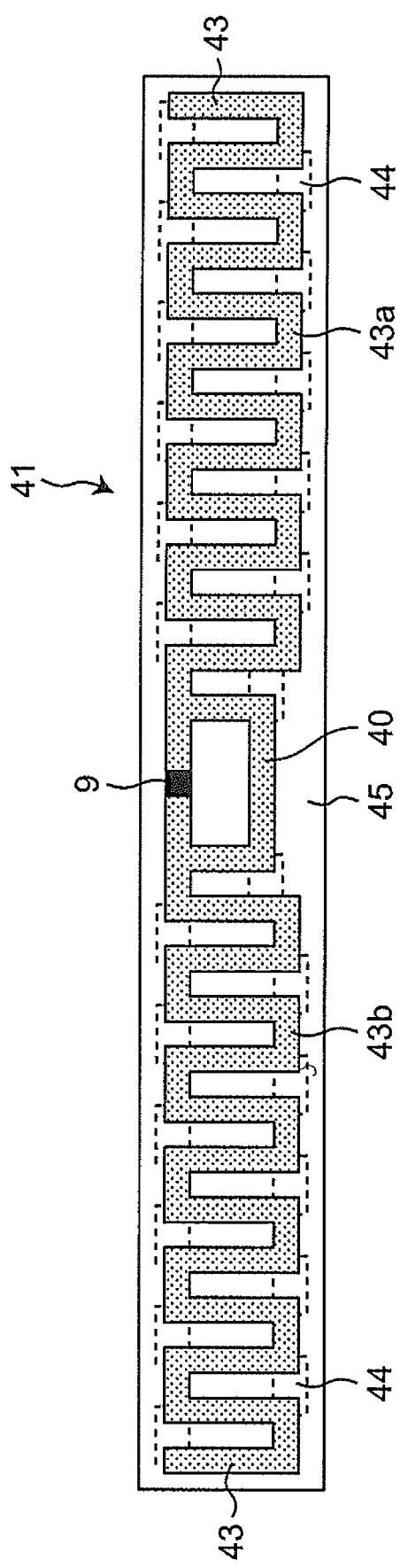
FIG. 15 is a plan view showing a variant of the wireless communication device of the third embodiment.

FIG. 15 shows a variant of the third embodiment and is a plan view showing a configuration of an RFID tag 41 in which the RFIC chip 9 is mounted on an antenna pattern 43. The RFID tag 41 is configured for wireless communication using a high-frequency signal having a UHF-band communication frequency (carrier frequency) and is configured to be capable of wireless communication in a wide frequency band. The RFID tag 41 shown in FIG. 15 has a similar configuration to that of the RFID tag 31 shown in FIG. 14 except that the RFIC chip 9 is mounted on the antenna pattern 43 formed on a loop portion 40. More specifically, an antenna substrate 45 of the RFID tag 41 has an elongated shape, with the antenna pattern 43 (first antenna element 43a and second antenna element 43b) being disposed on both sides of the loop portion 40 formed on the antenna substrate 45 at its center. According to the exemplary aspect, the RFID tag 41 also comprises multi-stage (i.e., a plurality of) LC parallel resonant circuits S formed along respective paths of the first antenna element 43a and second antenna element 43b having an inductance component. Thus, these LC parallel resonant circuits S form the "band elimination filter".

Each LC parallel resonant circuit S of the plurality of LC parallel resonant circuits S in the RFID tag 41 shown in FIG. 15 is also set so as to resonate with frequencies in the frequency band of 2.4 to 2.5 GHz used in the "microwave oven", with the line length of each LC parallel resonant circuit S is set to be shorter than ½ frequency of the frequency used as the predetermined communication frequency.

In the RFID tag 41 shown in FIG. 15, the line length between the line-to-line capacitance patterns 44 disposed at the turn portions on the paths of the meandering first antenna element 43a and second antenna element 43b is set to ¼ wavelength (λ/4: approx. 30 to 34 mm) or less, with the RFID tag 41 having a tape-like shape with narrow width, providing an easy-to-handle wireless communication device that is not an eyesore to the purchaser in the merchandise display.

As described above, the RFID tags 31 and 41 in the third embodiment provides an easy-to-handle wireless communication device that does not become an obstacle to commodity display, having a high safety and reliability because of preventing the risk of ignition in the RFID tag 31 and 41 even in the case where goods with the RFID tags 31 and 41 are dielectrically heated in the electromagnetic wave heating apparatus (microwave oven).

The RFID tags 31 and 41 described in the third embodiment may have a configuration where the disconnection forming portion C described in the second embodiment is formed on the antenna pattern 33 and 43. The RFID tags 31 and 41 of the third embodiment have corner portions of a curved-surface shape for suppressing the concentration of electric field on the antenna pattern 3 and the line-to-line capacitance pattern 4.

Fourth Embodiment

Hereinafter, description will be given of an RFID tag 51 that is a wireless communication device of a fourth exemplary embodiment. As regards the RFID tag 51 of the fourth embodiment, differences from the RFID tag 1 of the first embodiment will mainly be described. In description of the fourth embodiment, elements having similar configurations, operations, and functions to those of the first embodiment described above are designated by the same reference numerals and, in some cases, may not again be described for avoiding duplicate description.

Figure 16A:
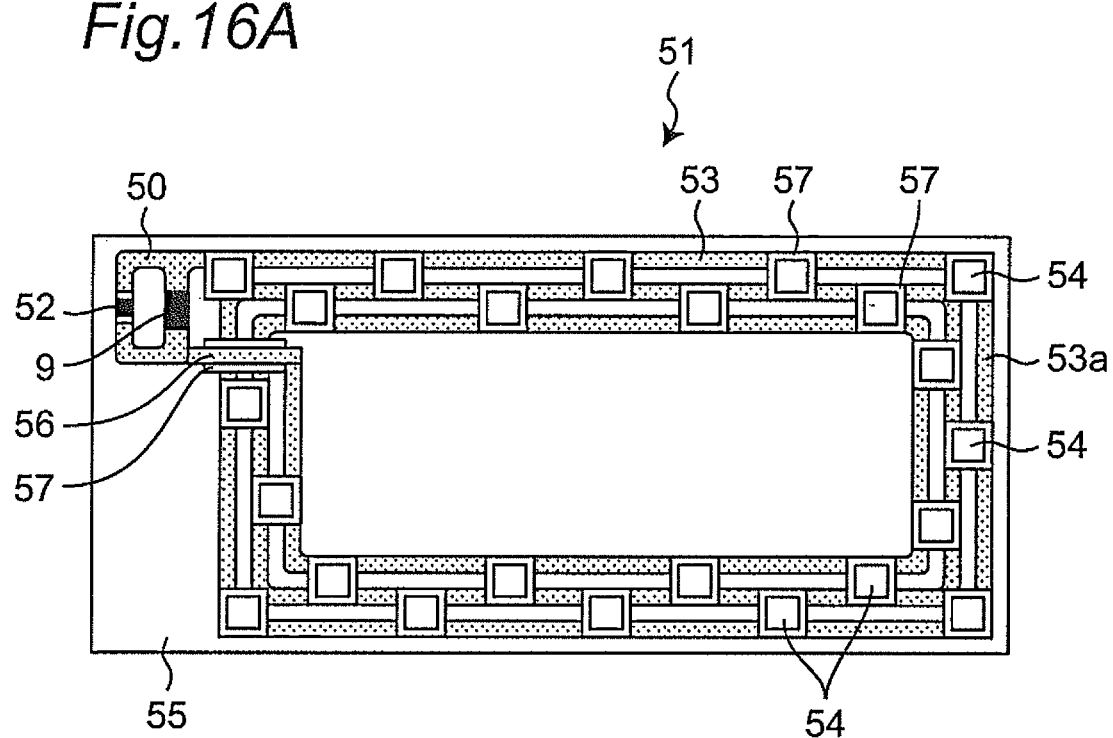
FIG. 16A is a plan view showing a configuration of a wireless communication device (RFID tag) of a fourth embodiment.
Figure 16B:
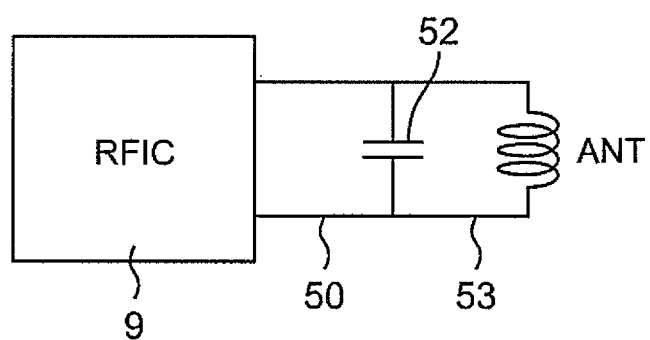
FIG. 16B is an equivalent circuit diagram showing a configuration of the antenna pattern in the wireless communication device of the fourth embodiment.

FIG. 16A is a plan view showing a configuration of the RFID tag 51 of the fourth embodiment. The RFID tag 51 is configured for wireless communication using a high-frequency signal having an HF-band communication frequency (carrier frequency) and is capable of wireless communication in a wide frequency band. FIG. 16B is a diagram showing, in the form of an equivalent circuit, the configuration of an antenna pattern (coil pattern) 53 in the RFID tag 51 of the fourth embodiment.

As shown in FIG. 16A, the RFID tag 51 comprises the antenna pattern 53 having a matching circuit of the loop portion 50 provided with the RFIC chip 9 and a capacitor element 52. In the matching circuit of the loop portion 50, the capacitor element 52 is connected at a position facing the RFIC chip 9. An antenna element 53a of the antenna pattern 53 in the RFID tag 51 extends from the loop portion 50 and is formed into a spiral. The antenna element 53a shown in FIG. 16A is led in a clockwise inner winding manner from the loop portion 50. A tip as a leading end of the antenna element 53a is directly connected via a bridge pattern 56 to the matching circuit of the loop portion 50. An insulating pattern 57 made of a heat-resistant electrically-insulating material is disposed between the bridge pattern 56 and the antenna pattern 53 so as to secure the insulation between the bridge pattern 56 and the antenna pattern 53.

In the spiral antenna element 53a led from the matching circuit of the loop portion 50, the line-to-line capacitance pattern 54 as a plurality of capacitive coupling portions capacitively coupling adjacent paths together is disposed at predetermined intervals along the path of the spiral antenna element 53a. The insulating pattern 57 made of a heat-resistant electrically-insulating material is disposed between the line-to-line capacitance pattern 54 and the antenna element 53a so as to secure the insulation between the line-to-line capacitance pattern 54 and the antenna element 53a.

As described above, the RFID tag 51 of the fourth embodiment comprises multi-stage (i.e., a plurality of) LC parallel resonant circuits S formed along the path of the antenna element 53a having an inductance component, these LC parallel resonant circuits S making up the "band elimination filter". Each LC parallel resonant circuit S of the plurality of LC parallel resonant circuits S in the RFID tag 51 is also set so as to resonate with frequencies in the frequency band of 2.4 to 2.5 GHz used in the "microwave oven", with the line length of each LC parallel resonant circuit S being set to be shorter than ½ frequency of the frequency used as the predetermined communication frequency.

The RFID tag 51 of the fourth embodiment is configured such that the antenna pattern 53 and the line-to-line capacitance pattern 54 as the capacitive coupling portion are laminated on the front surface (first main surface) of the antenna substrate 55 via the insulating pattern 57 that is a dielectric. On the front surface (first main surface) of the antenna substrate 55, the bridge pattern 56 is formed via the insulating pattern 57 on the antenna pattern 53, to make up the antenna of the RFID tag 51. Thus, the plurality of patterns (53, 57, 56, and 54) are formed on the same surface of the antenna substrate 55, providing a configuration easy to manufacture the RFID tag 51. In the RFID tag 51 of the fourth embodiment, the antenna substrate 55 may not be made of a dielectric, and it may be made of a paper material for example.

As described referring to FIG. 11 in the first embodiment, the RFID tag 51 of the fourth embodiment also has a circuit configuration in which the "band elimination filter" composed of the plurality of LC parallel resonant circuits S can achieve a remarkable attenuation for frequencies in the band of the heating frequency (2.4 to 2.5 GHz). Accordingly, the RFID tag 51 as the wireless communication device of the fourth embodiment is capable of wireless communication using a high-frequency signal having a HF-band communication frequency (carrier frequency) and, even when an article with the RFID tag 51 is dielectrically heated in the electromagnetic wave heating apparatus (microwave oven), can suppress the occurrence of discharge in the RFID tag 51 to a great extent, thereby enabling the risk of ignition in the article to securely be prevented.

Fifth Embodiment

Hereinafter, description will be given of an RFID tag 61 that is a wireless communication device of a fifth exemplary embodiment. As regards the RFID tag 61 of the fifth embodiment, differences from the RFID tag 1 of the first embodiment will mainly be described. In description of the fifth embodiment, elements having similar configurations, operations, and functions to those of the first embodiment are designated by the same reference numerals and, in some cases, may not again be described for avoiding duplicate description.

Figure 17A:
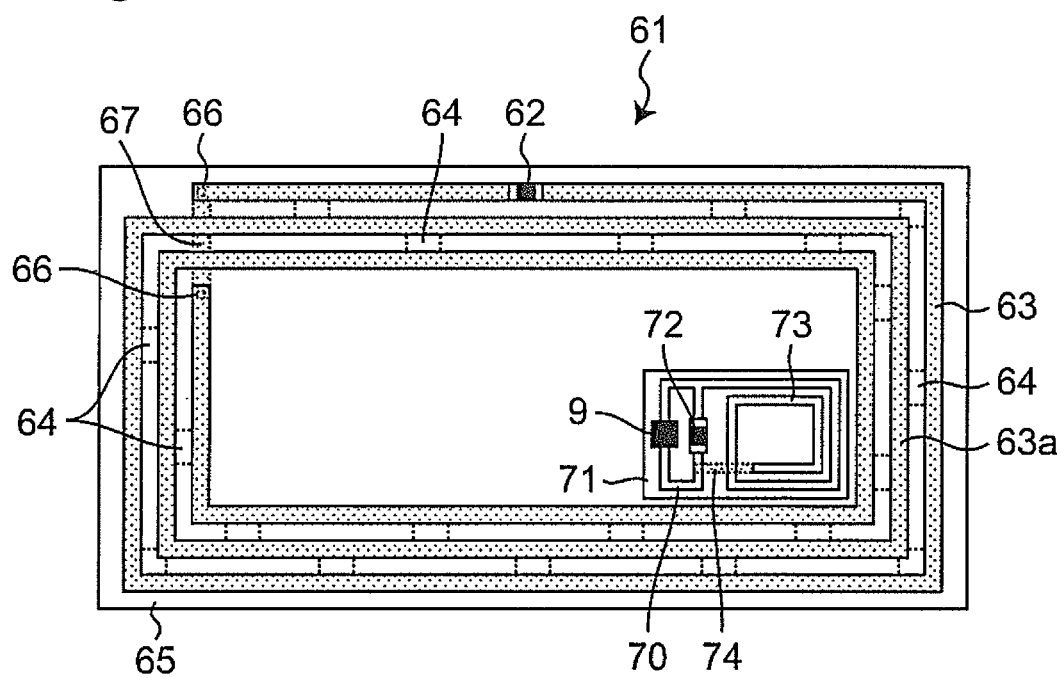
FIG. 17A is a plan view showing a configuration of a wireless communication device (RFID tag) of a fifth embodiment.
Figure 17B:
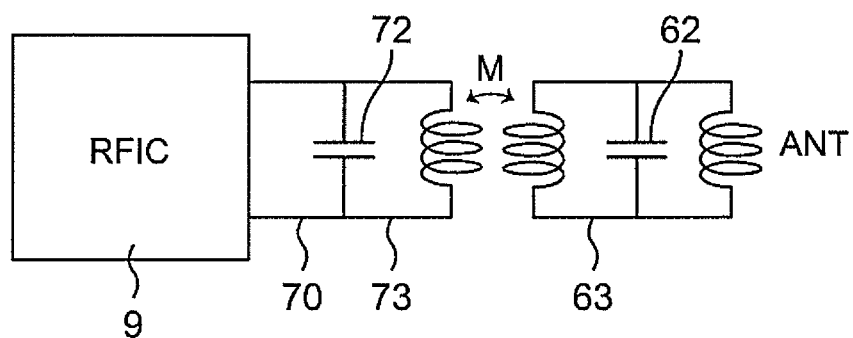
FIG. 17B is an equivalent circuit diagram showing a configuration of the antenna pattern in the wireless communication device of the fifth embodiment.

FIG. 17A is a plan view showing a configuration of the RFID tag 61 of the fifth embodiment. The RFID tag 61 is configured for wireless communication using a high-frequency signal having a HF-band communication frequency (carrier frequency) and is capable of wireless communication in a wide frequency band. FIG. 17B is a diagram showing, in the form of an equivalent circuit, the configuration of two coil patterns (63 and 73) including an antenna pattern in the RFID tag 61 of the fifth embodiment.

As shown in FIG. 17A, the RFID tag 61 of the fifth embodiment comprises a resonant booster circuit having the two coil patterns (63 and 73). The coil pattern (primary coil pattern) 73 on one hand of the RFID tag 61 has a matching circuit of a loop portion 70 provided with the RFIC chip 9 and a capacitor element 72. In the matching circuit of the loop portion 70, the RFIC chip 9 is connected at a position facing the capacitor element 72. The coil pattern (primary coil pattern) 72 is led spirally from the loop portion 70, with a tip as a leading end thereof being directly connected via a bridge pattern 74 to the matching circuit of the loop portion 70. The coil pattern (primary coil pattern) 73 is led in a clockwise inner winding manner from the loop portion 70.

The bridge pattern 74 may be formed on the back surface (second main surface) of the antenna substrate 65 so that the tip as the leading end of the coil pattern (primary coil pattern) 73 is connected to the loop portion 70 via an interlayer connection conductor extending through the antenna substrate 65. Otherwise, in the case where the bridge pattern 74 is formed on the front surface (first main surface), an insulating pattern made of a heat-resistant electrically-insulating material may be disposed between the bridge pattern 74 and the primary coil pattern 73 to secure the insulation between the bridge pattern 74 and the primary coil pattern 73.

The other coil pattern (secondary coil pattern) 63 in the RFID tag 61 of the fifth embodiment is formed so as to surround the coil pattern (primary coil pattern) 73 to configure an antenna element 63a formed in a clockwise inner winding manner. In the spiral antenna element 63a of the antenna pattern 63, line-to-line capacitance patterns 64 as a plurality of capacitive coupling portions capacitively coupling the adjacent paths together are disposed at predetermined intervals along the path of the antenna element 63a.

The antenna pattern 63 in the RFID tag 61 of the fifth embodiment is formed on the front surface (first main surface) of the antenna substrate 65. On the other hand, the line-to-line capacitance patterns 64 as the capacitive coupling portions are formed on the back surface (second main surface) of the antenna substrate 65 made of a dielectric, to capacitively couple specific regions on the antenna element 63a of the antenna pattern 63. A capacitor element 62 is disposed on the antenna element 63a of the antenna pattern 63. An outer end and an inner end of the spiral antenna element 63a are electrically connected directly to each other, via an interlayer connection conductor 66 extending through the antenna substrate 65, by a conductive path pattern 67 formed on the back surface (second main surface) of the antenna substrate 65. It is possible to simultaneously form the line-to-line capacitance patterns 64 and the conductive path pattern 67 formed on the back surface (second main surface) of the antenna substrate 65.

As described above, in the RFID tag 67 of the fifth embodiment, the multi-stage (the plurality of) LC parallel resonant circuits S are formed along the path of the antenna element 63a of the antenna pattern 63 having an inductance component, these LC parallel resonant circuits S making up the "band elimination filter". Each LC parallel resonant circuit S of the plurality of LC parallel resonant circuits S in the third embodiment is also set so as to resonate with frequencies in the frequency band of 2.4 to 2.5 GHz used in the "microwave oven". The line length of each LC parallel resonant circuit S is set to be shorter than ½ frequency of the frequency used as the predetermined communication frequency.

The thus configured RFID tag 61 of the fifth embodiment has a circuit configuration capable of remarkable attenuation for frequencies in the band of heating frequency (2.4 to 2.5 GHz) by the "band elimination filter" composed of the plurality of LC parallel resonant circuits S. Accordingly, the RFID tag 61 of the fifth embodiment is configured to be capable of wireless communication using a high-frequency signal having a HF-band communication frequency (carrier frequency) and is configured to be able to greatly suppress the occurrence of discharge in the RFID tag 61 even when an article with the RFID tag 61 is dielectrically heated in the electromagnetic wave heating apparatus (microwave oven), thereby making it possible to securely prevent the risk of ignition in the article.

Thus, as set forth using specific configurations in the embodiments, according to these embodiments, there can be provided a wireless communication device having a high safety and reliability, suppressing the occurrence of discharge in the wireless communication device even when an article with the wireless communication device is heated in the electromagnetic wave heating apparatus with the wireless communication device being erroneously attached, thereby making it possible to prevent the risk of ignition of the wireless communication device and further the risk of ignition in the article with the wireless communication device. Therefore, the exemplary embodiments can construct a system automating accounting for items purchased and bagging thereof in shops such as convenience stores handling a wide variety of goods such as foods and daily commodities and provides a wireless communication device capable of greatly advancing toward the practical use of "unmanned convenience stores".

Sixth Embodiment

Figure 18:
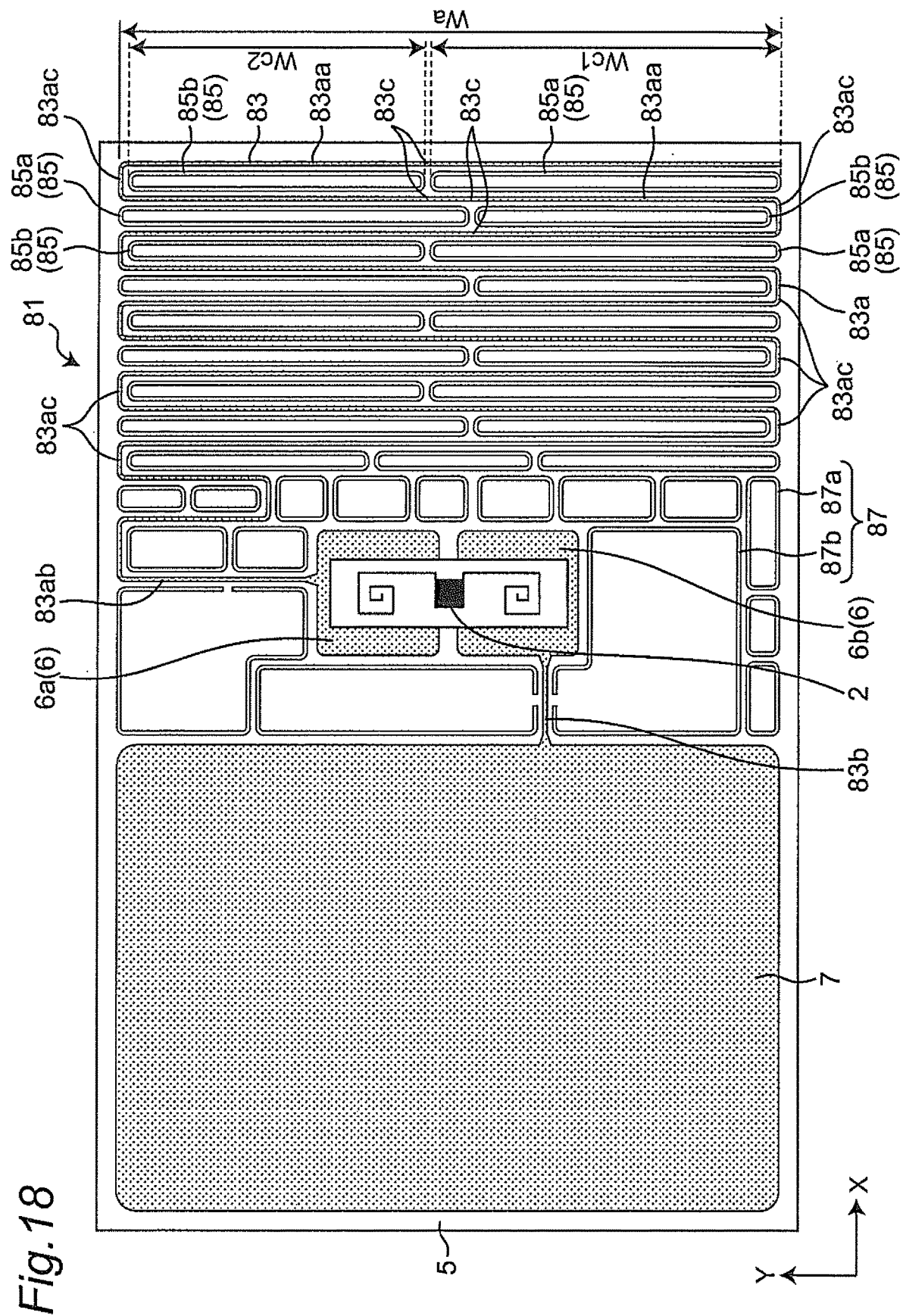
FIG. 18 is a plan view showing a configuration of a wireless communication device (RFID tag) of a sixth embodiment.

Hereinafter, referring to FIG. 18, description will be given of an RFID tag that is a wireless communication device of a sixth exemplary embodiment. FIG. 18 is a plan view showing a configuration of a RFID tag 81 of the sixth embodiment.

As regards the RFID tag 81 of the sixth embodiment, differences from the RFID tag 1 of the first embodiment will mainly be described. In description of the sixth embodiment, elements having similar configurations, operations, and functions to those of the first embodiment are designated by the same reference numerals and, in some cases, may not again be described for avoiding duplicate description. The other configurations of the RFID tag 81 of the sixth embodiment than the following configurations are substantially the same as those of the RFID tag 1 of the first embodiment.

In the RFID tag 1 of the first embodiment, the antenna pattern 3 is formed on the front surface of the antenna substrate 5 while the line-to-line capacitance pattern 4 as the capacitive coupling portion is formed on the back surface. On the contrary, in the RFID tag 81 of the sixth embodiment, both an antenna pattern 83 and a line-to-line capacitance pattern 85 are formed on the front surface of the antenna substrate 5.

The antenna pattern 83 as a field-emission type antenna pattern is formed on the front surface of the antenna substrate 5. The antenna pattern 83 includes a first antenna element 83a having a meandering antenna pattern that meanders with a plurality of turn portions 83ac, and a second antenna element 83b connected to a widened portion 7. The turn portions 83ac of the antenna pattern 83 are points at which the extending direction of the antenna pattern 83 is reversed. The antenna element 83a has the plurality of turn portions 83ac. The first antenna element 83 has rectilinear portions 83aa parallel to the width direction (i.e., Y-direction) of the antenna substrate 5. The line-to-line capacitance pattern 85 is formed between the adjacent rectilinear portions 83aa of the first antenna element 83a and between the adjacent turn portions 83ac. The interval between the antenna element 83a and the line-to-line capacitance pattern 85 is 150 μm for example.

The line-to-line capacitance pattern 85 is formed from a conductive material such as aluminum foil and copper foil, similar to the antenna pattern 83. When formed from aluminum foil, the thickness of the line-to-line capacitance pattern 85 is 6 μm for example. The line-to-line capacitance pattern 85 is formed into a loop shape.

The line-to-line capacitance pattern 85 includes line-to-line capacitance patterns 85a and 85b each having a different length in the width direction (Y-direction) of the antenna substrate 5. The line-to-line capacitance patterns 85a and 85b have the longitudinal direction and the lateral direction, and the longitudinal length of the line-to-line capacitance patterns 85a and 85b is formed shorter to be ¼ wavelength or less of the frequency used in the electromagnetic wave heating. In the amplitude direction (Y-direction) of meandering of the antenna pattern 83, a length Wa of the first antenna element 83a is longer than a length Wc1 of the line-to-line capacitance pattern 85a and a length Wc2 of the line-to-line capacitance pattern 85b. The line-to-line capacitance pattern 85 is configured from an elongated closed loop pattern. Hence, in the case of acting as a magnetic field antenna, Q characteristics of the antenna coil become worse, with a function to convert the magnetic field energy into heat due to the magnetic loss. This heat causes the antenna substrate 5 to deform by e.g. melting or carbonizing, to disconnect the line-to-line capacitance pattern 85 and disconnect part of the antenna pattern 83.

The antenna pattern 83 of the sixth embodiment comprises the two land patterns 6 (6a and 6b) in contact with and for electrical connection to the RFIC package 2. This allows the RFIC chip 9 and the antenna pattern 83 included in the RFIC package 2 to electrically be connected to each other. The antenna pattern 83 includes the first antenna element 83a and the second antenna element 83b to configure a dipole electric field antenna.

The first antenna element 83a has a substantially linear shape pattern and is led from the first land pattern 6a to extend in the meandering manner. The extending direction of the first antenna element 83a is directed toward a longitudinal end of the antenna substrate 5. The tip in the extending direction of the first antenna element 83a is located at the longitudinal end of the antenna substrate 5.

The second antenna element 83b of the antenna pattern 83 is led from the second land pattern 6b and extends rectilinearly toward the longitudinal other end of the antenna substrate 5, with the tip in the extending direction of the second antenna element 83b having the widened portion 7. This widened portion 7 is a portion attached to an article and, when attached to an article on which exterior surface a metal material is exposed, e.g. a can product, allows the article external surface to function as a part of the antenna.

For example, the first antenna element 83a has the rectilinear portions 83aa parallel to the width direction (Y-direction) of the antenna substrate 5 and extending in the amplitude direction of the meander. The rectilinear portion 83aa has confronting portions 83c that face each other without intervention of the line-to-line capacitance patterns 85a and 85c, between the line-to-line capacitance patterns 85a and 85c in the width direction (Y-direction) of the antenna substrate 5 and between the adjacent rectilinear portions 83aa in the longitudinal direction (X-direction) of the antenna substrate 5. By alternately arranging the line-to-line capacitance pattern 85a and the line-to-line capacitance pattern 85b between the rectilinear portions 83aa depending on extension of the antenna pattern 83 in the longitudinal direction of the antenna substrate 5, the positions of the confronting portions 83c shift in the width direction of the antenna substrate 5.

A looped shield pattern 87 is formed around the land pattern 6. The shield pattern 87 is made of a conductive material such as aluminum foil or copper foil, similar to the antenna pattern 3. The shield pattern 87 includes a completely closed loop-shaped first shield pattern 84a and a partly interrupted second shield pattern 87b.

The first shield pattern 87a is a completely closed loop-shaped pattern having a long side shorter than that of the line-to-line capacitance patterns 85a and 85b. This subquadrate pattern is formed with a long side enough not ignite regardless of reception of an electromagnetic wave in the band of higher frequencies than the communication frequency. A current flows through this first shield pattern 87a in the direction of cancelling the magnetic field generated by current flowing between the first antenna element 83a and the land patterns 6a and 6b. Since this first shield pattern 87a is closer to a square than the line-to-line capacitance patterns 85a and 85b, Q characteristics of the inductance element configured by this pattern are higher than Q characteristics of the inductance element formed by the line-to-line capacitance patterns 85a and 85b, making it easy to suppress heat generation and ignition arising from the magnetic loss. As a result, due to the arrangement of the first shield patterns 86a at the central portion of the antenna substrate 5 in the longitudinal direction, there is no eddy-current-based heat generation leading to disconnection, irrespective of irradiation of electromagnetic wave in the band of higher frequencies than the communication frequency.

The second shield pattern 87b is partly interrupted. A current flows through this pattern as well in the direction of cancelling the magnetic field generated by current flowing between the first antenna element 83a and the land patterns 66 and 6b. Due to partial interruption in this pattern, irradiation of electromagnetic waves in the band of higher frequencies than the communication frequency brings about a discharge and a spark at the interrupted portion, with the result that the antenna element of the discharge portion of the antenna substrate 5 locally sublimates. Since the antenna pattern lies in the vicinity of the sublimated point, a function is presented of disconnecting the neighboring antenna pattern simultaneously with the sublimation of the base.

Moreover, according to this exemplary aspect, an extended portion 83ab extending from the first land pattern 6a of the first antenna element 83a and the second antenna element 83b extending from the second land pattern 6b are arranged in the directions intersecting each other, e.g. orthogonal directions. This can reduce the occurrence of potential difference between the extended portion 83ab of the first antenna element and the second antenna element 83b.

The thus configured antenna pattern 83, line-to-line capacitance pattern 85, and shield pattern 87 on the front surface of the antenna substrate 5 have a shape preventing the concentration of the electric field and have no sharp edges particularly at bent portions and edge portions of the outer periphery, the entirety being formed from gentle curved surfaces.

Although in the first embodiment the mode has been exemplified where the RFIC package 2 is mounted on the antenna pattern 83, the RFIC chip 9 may directly be mounted on the antenna pattern 83. At this time, the inductor configured as the plurality of inductance elements 10A, 10B, 10C, and 10D in the RFIC package 2 may be configured as a looped pattern on the antenna substrate 5.

Figure 19A:
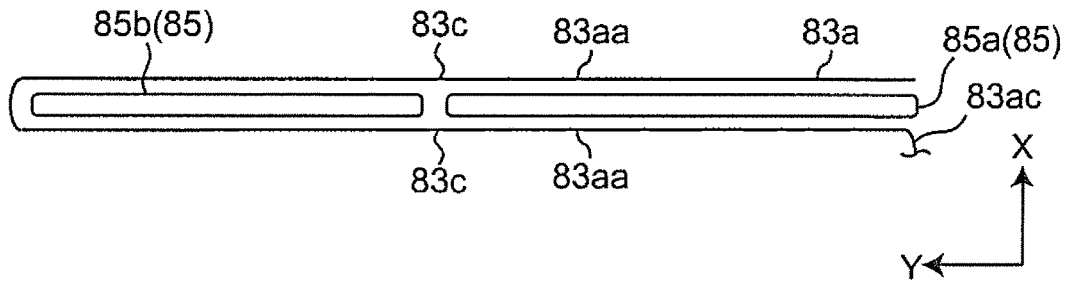
FIG. 19A is a plan view showing the configuration of the wireless communication device (RFID tag) of the sixth embodiment.
Figure 19B:
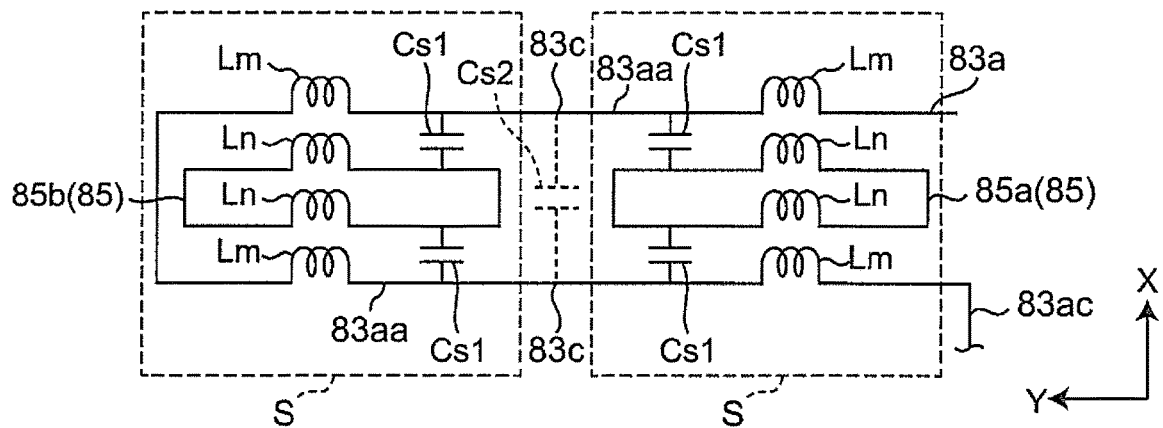
FIG. 19B is an equivalent circuit diagram of a partial configuration of the antenna pattern in the wireless communication device of the sixth embodiment.
Figure 19C:
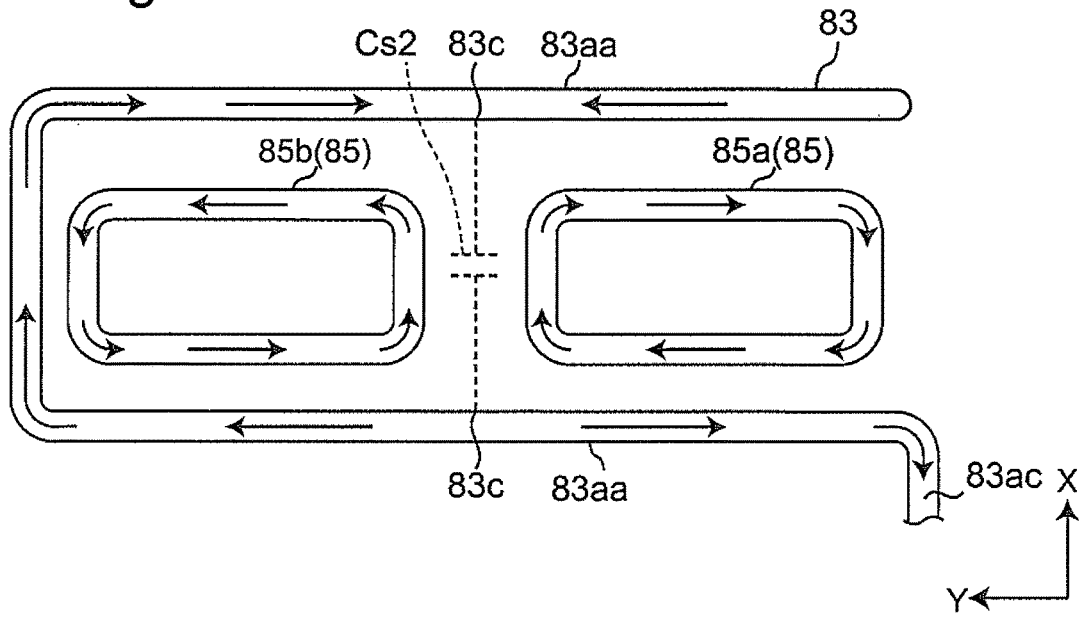
FIG. 19C is an explanatory view showing current flowing through a part of the antenna pattern in the wireless communication device of the sixth embodiment.

FIG. 19 is a plan view showing a part of the antenna pattern 83 of FIG. 18. FIG. 19B is an equivalent circuit diagram of the antenna pattern 83 shown in FIG. 19A. FIG. 19C is an explanatory view showing a current flowing through FIG. 19A when receiving an electromagnetic wave in the band of higher frequencies than the communication frequency.

As shown in FIG. 19B, the line-to-line capacitance pattern 85 generating capacitance between specific regions of the first antenna element 83a includes the line-to-line capacitance pattern 85a and the line-to-line capacitance pattern 85b having a circumferential length shorter than that of the line-to-line capacitance pattern 85a. The line-to-line capacitance patterns 85a and 85b are arranged between confronting regions of the antenna pattern 83, spaced apart from each other along the direction of extension of the antenna pattern 83. The line-to-line capacitance patterns 85a and 85b generate capacitance between specific confronting regions of the first antenna element 83a. Thus, the LC parallel resonant circuit S is configured from the line-to-line capacitance patterns 85a arranged between confronting portions facing each other of the first antenna element 83a. In other words, the LC parallel resonant circuit S is configured from part of the antenna pattern 83 including the confronting regions sandwiching the line-to-line capacitance pattern 85 therebetween and the line-to-line capacitance pattern 85. The plurality of LC parallel resonant circuits S are formed in series with and in parallel with the path of the first antenna element 83a. These plural LC parallel resonant circuits S resonate at a frequency in the band of higher frequencies than the communication frequency.

Inductance Lm shows an inductance component lying in a distributed manner on the first antenna element 83*a*. Inductance Ln shows an inductance component lying in a distributed manner on the line-to-line capacitance pattern 85. The inductance Lm of the first antenna element 83 and the inductance Ln of the line-to-line capacitance pattern 85 confronting each other are magnetically coupled together. The first antenna element 83*a* and the line-to-line capacitance pattern 85 have an electrostatic capacity Cs1 therebetween. Since the adjacent rectilinear portions 83*aa* of the first antenna element 83*a* and the line-to-line capacitance pattern 85 have their respective electrostatic capacities Cs1 therebetween, these electrostatic capacities Cs1 capacitively couple the adjacent rectilinear portions 83*aa* of the first antenna element 83*a* together. Let Cs2 be the electrostatic capacity between the adjacent rectilinear portions 83*aa*. Due to the arrangement of the line-to-line capacitance patterns 85 between the wiring pattern of the first antenna element 83*a*, the confronting portions 83*c* of the first antenna element 83*a* having no line-to-line capacitance pattern 85 therebetween do not include portions cancelling the eddy current, thus maximizing the eddy-current-based potential difference without cancelling the magnetic field between the adjacent rectilinear portions 83*aa*.

When the antenna pattern 83 is irradiated with an electromagnetic wave in the band of higher frequencies than the communication frequency, as shown in FIG. 19C, reverse currents flow through the first antenna element 83*a* with respect to the confronting portion 83*c* as a border by the electrostatic capacity Cs2. These currents increase the potential difference between the confronting portions 83*c*.

Due to the electromagnetic field coupling between the first antenna element 83*a* and the line-to-line capacitance pattern 85, eddy currents flow, inside the line-to-line capacitance pattern 85, in the reverse direction to the adjacent first antenna element 83*a*. This eddy current induces the generation of a magnetic field. This generation of the magnetic field turns a part of electric power fed to the LC parallel resonant circuit into a magnetic field energy, allowing heat to be generated by the magnetic loss of the line-to-line capacitance pattern 85, resulting in a gradual energy loss. Since the band of higher frequencies than the communication frequency can be attenuated in this manner, the LC parallel resonant circuit functions as the band elimination filter.

The RFID tag 81 of the sixth embodiment is directed to a lunch box, etc. in the convenience stores for example, as application commodities, and hence it is assumed that the RFID tag 81 is dielectrically heated by the so-called "microwave oven" that is an electromagnetic wave heating apparatus for cooking. The use frequency of the microwave as an electromagnetic wave used in the "microwave oven" is in the band of frequencies of 2.4 to 2.5 GHz that is the band of higher frequencies than the communication frequency. Accordingly, the RFID tag 81 of the sixth embodiment comprises the "band elimination filter" as a circuit for attenuating this frequency band level to a great extent. The "band elimination filter" is a filter circuit that attenuates the band of higher frequencies than the communication frequency. The RFID tag 81 of the sixth embodiment attenuates a frequency band higher than 1.1 GHz for example. In particular, a remarkable attenuation is achieved for the frequencies (2.4 to 2.5 GHz) of the heating electromagnetic wave used in the "microwave oven". The "band elimination filter" is configured by arranging the looped conductor patterns between the confronting regions of the antenna pattern. Furthermore, by arranging, in the vicinity of an electric field radiation antenna, closed loop-shaped conductor patterns acting as a magnetic field antenna at a frequency of the heating electromagnetic wave, the antenna radiation efficiency of the electric field radiation antenna at a frequency of the heating electromagnetic wave is attenuated to a great extent, rendering hard the reception of energy of the heating electromagnetic wave. In this case, the circumferential length of the looped conductor pattern is smaller than ½ wavelength of the UHF-band frequency used for communication. This allows the conductor pattern to behave as a magnetic field antenna at a frequency higher than the UHF-band frequencies so that the radiation efficiency in the band of higher frequencies than the UHF-band frequencies can be attenuated. The difference between the circumferential length of the looped conductor pattern and ½ wavelength of the frequency of the heating electromagnetic wave may be smaller than the difference between the circumferential length of the looped conductor pattern and ½ wavelength of the UHF-band frequencies used in communication. In consequence, the radiation efficiency in the vicinity of the frequency of the heating electromagnetic wave can be more attenuated than that near the UHF-band frequencies.

The operation principle of the band elimination filter will be described in more detail. As shown in FIGS. 18 and 19B, in the RFID tag 81 of the sixth embodiment, the line-to-line capacitance pattern 85 as the looped conductor pattern is disposed between confronting regions of the antenna pattern 83 so that a plurality of LC parallel resonant circuits S are formed along the path of the first antenna element 83*a*, these LC parallel resonant circuits S making up the "band elimination filter". Each LC parallel resonant circuit S of a plurality of LC parallel resonant circuits S is set to parallel-resonate with frequencies in the frequency band of 2.4 to 2.5 GHz so as to act as the magnetic field antenna. The line length of each LC parallel resonant circuit S is set shorter than ½ wavelength ($\lambda/2$) of the frequency (2.4 to 2.5 GHz) of the heating electromagnetic wave used in the "microwave oven". The LC parallel resonant circuits S are arranged to make up a series circuit and a parallel circuit, with the parallel resonant circuits S being formed for magnetic coupling or electric field coupling with each other so as to act as a magnetic field antenna in a wide band of 2.4 to 2.5 GHz, thereby configuring a plurality of magnetic field antennas in the vicinity of the first antenna element 83*a* acting as the electric field antenna. Since this magnetic field antenna and the first antenna element 83*a* acting as the electric field antenna are coupled together by the electrostatic capacity, the first antenna element 83*a* is allowed at respective portions of the pattern to partially act as a magnetic field antenna. For this reason, the antenna radiation characteristics of the first antenna element 83*a* as the electric field antenna pattern sharply deteriorate. The reception energy of the first antenna element 83*a* as the electric field antenna pattern is consumed in the heat by the magnetic field antenna. This attenuates the electromagnetic wave reception level of the electric field antenna pattern and disperses the heat generation points. The circumferential length of the line-to-line capacitance patterns 85*a* and 85*b* is set so as to be shorter than ½ wavelength ($\lambda/2$) of the frequency (2.4 to 2.5 GHz) of the heating electromagnetic wave.

Figure 28:
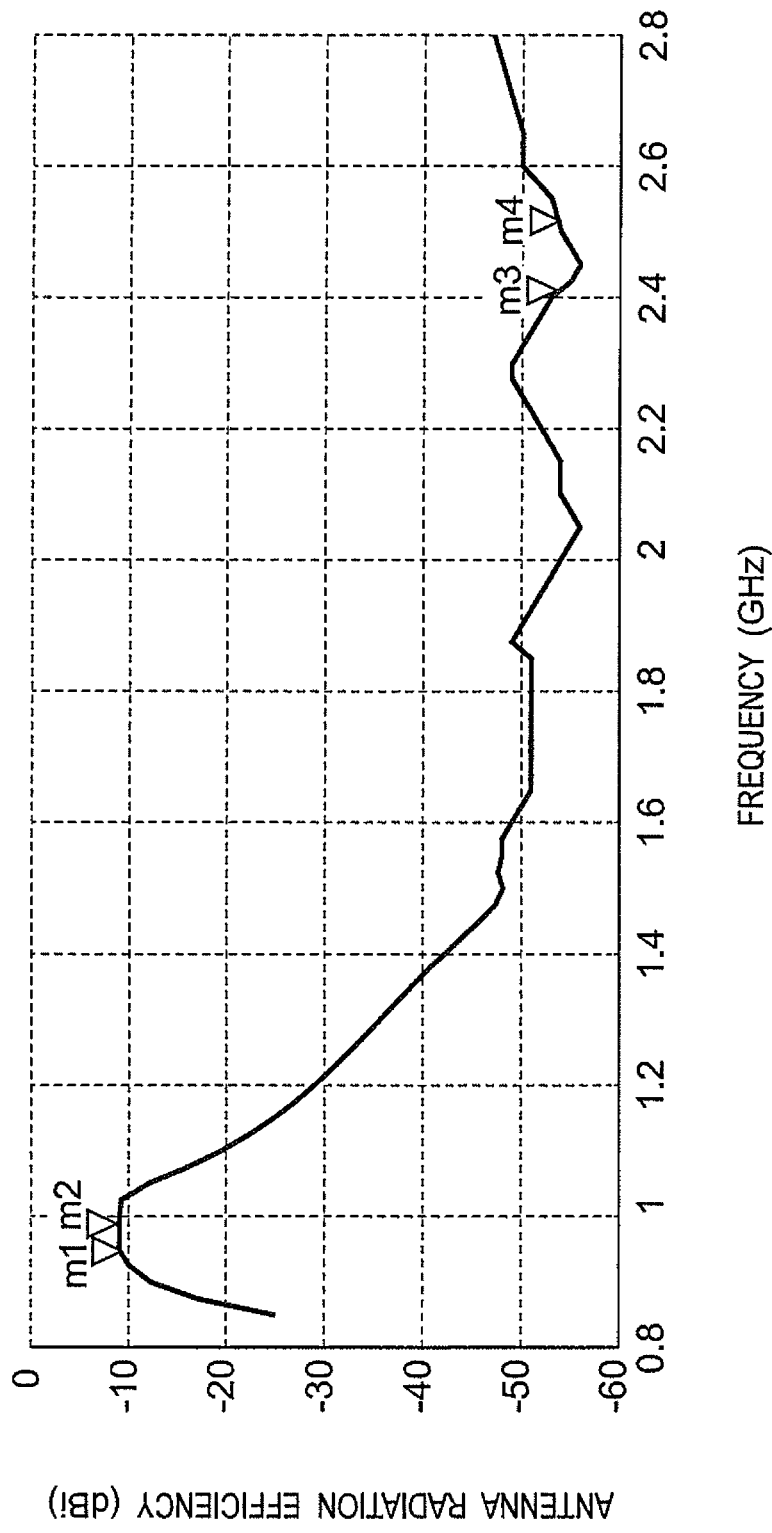
FIG. 28 is a frequency characteristic diagram showing the result of simulation experiments in the wireless communication device of the sixth embodiment.
Figure 29:
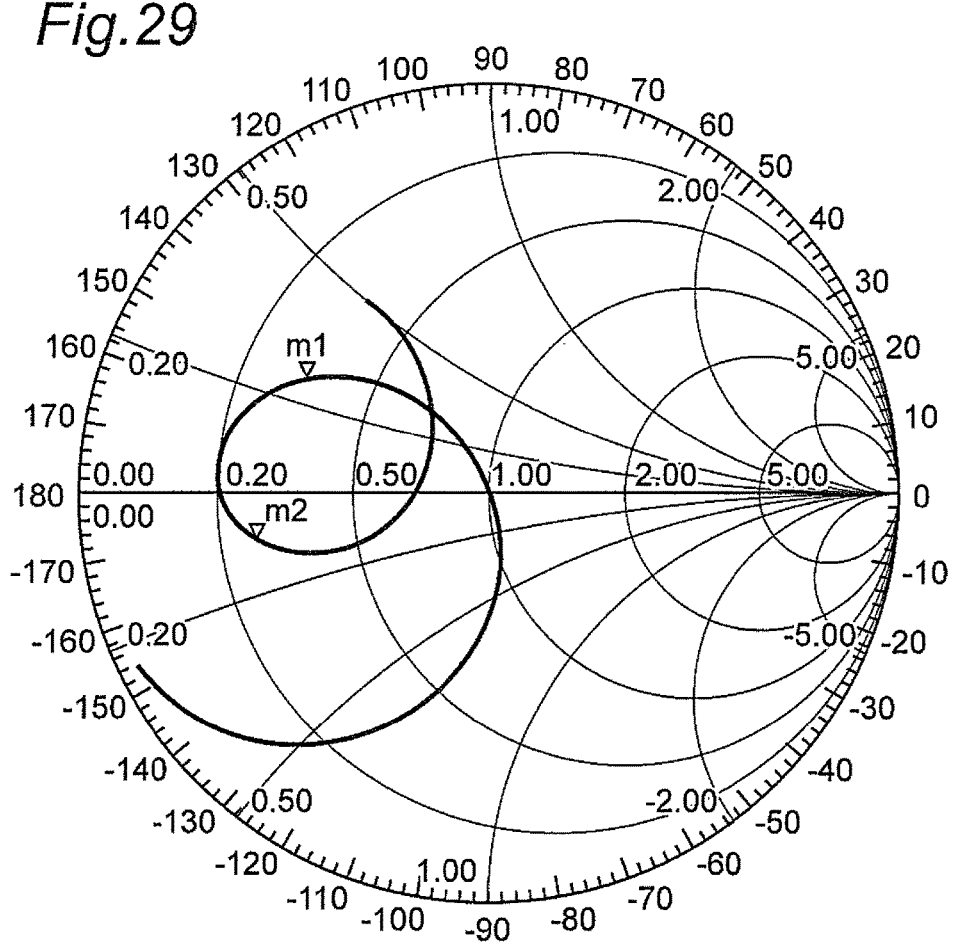
FIG. 29 is a Smith chart of the simulation experiments on the wireless communication device of the sixth embodiment.

FIG. 28 is a frequency characteristic diagram showing the result of simulation experiments effected on the RFID tag 81 of the sixth embodiment. FIG. 29 is an exemplary Smith chart in the simulation experiments on the RFID tag 81 of the sixth embodiment. In the frequency characteristic diagram of the antenna radiation efficiency shown in FIG. 28, the power feed level was −10 dB at the frequency of 0.86 GHz indicated by ▼m1, while the power feed level was −9.6 dB at the frequency of 0.92 GHz indicated by ▼m2. The power feed level is −53 dB at the frequency of 2.4 GHz designated by ▼m3, which is the frequency of the heating electromagnetic wave used in the "microwave oven", while it is −54 dB at the frequency of 2.4 GHz designated by ▼m4, from which it can be seen that the power feed level is attenuated to a great extent. It can also be understood that the band of higher frequencies than the communication frequency is attenuated without being limited to 2.4 to 2.5 GHz. For example, the frequency of approx. 1.2 GHz or more is attenuated to −30 dB or more.

As shown in the Smith chart of FIG. 29, at the frequency of 0.86 GHz indicated by ▼m1 and at the frequency of 0.92 GHz indicated by ▼m2, it is in the receivable state for impedance characteristics. As to the RFID tag 81 of the sixth embodiment, it is obtained from the simulation experiments that at the frequency of 2.4 GHz indicated by ▼m3 and the frequency of 2.5 GHz indicated by ▼m4, it is in the substantially short-circuited state (a marker lies at a point 0Ω at the left end in the Smith chart).

As described above, it can be understood in the RFID tag 8 of the sixth embodiment that a high-frequency signal (radio signal) having UHF-band communication frequencies (900 MHz band, e.g. 920 MHz) is in a transmittable/receivable frequency band whereas the heating frequencies (2.4 to 2.5 GHz) used in the "microwave oven" as the electromagnetic wave heating apparatus is in a frequency band where the power feed level is attenuated to a great extent (approx. −50 dB). This shows that the power of 1000 W of electromagnetic wave heating apparatus is attenuated to 0.1 or below and shows that sharp overheating and ignition are hard to occur.

In this manner, in the RFID tag 81 of the sixth embodiment, the feed level is attenuated to a great extent (approx. −50 dB) at the heating frequencies (2.4 to 2.5 GHz) used in the "microwave oven", but the feed level is not completely zero. Specifically, when the RFID tag 81 of the sixth embodiment is dielectrically heated together with an article by the "microwave oven", an extremely small current flows through the antenna pattern 83 (83a and 83b). This extremely small current is transmitted from the antenna pattern 83 to the line-to-line capacitance pattern 85 by the capacitive coupling and generates heat by the magnetic loss of the line-to-line capacitance pattern 85 forming the magnetic field antenna, leading to a gradual energy loss. As a result, the antenna substrate 5 deforms by melting or carbonizing, to disconnect the line-to-line capacitance pattern 85 and/or a part of the antenna pattern 83. Since this disconnection of the antenna pattern 83 occurs between the closed loops of the line-to-line capacitance patterns 85, the antenna pattern 83 is divided to an electrical length of ¼ wavelength (λ/4) or less of the heating frequency (2.4 to 2.5 GHz). This pattern disconnection makes it more difficult that the antenna pattern 83 receives the heating frequency (2.4 to 2.5 GHz).

Figure 30A:
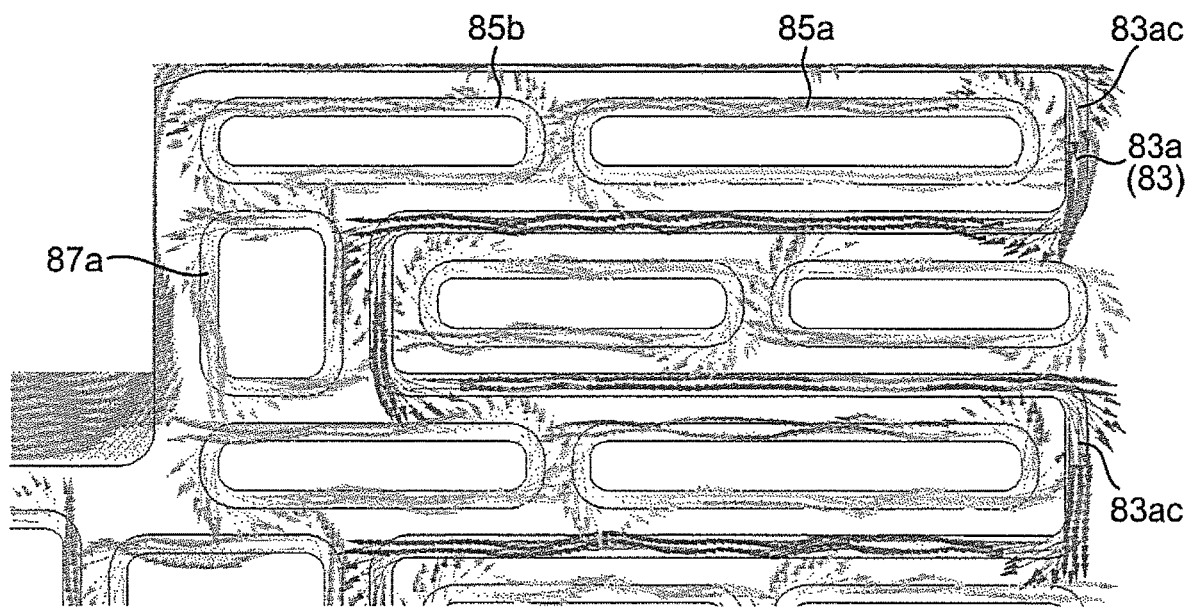
FIG. 30A is a diagram showing how current flows when receiving a signal of a UHF-band communication frequency (920 MHz) in the wireless communication device of the sixth embodiment.
Figure 30B:
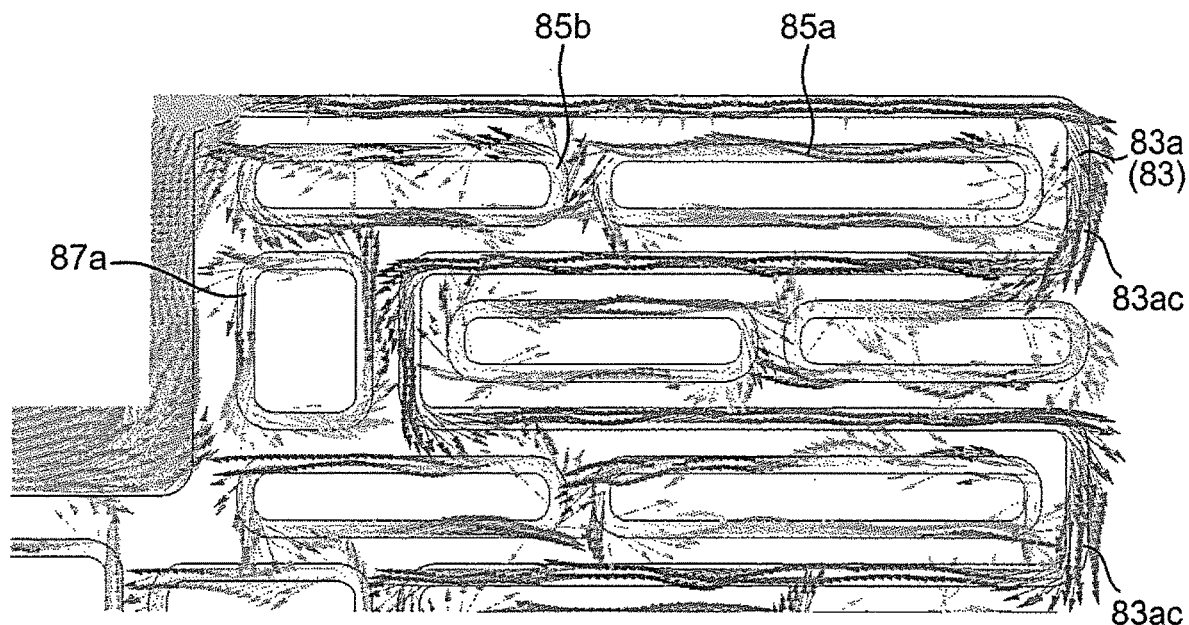
FIG. 30B is a diagram showing how current flows when receiving a signal of a heating frequency (2.4 GHz) used in an electromagnetic wave heating apparatus ("microwave oven") in the wireless communication device of the sixth embodiment.

FIG. 30A is a diagram obtained from simulation experiments of the RFID tag 81 of the sixth embodiment on how current flows when receiving a signal of a UHF-band communication frequency (920 MHz). FIG. 30B is a diagram obtained from simulation experiments on how current flows when receiving a signal of a heating frequency (2.4 GHz) used in the "microwave oven". FIGS. 30A and 30B show, by black and white achromatic colors, the one-color-indicated result of the magnitude of current flowing through the antenna pattern 83 (83a and 83b) and the line-to-line capacitance patterns 85 (85a and 85c) upon reception. As shown in FIG. 30A, it can be seen that when irradiated with an UHF-band electric field, current concentrates at the antenna element 83a of the antenna pattern 83 so that the antenna element 83a functions as the antenna. As shown in FIG. 30B, it can be seen that when irradiated with an electric field of 2.4 GHz, the energy is dispersed among the antenna element 83a of the antenna pattern 83, the line-to-line capacitance patterns 85a and 85b, and the shield pattern 87.

Figure 31A:
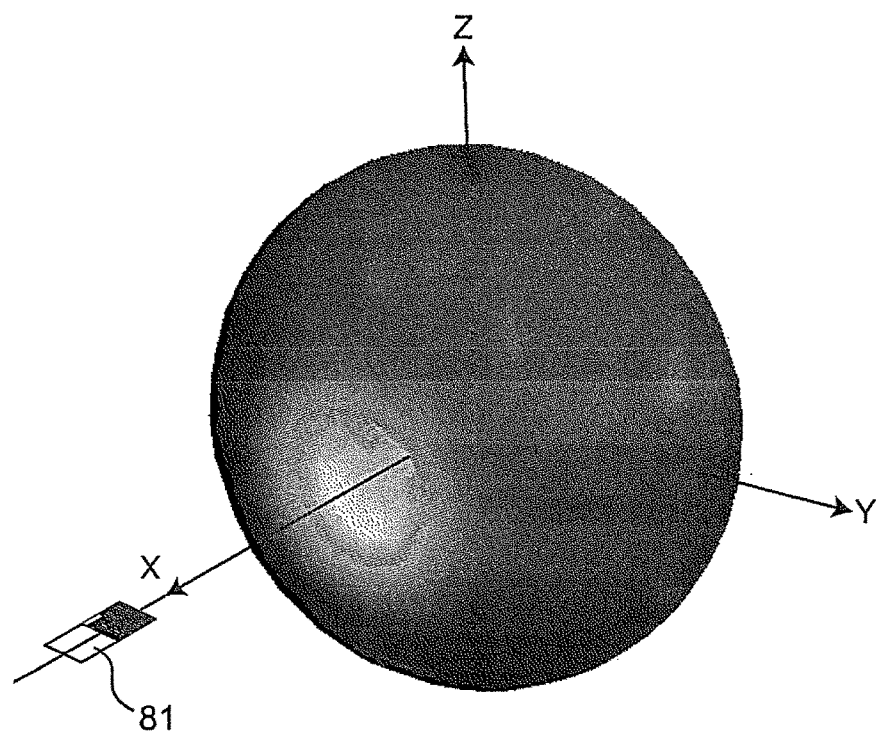
FIG. 31A is a diagram showing gains for all directions related to the wireless communication device of the sixth embodiment.
Figure 31B:
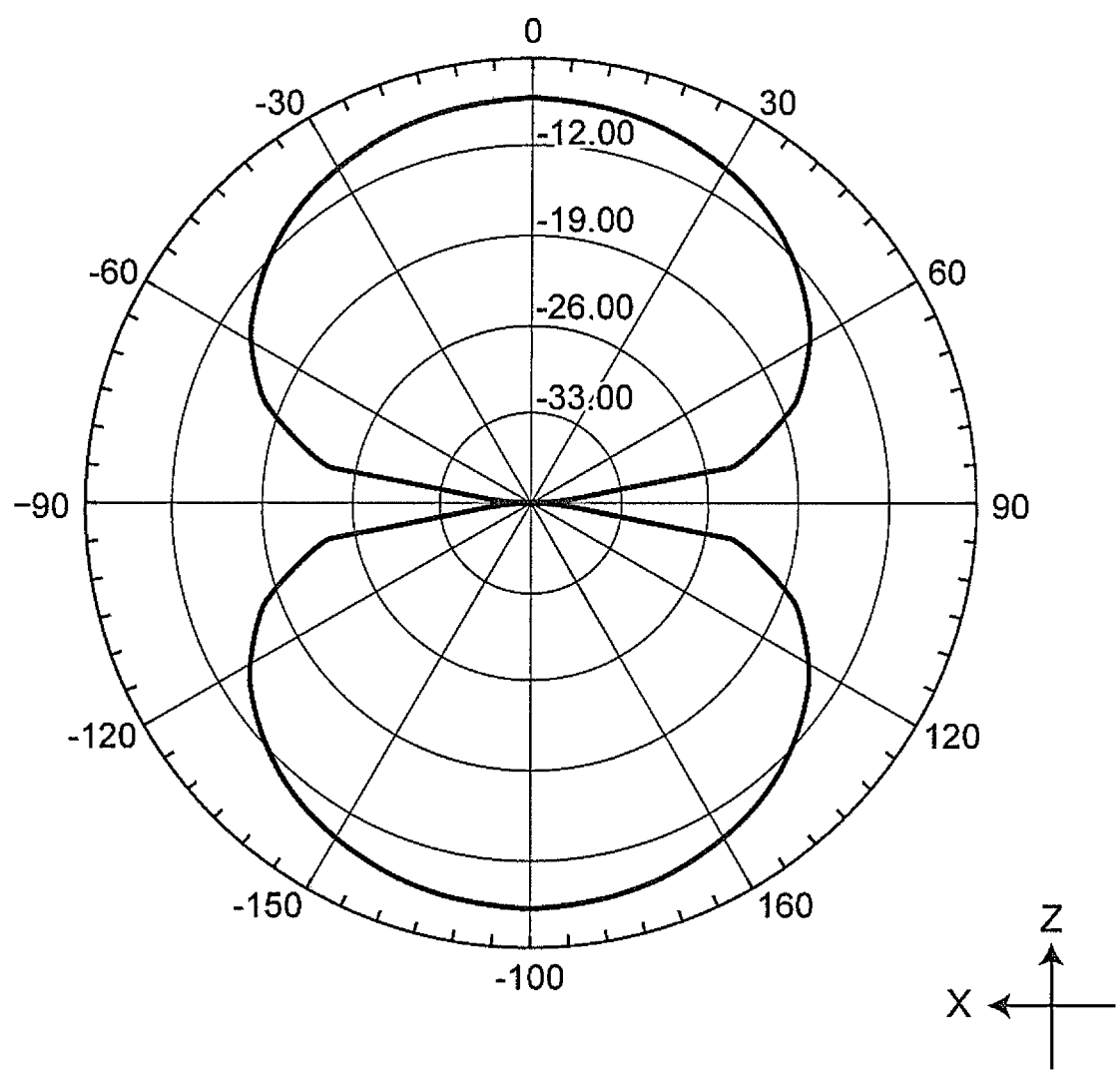
FIG. 31B is a diagram showing gains on an XZ plane of FIG. 12A, related to the wireless communication device of the sixth embodiment.

FIG. 31A is a diagram showing gains for all directions related to the RFID tag 81 of the sixth embodiment. X-direction in FIG. 31A represents the longitudinal direction of the RFIC package 2 in the RFID tag 81. As shown in FIGS. 31A and 31B, the RFID tag 81 has a higher gain in Y-direction and Z-direction and has a wide directivity in Y-direction and Z-direction. The RFIC package 2 has a slightly lower gain in its longitudinal direction (X-direction) only as compared with the other directions but has a generally wide directivity.

Although in the RFID tag 81 of the sixth embodiment, all LC parallel resonant circuits S in the plurality of LC parallel resonant circuits S configured from the antenna pattern 83 and the line-to-line capacitance patterns 85 are set so as to resonate with frequencies of the frequency band (2.4 to 2.5 GHz) used in the electromagnetic wave heating apparatus, in the exemplary embodiments of the present disclosure, all of the LC parallel resonant circuits S need not necessarily resonate with frequencies used in the electromagnetic wave heating apparatus. Configuration may be such that in the case where the RFID tag 1 is dielectrically heated by the electromagnetic wave heating apparatus, current flowing through the antenna pattern 83 can be attenuated to a great extent.

As described above, the RFID tag 81 as the wireless communication device of the sixth embodiment is a wireless communication device for transmitting/receiving a high-frequency signal having a first frequency of e.g. 900 MHz band for communication. The RFID tag 81 comprises the first antenna element 83a of the antenna pattern 83 having rectilinear portions as confronting regions each facing the other; and the RFIC chip 9 connected electrically to the antenna pattern 83. The RFID tag 81 comprises the line-to-line capacitance pattern 85a as a looped conductor pattern disposed between the confronting regions of the first antenna element 83a. The circumferential length of the line-to-line capacitance pattern 85a is smaller than ½ wavelength of the electromagnetic wave of the first frequency. The antenna pattern 83 and the line-to-line capacitance pattern 85 make up the "band elimination filter" of the LC parallel resonant circuit S. For this reason, even if the RFID tag 81 is irradiated with an electromagnetic wave of a second frequency higher than the first frequency, the line-to-line capacitance pattern 85a acting as the magnetic field antenna generates a magnetic field, so that the energy of the electromagnetic wave of the second frequency can be reduced. If even a single line-to-line capacitance pattern 85a is disposed on the RFID tag 81, the energy irradiated around the line-to-line capacitance pattern 85a can be reduced, so that the goods around the line-to-line capacitance pattern 85a can be prevented from flaring up.

When the RFID tag 81 of the sixth embodiment is dielectrically heated by the electromagnetic wave heating apparatus, inducted current flows through the looped line-to-line capacitance pattern 85. Thus, this line-to-line capacitance pattern 85 functions as a small-sized magnetic field antenna at the frequency of the electromagnetic wave heating apparatus, providing a configuration where the electric field energy radiated from the electromagnetic wave heating apparatus is reflected and is hard to receive. As a result, the RFID tag 81 is configured to be hard to ignite by the electromagnetic wave heating apparatus and further to be able to reflect or lose the received electric field energy (electric power) in the form of magnetic field energy. Accordingly, the RFID tag 81 of the sixth embodiment is configured to be able to attenuate the power feed level to a large extent at the time of dielectric heating.

By arranging a plurality of line-to-line capacitance patterns as the looped conductor patterns, the RFID tag 81 can further reduce the energy irradiated around the antenna pattern 83. Since the adjacent line-to-line capacitance patterns 85*a* and 85*b* have their respective different circumferential lengths, the line-to-line capacitance patterns 85*a* and 85*b* provide their respective different magnetic field antenna frequencies, generally configuring a wide band magnetic field antenna of 2.4 GHz to 2.5 GHz band or above. The first resonant frequency by the line-to-line capacitance pattern 85*a* and part of the antenna pattern 83 including the confronting regions sandwiching the line-to-line capacitance pattern 85*a* therebetween is different from the second resonant frequency by the line-to-line capacitance pattern 85*b* and another part of the antenna pattern 83 including confronting regions sandwiching therebetween the other line-to-line capacitance pattern 85*b* arranged adjacent to the line-to-line capacitance pattern 85*a*. Thus, by attaching the RFID tag to a commodity, even though deviation of the resonant frequency occurs by the dielectric constant of the commodity, it is possible to configure a magnetic field antenna interfering with the electric field antenna and to reduce the electromagnetic wave energy.

Due to the formation of the line-to-line capacitance pattern 85 for the antenna pattern 83, the resonant frequency of the RFID tag 81 is fine-tuned. For example, as compared with the resonant frequency (880 MHz) of the antenna pattern 83 in the case of absence of the line-to-line capacitance pattern 85, the antenna resonant frequency becomes higher (approx. 980 MHz) by several 10 MHz because of the formation of the line-to-line capacitance pattern 85.

The RFID tag 81 of the sixth embodiment is configured such that the antenna pattern 83 and the line-to-line capacitance pattern 85 are of a curved surface shape to suppress the concentration of electric field, with the line-to-line capacitance pattern 85*a* being arranged between adjacent turn portions 83*ac* of at least the first antenna element 83*a* and the second antenna element 83*b*, so that when the RFID tag 81 is dielectrically heated by the electromagnetic wave heating apparatus, the concentration of electric field in the turn portions 83*ac* of the first antenna element 83*a* in particular is suppressed.

The above configuration greatly suppresses the occurrence of discharge in the RFID tag 81 of the sixth embodiment even in the case where an article with the RFID tag 81 is dielectrically heated in the electromagnetic wave heating apparatus (microwave oven), thereby preventing the risk of ignition in the article.

When the potential difference between the confronting portions 83*c* exceeds a certain magnitude, a discharge occurs between the confronting portions 83*c*. Accordingly, if irradiated with electromagnetic wave having large energy as from the microwave oven for example, a discharge occurs between the confronting portions 83*c*, allowing the confronting portions 83*c* to be disconnected by heat of the discharge. The first antenna element 83*c* is designed to have a resistance of the level inducing disconnection by the discharge. The antenna substrate 5 has a thickness deformable by heat of the discharge. The thickness of the antenna substrate 5 is 38 μm for example. Since the shape of the antenna pattern 3 on the antenna substrate 5 also deforms in accordance with the deformation of the antenna substrate 5, resonance with the electromagnetic wave irradiated is prevented.

In the case of using the PET film as the antenna substrate 5, the antenna substrate 5 in the confronting portions 83*c* melts by energy strengthening its electric field between the confronting portions 83*c*. The molten antenna substrate 5 immediately under the antenna pattern 3 in the confronting portions 83 pulls the antenna pattern to cause its disconnection. Thus, previous to the occurrence of a discharge between the confronting portions 83*c*, the antenna pattern 3 disconnects at the confronting portions 83*c*.

It is noted that these disconnections occur simultaneously at a plurality of points of the confronting portions 83*c* at the initial stage prior to the heating of the entire antenna substrate 5. Therefore, since the first antenna element 83*a* disconnects simultaneously at plural points, current cannot flow through the first antenna element 83*a*, thereby preventing the temperature of the entire antenna substrate 5 from rising to cause ignition.

The length from confronting portions 83*c* as one end of the rectilinear portion 83*aa* of the antenna element 83*a* between the line-to-line capacitance pattern 85*a* and the line-to-line capacitance pattern 85*b* up to the next confronting portions 83*c* as the other end thereof is set to be ¼ wavelength ($\lambda/4$) of the frequency band of the frequencies (2.4 to 2.5 GHz) of the heating electromagnetic wave. Accordingly, in the case of disconnection at respective confronting portions 83*c*, the respectively finely disconnected antenna elements 83*a* are hard to absorb radio waves of frequencies of the heating electromagnetic wave, whereby a discharge can be prevented from occurring at the antenna pattern 83 after the disconnection.

The positions of the confronting portions 83*c* shift alternately in the width direction (Y-direction) of the antenna substrate 5 in accordance with the position of the antenna substrate 5 in the longitudinal (X-direction), the disconnected portions on the first antenna element 83*a* also appear alternately. This disperses heat generating points arising from disconnection on the antenna substrate 5, to thereby prevent the disconnected portions from linking with each other to cause ignition.

The electrostatic capacity Cs2 is formed only between the rectilinear portions 83*aa* of the adjacent first antenna elements 83*a*. In other words, the electrostatic capacity Cs2 is not formed between the rectilinear portions 83*aa* of the first antenna element 83*a*, beyond one or more rectilinear portions 83*aa* in the longitudinal direction of the antenna substrate 5. Advantageously, t when the confronting portions 83*c* are disconnected, current flow between the rectilinear portions 83*aa* beyond one or more rectilinear portions 83*aa* can be prevented.

Due to the formation of the antenna pattern 83 and the line-to-line capacitance pattern 85 on one surface of the antenna substrate 5, only the one surface can be subjected to an etching process for pattern formation in manufacturing processes. The line-to-line capacitance pattern 85 may be formed on the back surface of the antenna substrate 5. Two or more line-to-line capacitance patterns 85 may be arranged in the confronting direction between respective rectilinear portions 83*aa* of the adjacent first antenna elements 83.

Seventh Embodiment

Figure 20:
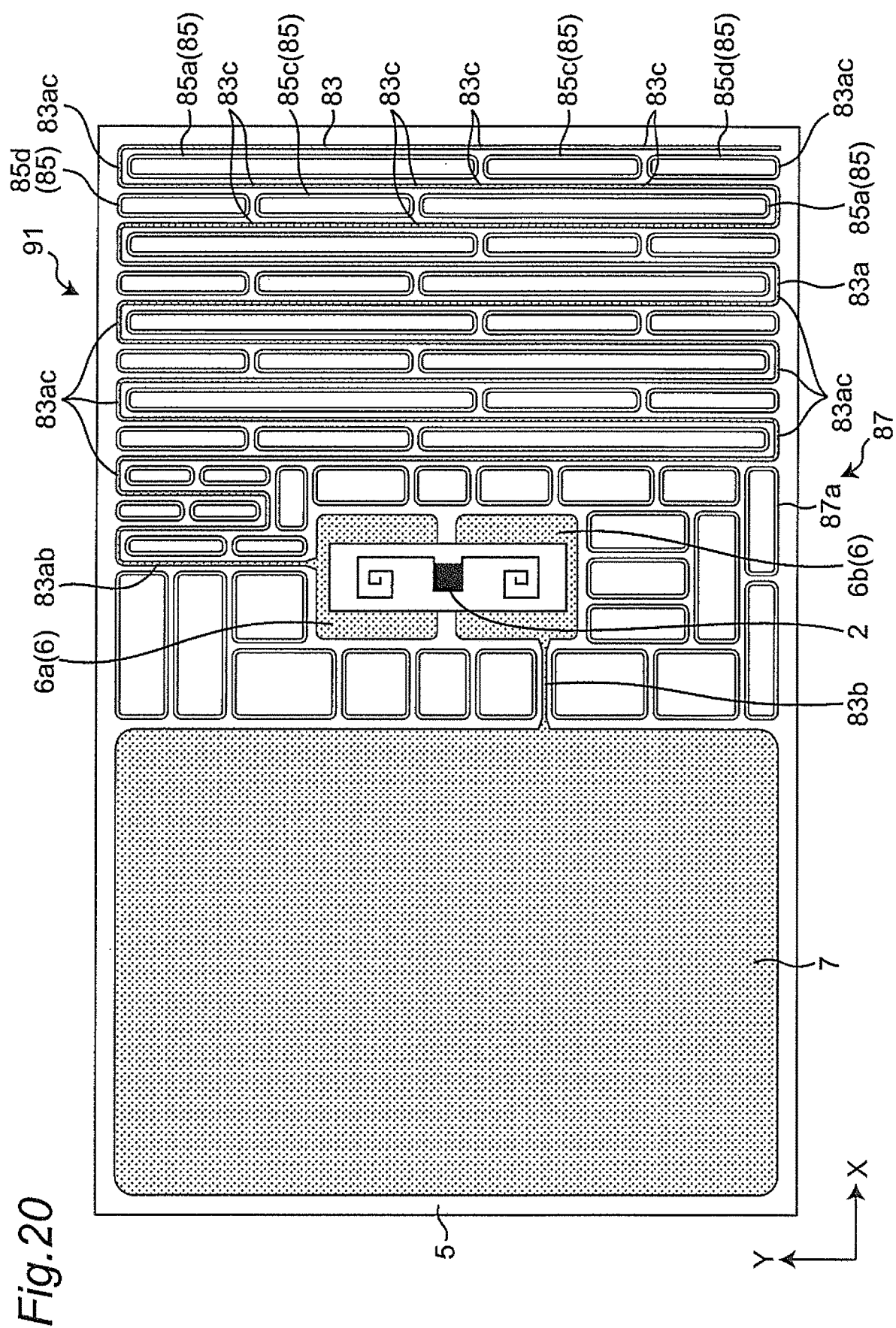
FIG. 20 is a plan view showing a configuration of a wireless communication device (RFID tag) of a seventh embodiment.

Hereinafter, referring to FIG. 20, description will be given of an RFID tag 91 that is a wireless communication device of a seventh exemplary embodiment. FIG. 20 is a plan view showing a configuration of the RFID tag 91 of the seventh embodiment.

As regards the RFID tag 91 of the seventh embodiment, differences from the RFID tag 81 of the sixth embodiment will mainly be described. In description of the seventh embodiment, elements having similar configurations, operations, and functions to those of the sixth embodiment are designated by the same reference numerals and, in some cases, may not again be described for avoiding duplicate description.

Although the RFID tag 81 of the sixth embodiment has two line-to-line capacitance patterns 85a and 85b along the extending direction of the first antenna element 83a, between the rectilinear portions 83aa of the first antenna element 83a, it may comprise three or more line-to-line capacitance patterns. The RFID tag 91 of the seventh embodiment comprises three line-to-line capacitance patterns as an example. Although the lengths in the longitudinal direction (Y-direction) of the line-to-line capacitance patterns 85a and 85b of the sixth embodiment were the length of about half of the rectilinear portions 83aa of the antenna pattern 83, the lengths in the longitudinal direction of the line-to-line capacitance patterns 83c and 85d of the seventh embodiment are even shorter. Although the RFID tag 81 of the sixth embodiment has comprised the second shield pattern, all the shield pattern of the RFID tag 91 of the seventh embodiment is a first shield pattern 87a. The other configurations are substantially the same as those of the RFID tag 1 of the first embodiment.

By dividing the line-to-line capacitance pattern 85b into line-to-line capacitance patterns 85c and 85d having shorter longitudinal lengths for arrangement, it is possible to increase the points of the confronting portions 83c and to increase the points where a discharge occurs. This enables the discharge points to be changed depending on the type of the band of higher frequencies than the communication frequency.

Since the configuration of the seventh embodiment also generates eddy current and therefore a magnetic field at the line-to-line capacitance patterns 85a, 85c, and 85d when receiving a frequency higher than the communication frequency, a part of the fed electric power is lost as the magnetic field energy. Since the first antenna element 83a can be disconnected by increasing the potential difference between the confronting portions 83c to eventually cause a discharge, it can be prevented that the entire RFID tag 91 ignites.

Eighth Embodiment

Figure 21:
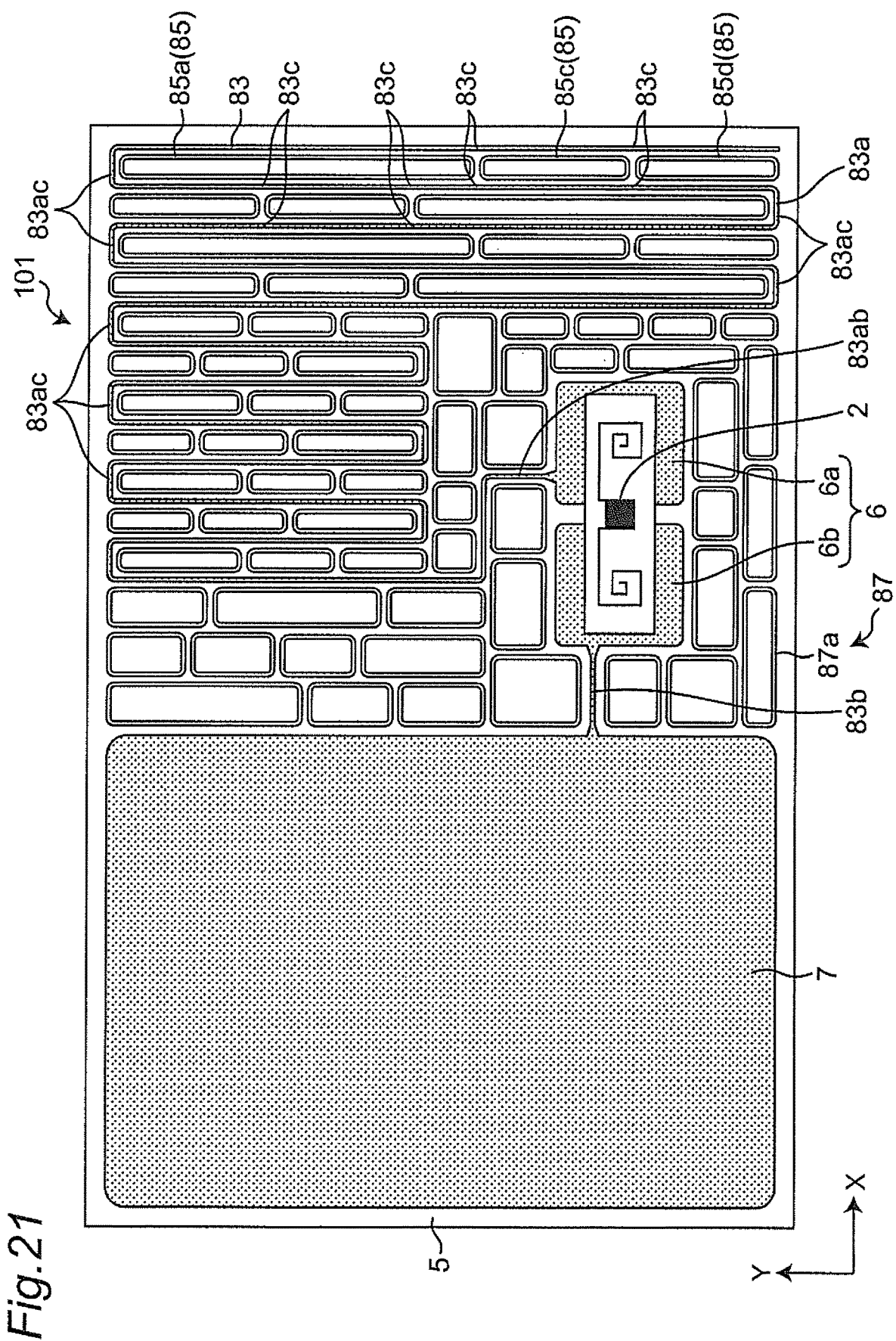
FIG. 21 is a plan view showing a configuration of a wireless communication device (RFID tag) of an eighth embodiment.

Hereinafter, referring to FIG. 21, description will be given of an RFID tag 101 that is a wireless communication device of an eighth exemplary embodiment. FIG. 21 is a plan view showing a configuration of the RFID tag 101 of the eighth embodiment.

As regards the RFID tag 101 of the eighth embodiment, differences from the RFID tag 91 of the seventh embodiment will mainly be described. In description of the eighth embodiment, elements having similar configurations, operations, and functions to those of the seventh embodiment are designated by the same reference numerals and, in some cases, may not again be described for avoiding duplicate description.

Although in the RFID tag 91 of the seventh embodiment, the first land pattern 6a and the second land pattern 6b have been juxtaposed in the width direction on the antenna substrate 5, in the RFID tag 101 of the eighth embodiment the first land pattern 6a and the second land pattern 6b are arranged side by side in the longitudinal direction on the antenna substrate 5. The other configurations are substantially the same as those of the RFID tag 91 of the seventh embodiment.

Since the configuration of the eighth embodiment also generates eddy current and therefore a magnetic field at the line-to-line capacitance patterns 85a, 85c, and 85d when receiving a frequency higher than the communication frequency, a part of the fed electric power is lost as the magnetic field energy. Since the first antenna element 83a can be disconnected by increasing the potential difference between the confronting portions 83c to eventually cause a discharge, it can be prevented that the entire RFID tag 101 ignites.

Ninth Embodiment

Figure 22:
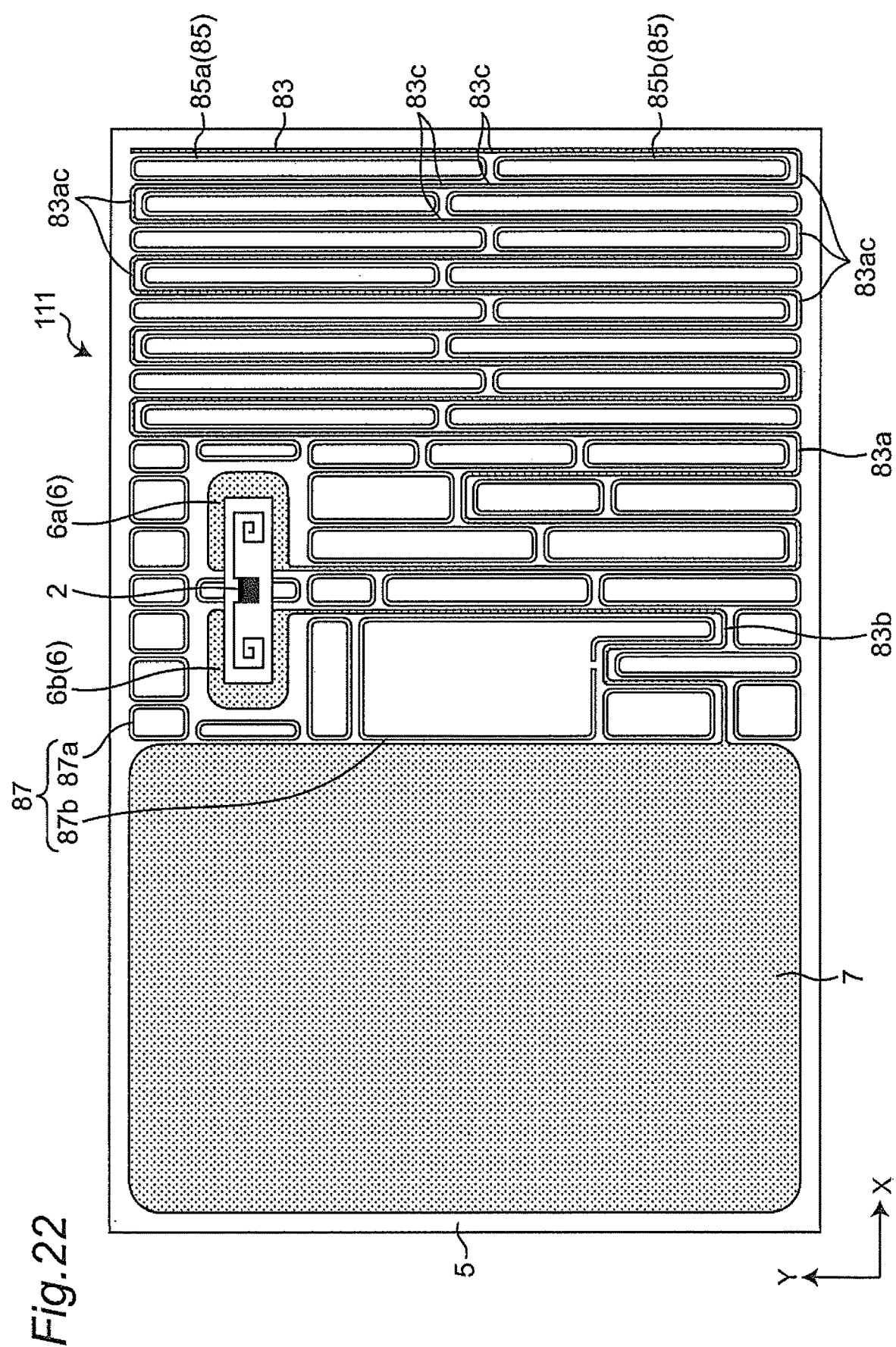
FIG. 22 is a plan view showing a configuration of a wireless communication device (RFID tag) of a ninth embodiment.

Hereinafter, referring to FIG. 22, description will be given of an RFID tag 111 that is a wireless communication device of a ninth exemplary embodiment. FIG. 22 is a plan view showing a configuration of the RFID tag 111 of the ninth embodiment.

As regards the RFID tag 111 of the ninth embodiment, differences from the RFID tag 81 of the sixth embodiment will mainly be described. In description of the ninth embodiment, elements having similar configurations, operations, and functions to those of the sixth embodiment are designated by the same reference numerals and, in some cases, may not again be described for avoiding duplicate description.

Although in the RFID tag 81 of the sixth embodiment, the first land pattern 6a and the second land pattern 6b have been juxtaposed in the width direction on the antenna substrate 5, in the RFID tag 111 of the ninth embodiment the first land pattern 6a and the second land pattern 6b are arranged side by side in the longitudinal direction on the antenna substrate 5. The second antenna element 83b is led from the second land pattern 6b and extends in a meandering manner toward the longitudinal other end of the antenna substrate 5. The other configurations are substantially the same as those of the RFID tag 1 of the first embodiment.

Since the configuration of the ninth embodiment also generates eddy current and therefore a magnetic field at the line-to-line capacitance patterns 85a and 85c when receiving a frequency higher than the communication frequency, part of the fed electric power is lost as the magnetic field energy. Since the first antenna element 83a can be disconnected by increasing the potential difference between the confronting portions 83c to eventually cause a discharge, it can be prevented that the entire RFID tag 111 ignites.

Tenth Embodiment

Figure 23:
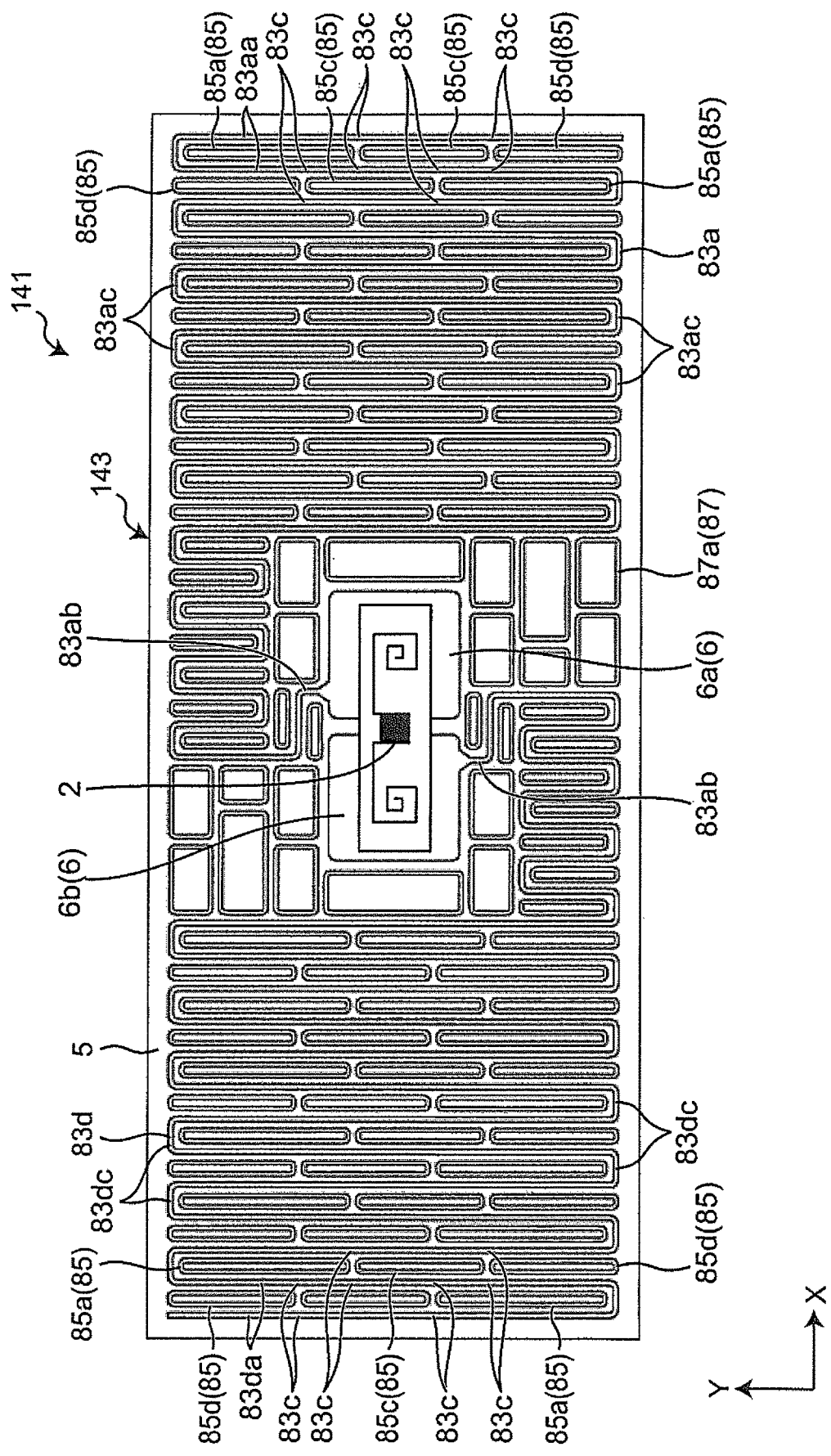
FIG. 23 is a plan view showing a configuration of a wireless communication device (RFID tag) of a tenth embodiment.

Hereinafter, referring to FIG. 23, description will be given of an RFID tag 141 that is a wireless communication device of a tenth exemplary embodiment. FIG. 23 is a plan view showing a configuration of the RFID tag 141 of the tenth embodiment.

As regards the RFID tag 141 of the tenth embodiment, differences from the RFID tag 91 of the seventh embodiment will mainly be described. In description of the tenth embodiment, elements having similar configurations, operations, and functions to those of the seventh embodiment are designated by the same reference numerals and, in some cases, will not again be described for avoiding duplicate description.

In the RFID tag 141 of the tenth embodiment, a meandering antenna pattern 143 is formed so as to meander along the longitudinal direction of the antenna substrate 5 from each of the first land pattern 6a and the second land pattern 6b. For example, the amplitude direction of the meandering antenna pattern 143 is parallel to the width direction of the antenna substrate 5. The antenna pattern 143 includes the meandering first antenna element 83a and a second antenna element 83d disposed substantially point-symmetrically with the first antenna element 83a around the center of the RFID package 2. As long as the second antenna element 83d has a meandering shape, the first antenna element 83a and the second antenna element 83d may be line-symmetrical with each other, instead of the point symmetry. The meandering second antenna element 83d having turn portions 83dc extends from the second land pattern 6b finally toward the other end in the longitudinal direction (−X direction) on the antenna substrate 5.

The line-to-line capacitance pattern 85 is formed between adjacent rectilinear portions of the first antenna element 83a. Similar to the seventh embodiment, the line-to-line capacitance pattern 85 includes the three line-to-line capacitance patterns 85a, 85c, and 85d which are each arranged alternately depending on the amplitude of the meander of the first antenna element 83a. Similarly, the line-to-line capacitance pattern 85 is formed between adjacent rectilinear portions 83da of the second antenna element 83d.

The RFID tag 141 of the tenth embodiment is suited to the case of attachment to nonmetal goods for example. In the case where the article is a lunchbox for example, due to absence of a metal portion, the RFID tag 141 having two meandering antenna elements has more improved communication characteristics at the communication frequency, than the RFID tag having the widened portion 7. Even when receiving a higher frequency than the communication frequency, the RFID tag 141 generates eddy current and therefore a magnetic field at the line-to-line capacitance patterns 85a, 85c, and 85d, similar to the RFID tag 91, thereby allowing a part of the fed electric power to be lost as the magnetic field energy. Since the first antenna element 83a can be disconnected by increasing the potential difference between the confronting portions 83c to eventually cause a discharge, it can be prevented that the entire RFID tag 1 ignites.

Eleventh Embodiment

Figure 24:
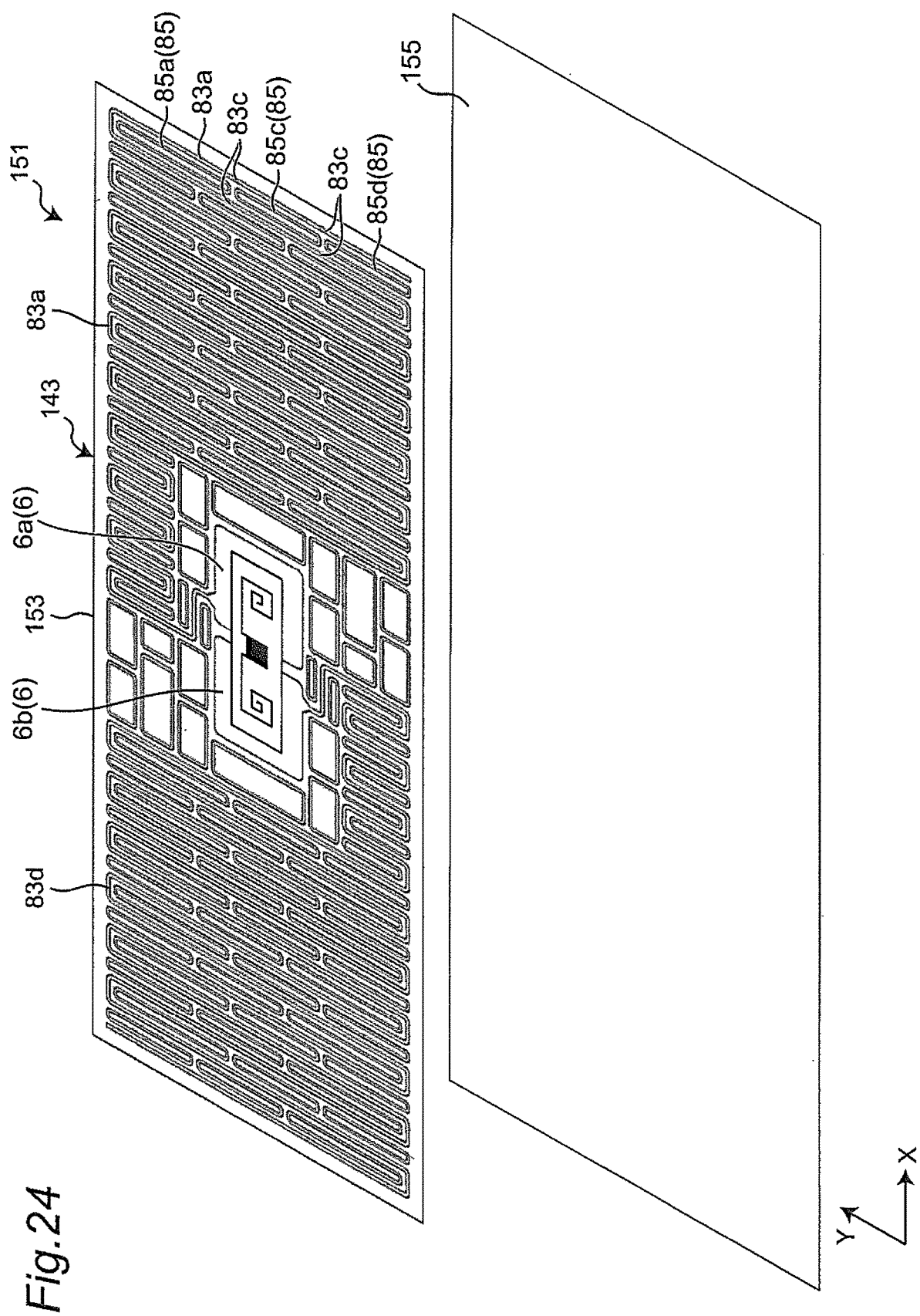
FIG. 24 is an exploded perspective view showing a configuration of a wireless communication device (RFID tag) of an eleventh embodiment.

Hereinafter, referring to FIG. 24, description will be given of an RFID tag 151 that is a wireless communication device of an eleventh exemplary embodiment. FIG. 24 is an exploded perspective view showing a configuration of the RFID tag 151 of the eleventh embodiment.

As regards the RFID tag 151 of the eleventh embodiment, differences from the RFID tag 141 of the tenth embodiment will mainly be described. In description of the eleventh embodiment, elements having similar configurations, operations, and functions to those of the tenth embodiment described above are designated by the same reference numerals and, in some cases, may not again be described for avoiding duplicate description.

Although the antenna substrate 5 of the RFID tag 141 of the tenth embodiment uses the flame-retardant antenna substrate 5 similar to the antenna substrate 5 of the first embodiment, the eleventh embodiment comprises a normal antenna substrate 153 and a flame-retardant base substrate 155, instead of using the flame-retardant antenna substrate 5 exemplified in the first embodiment. The base substrate 155 is adhered via an adhesive such as a double-sided tape to the undersurface of the antenna substrate 153. The other configurations of the antenna pattern 143, etc. of the RFID tag 151 of the eleventh embodiment are similar to the RFID tag 142 of the tenth embodiment.

The antenna substrate 153 is made of PET film for example and may not have a flame retardance. The thickness of the antenna substrate 153 is 38 μm for example. The base substrate 155 has a higher flame retardance than the antenna substrate 153 and has a flame retardance of the order of 200° C. in heat resistance. The base substrate is a polyester-based film for example. The thickness of the base substrate 155 is about 25 to 50 μm for example.

The line width of the first antenna element 83a and the second antenna element 83d is 125 μm for example. The resistance value of the first antenna element 83a from the first land pattern 6a to the tip is 5Ω to 15Ω for example. The second antenna element 83d also has a similar resistance value. Since the first antenna element 83a and the second antenna element 83d have such a degree of resistance value, when receiving a higher frequency than the communication frequency, disconnection is easy to occur at the confronting portions 83c. The line width of the line-to-line capacitance patterns 85a, 85c, and 85d is narrower than that of the first and the second antenna elements 83a and 83d and is 100 μm for example.

Due to such a configuration, when the RFID tag 151 receives a higher frequency than the communication frequency, if the energy is large, the antenna pattern is overheated to a high temperature as a result of reception of the electromagnetic wave energy by the antenna pattern 143. In particular, a high temperature is easy to occur at one or some of the confronting portions 83c. A high-temperature part of the antenna brings about a minute spark discharge and a part of the antenna pattern 143 overheated to a high temperature sublimates, as a result of which the antenna substrate 153 adjacent to the antenna pattern 143 heated to a high temperature by the heat also melts out or contracts, making it hard to keep its base shape to consequently disconnect the antenna pattern 143. As a result of melting-out or contraction of the peripheral antenna substrate 153 overheated to a high temperature, the base substrate 155 in the vicinity thereof melts out without burning due to its flame retardance. The periphery of the metal conductor of the peripheral antenna pattern 143 inducing a minute spark discharge is coated with this molten base substrate 155. Accordingly, even though the RFID tag 151 generally contracts and curves by the deformation arising from a discharge or heat, the disconnected antenna pattern 143 is enveloped by a part of the molten base substrate 155 as an insulator, whereupon the antenna patterns 143 remain separated from each other, thereby making it possible to suppress the contact of the antenna patterns 143 with each other. This can prevent the antenna pattern receiving a higher frequency than the communication frequency from being reconfigured. The insulation properties between the wiring of the antenna pattern 143 can also be maintained.

When there is no base substrate 155, when the antenna substrate 153 having no flame retardance melts and contracts around the discharge point, the metal conductors making up the antenna pattern 143 may possibly come into contact with each other. The antenna pattern incapable of receiving a higher frequency than the communication frequency due to its disconnection results in an antenna pattern of a new pattern by the contact. This enables a higher frequency than the communication frequency to again be received, with a risk of further discharge at a part of the new antenna pattern. In this manner, the RFID tag 151 without the base substrate 155 may have a risk to generate a continuous discharge.

The RFID tag 151 of the eleventh embodiment can employ an inexpensive film for the antenna substrate 153 and can employ an inexpensive heat-resistant film for the base substrate 155, thus achieving a cost reduction. Even though a discharge occurs at a part of the antenna pattern 143 and the antenna substrate 153 there around has molten, the molten base substrate 155 envelopes the periphery of the disconnected antenna pattern 143 so that the disconnected state can be maintained. Accordingly, the antenna pattern 143 cannot again receive a higher frequency than the communication frequency. Furthermore, by enveloping the antenna pattern 143 by the molten base substrate 155, it can be prevented, even though the RFID tag 151 deforms due to the heat of fusion, that short-circuit is again established to configure a new antenna pattern. It is to be noted that the material of the flame-retardant antenna substrate 5 exemplified in the first embodiment may be employed for the base substrate 155.

Twelfth Embodiment

Figure 25:
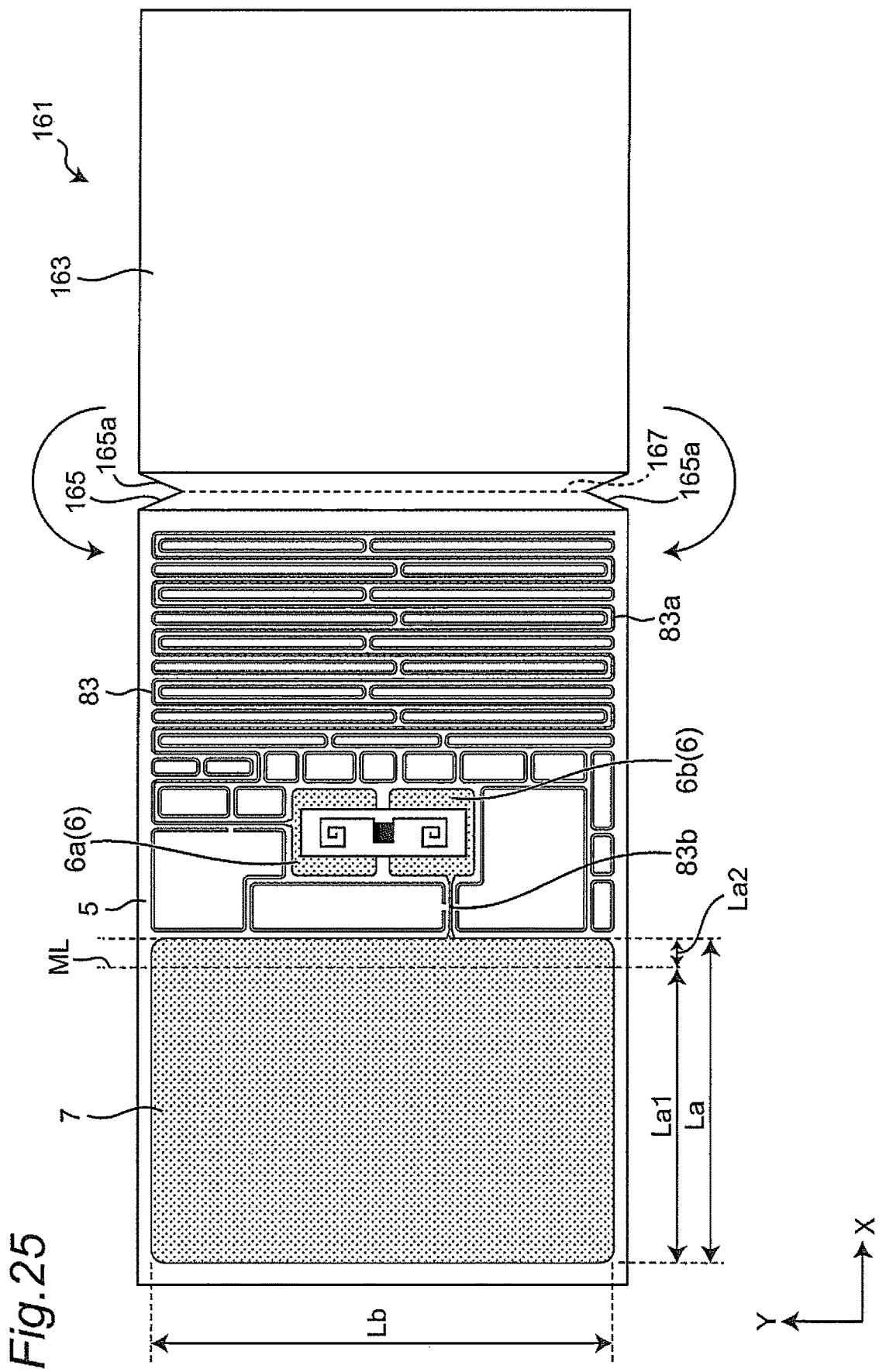
FIG. 25 is a plan view showing a configuration of a wireless communication device (RFID tag) of a twelfth embodiment.

Hereinafter, referring to FIG. 25, description will be given of an RFID tag 161 that is a wireless communication device of a twelfth exemplary embodiment. FIG. 25 is a plan view showing a configuration of the RFID tag 161 of the twelfth embodiment.

As regards the RFID tag 161 of the twelfth embodiment, differences from the RFID tag 91 of the seventh embodiment will mainly be described. In description of the twelfth embodiment, elements having similar configurations, operations, and functions to those of the seventh embodiment described above are designated by the same reference numerals and, in some cases, may not again be described for avoiding duplicate description.

When the RFID tag has the widened portion 7 like the RFID tag 161 of the twelfth embodiment, when attached to an article, it is preferred that an overlapping region between the article and the RFID tag 161 lies within the region of the widened portion 7 (see FIG. 3B). In the RFID tag 161, the antenna pattern 83 is designed assuming the antenna substrate 5 and the air dielectric constant. Therefore, if the RFID tag 161 is attached to the article in a manner overlapping with the antenna pattern 83 beyond the region of the widened portion 7, the dielectric constant of a part of the antenna pattern 83 differs from the assumed dielectric constant. This results in formation of a zone shortening the received wavelength, thus forming a zone in which the electromagnetic wave energy concentrates even at a higher frequency than the communication frequency.

For example, if the RFID tag 161 is attached to an article with a large dielectric constant such as ceramic in a manner overlapping with the antenna pattern 83 beyond the region of the widened portion 7, there occur not only the frequency deviation in the communication frequency of the RFID tag 161 but also the concentration of the electromagnetic wave energy. As a result, the zone overlapping with the dielectric of the RFID tag 161 is subjected to the concentration of overheating by the concentration of the electromagnetic wave energy, which may cause an ignition.

To make clear the position of attachment to goods, the RFID tag 161 of the twelfth embodiment comprises a fold portion 165 and a cover portion 163 extending opposite to the widened portion 7 in the longitudinal direction on the antenna substrate 5. The fold portion 165 and the cover portion 163 are integrally formed with the antenna substrate 5. The fold portion 165 has at its outer edges notches 165a, respectively, extending inward in the width direction. The fold portion 165 has a perforation along the width direction on the antenna substrate 5, with respective ends of the perforation 167 being connected to the notches 165a. A structure easy to fold such as a V-shaped groove may be formed in place of the perforation 167.

The total length of the circumference or the length of the diagonal of the widened portion 7 is designed to be shorter than ¼ wavelength of the wavelength at a specific frequency higher than the communication frequency. For example, in the case of the design shorter than ¼ wavelength of the wavelength at the frequency of the electromagnetic wave heating apparatus (microwave oven), the dimensions of the widened portion 7 are for example 10 mm in the longitudinal length La and 18 mm in the width-direction length Lb.

Although an end side of the widened portion 7 toward the antenna pattern 83 is permitted as the position of attachment to an article, attachment to the article slightly overlapping with the antenna pattern 83 brings about a frequency deviation. Thus, with a safety margin length La2 of 1 mm equal to 10% of the length La, the longitudinal length La1 attached to the article may be remaining 9 mm. A line ML of attachment to an article is a straight line extending along the width direction on the antenna substrate 5 at the position of the length La2 from the end side of the widened portion 7 closer to the antenna pattern 83.

The cover portion 163 is sized such that its end side opposite to the fold portion 165 exactly coincides with the attachment line ML when folded along the perforation 167 so as to cover the antenna pattern 83. A double-sided tape is adhered to the entire surface of the RFID tag 161 so that when the cover portion 163 is folded along the perforation 167, the cover portion 163 adheres onto the antenna pattern 83.

Figure 26:
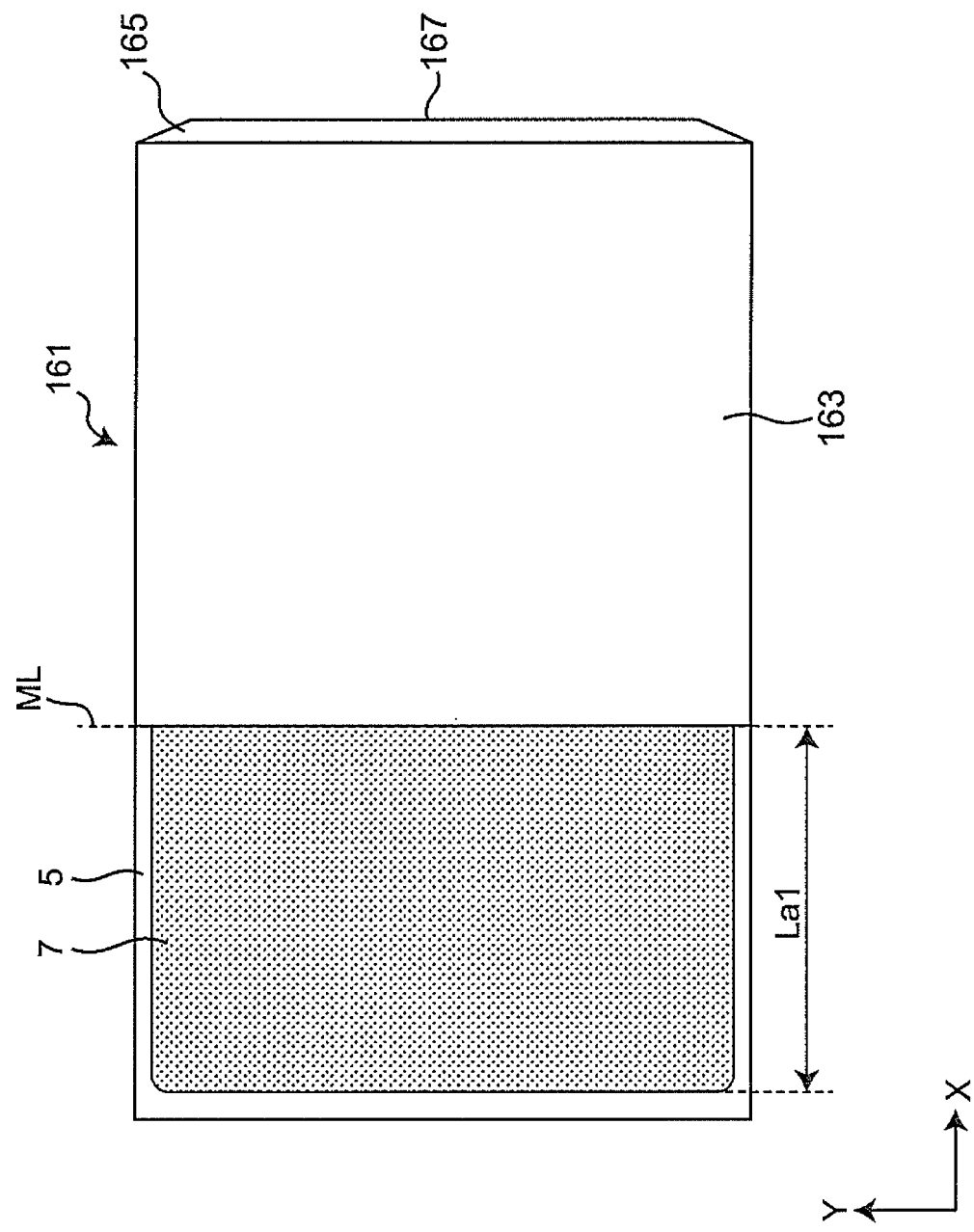
FIG. 26 is a plan view of the wireless communication device (RFID tag) of the twelfth embodiment when attached to an article.
Figure 27:
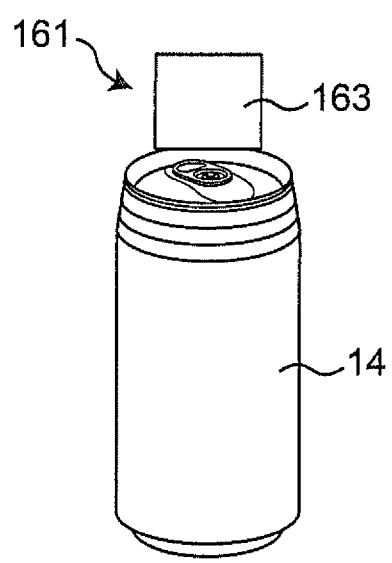
FIG. 27 is a diagram showing an exemplification of the wireless communication device of the twelfth embodiment attached to an article.

FIG. 26 is a plan view of the RFID tag 161 with the cover portion 163 being folded up along the perforation 167. Since the end side of the cover portion 163 registers exactly with the attachment line ML, the region of the length La2 of the widened portion 7 is covered with the cover portion 163 while the region of the length La1 of the widened portion 7 is exposed. As shown in FIG. 27, by adhering the end side of the cover portion 163 to an article such as the metal can 14 for example along its end portion, the RFID tag 161 can be properly attached to the article so as not to cause the frequency deviation.

As described above, the RFID tag 161 may not have the cover portion 163 nor the fold portion 165, provided that the RFID tag 161 has on its back side instructions to simply stick the attachment line ML to the article along the end portion, with an adhesive being applied to the front surface of the RFID tag 161 opposite to the antenna pattern 83 with respect to the attachment line ML. Instead, symbols such as arrows may be used to clearly indicate the attachment at the attachment line ML.

Thirteenth Embodiment

Hereinafter, description will be given of an RFID tag 168 that is a wireless communication device of a thirteenth exemplary embodiment. As regards the RFID tag 168 of the thirteenth embodiment, differences from the RFID tag 81 of the sixth embodiment will mainly be described. In description of the thirteenth embodiment, elements having similar configurations, operations, and functions to those of the sixth embodiment described above are designated by the same reference numerals and, in some cases, may not again be described for avoiding duplicate description.

Figure 32:
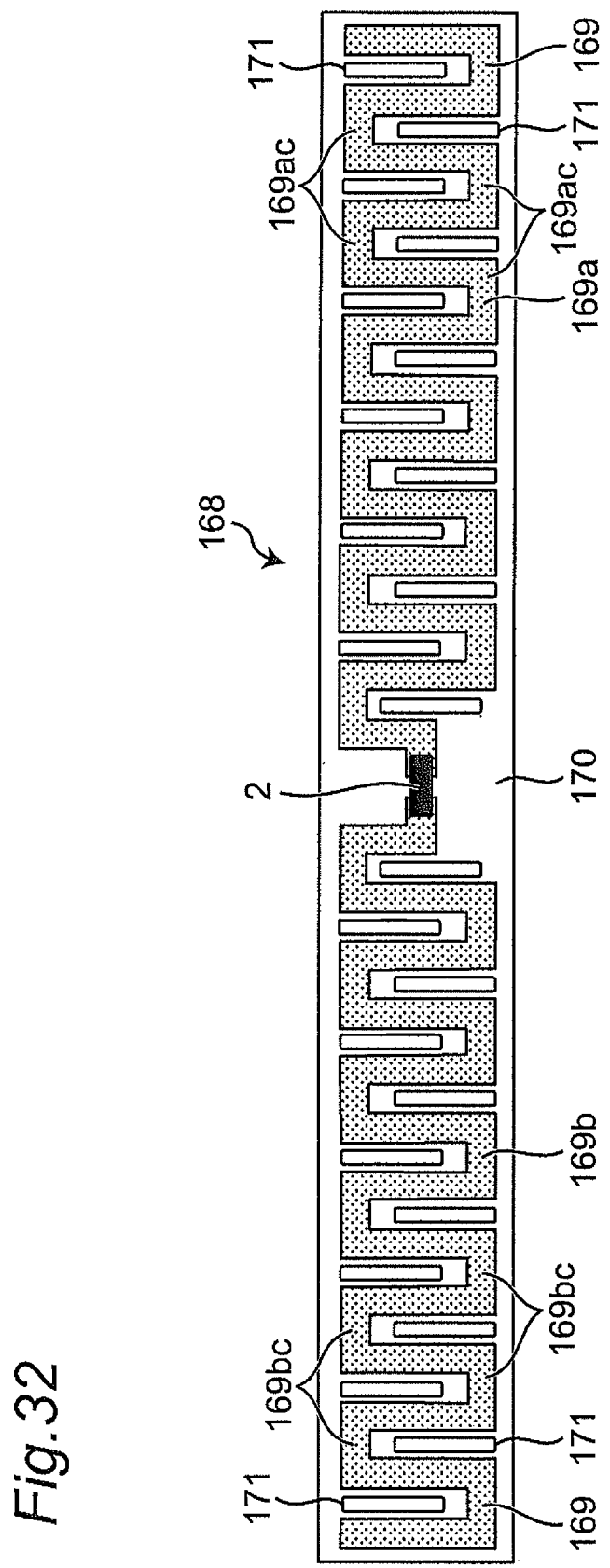
FIG. 32 is a plan view showing a configuration of a wireless communication device (RFID tag) of a thirteenth embodiment.

The RFID tag 168 of the thirteenth embodiment differs greatly from the RFID tag 81 of the sixth embodiment in the shape of a meandering antenna pattern 169. FIG. 32 is a plan view showing a configuration of the RFID tag 168 of the thirteenth embodiment. The RFID tag 168 is configured for wireless communication using a high-frequency signal with a UHF-band communication frequency (carrier frequency) and is configured to be capable of wireless communication in a wide frequency band.

The RFID tag 168 of the thirteenth embodiment has a more elongated shape in plan view as compared with the RFID tag 81 of the sixth embodiment and is mounted at its center with the RFIC package 2. That is, the antenna substrate 170 of the RFID tag 168 is of an elongated shape and comprises an antenna pattern 169 (first antenna element 169*a* and second antenna element 169*b*) on both sides of the RFIC package 2 mounted at the center thereof. The first antenna element 169*a* is formed in a region (right-hand region in FIG. 32) on one hand in the longitudinal direction on the antenna substrate 170 and extends in a meandering manner toward one end in the longitudinal direction. On the other hand, the second antenna element 169*b* is formed in a region (left-hand region in FIG. 32) on the other in the longitudinal direction on the antenna substrate 170 and extends in a meandering manner toward the other end in the longitudinal direction.

In the RFID tag 168 of the thirteenth embodiment, a line-to-line capacitance pattern 171 is disposed to generate a capacitance between adjacent turn portions 169*ac* and between adjacent turn portions 169*bc* in the meandering first antenna element 169*a* and second antenna element 169*b*, respectively. Accordingly, in the RFID tag 168 of the thirteenth embodiment, the turn portions 169*ac* and the turn portions 169*bc* correspond to the confronting portions 83*c* of the RFID tag 81 of the sixth embodiment. In this manner, in the RFID tag 168 of the thirteenth embodiment, the plurality of LC parallel resonant circuits S are formed along the respective paths of the first antenna element 169*a* and second antenna element 169*b* having an inductance component, these LC parallel resonant circuits S making up the "band elimination filter". Each LC parallel resonant circuit S in the plurality of LC parallel resonant circuits S in the thirteenth embodiment is also set so as to resonate with frequencies in the frequency band of 2.4 to 2.5 GHz used in the "microwave oven". The line length of each LC parallel resonant circuit S is set to be shorter than ½ frequency ($\lambda/2$) of the frequency band of frequencies (2.4 to 2.5 GHz) of the heating electromagnetic wave.

The RFID tag 168 of the thirteenth embodiment can have a simple configuration like a small tape with narrow width, enabling a low-price, easy-to-handle wireless communication device to be constructed.

Figure 33:
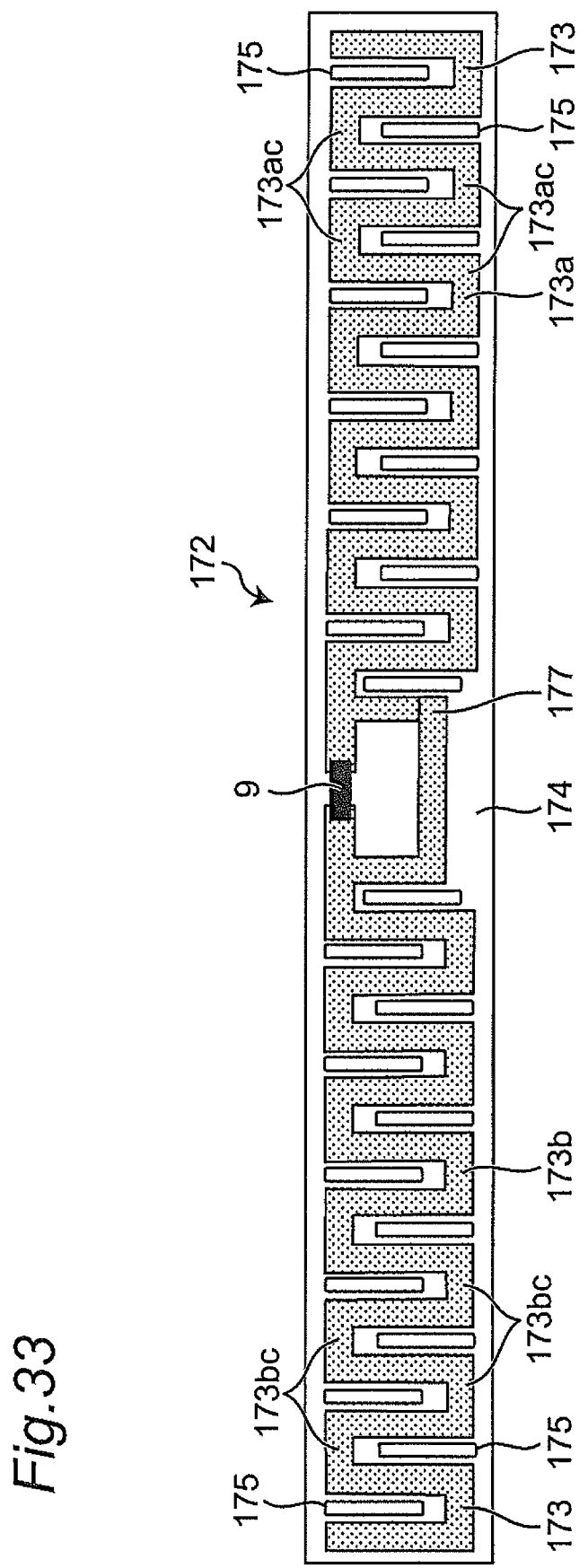
FIG. 33 is a plan view showing a variant of the wireless communication device of the thirteenth embodiment.

FIG. 33 shows a variant of the thirteenth embodiment and is a plan view showing a configuration of an RFID tag 172 having the RFIC chip 9 mounted on an antenna pattern 173. The RFID tag 172 is configured for wireless communication using a high-frequency signal with a UHF-band communication frequency (carrier frequency) and is configured to be capable of wireless communication in a wide frequency band. The RFID tag 172 shown in FIG. 33 has a configuration similar to that of the RFID tag 168 shown in FIG. 32 except that the RFIC chip 9 is mounted on the antenna pattern 173 having a loop portion 177. Specifically, an antenna substrate 174 of the RFID tag 172 is of an elongated shape and comprises the antenna pattern 173 (first antenna element 173*a* and second antenna element 173*b*) on both sides of the loop portion 177 formed at the center of the antenna substrate 174. In the RFID tag 172, a line-to-line capacitance pattern 175 is disposed to generate a capacitance between adjacent turn portions 173*ac* and between adjacent turn portions 173*bc* in the meandering first antenna element 173*a* and second antenna element 173*b*, respectively. In the RFID tag 172 as well, the plurality of LC parallel resonant circuits S are formed along the respective paths of the first antenna element 173*a* and second antenna element 173*b* having an inductance component, these LC parallel resonant circuits S making up the "band elimination filter".

Each LC parallel resonant circuit S of the plurality of LC parallel resonant circuits S in the RFID tag 172 shown in FIG. 33 is also set so as to resonate with frequencies in the frequency band of 2.4 to 2.5 GHz used in the "microwave oven", with the line length of each LC parallel resonant circuit S being set to be shorter than ½ frequency ($\lambda/2$) of the frequency band of the heating electromagnetic wave (2.4 to 2.5 GHz).

Thus, the RFID tag 172 shown in FIG. 33, similar to the RFID tag 41, has a tape-like shape with narrow width, providing an easy-to-handle wireless communication device that is not visually offensive to the purchaser in the merchandise display.

As described above, the RFID tags 168 and 172 in the thirteenth embodiment provide an easy-to-handle wireless communication device that does not become an obstacle to merchandise display, having a high safety and reliability because of preventing the risk of ignition in the RFID tags 168 and 172 even in the case where goods with the RFID tags 168 and 172 are dielectrically heated in the electromagnetic wave heating apparatus (microwave oven).

The RFID tags 168 and 172 described in the thirteenth embodiment have corner portions of a curved-surface shape for suppressing the concentration of electric field on the antenna patterns 169 and 173 and the line-to-line capacitance pattern 171 and 175.

Fourteenth Embodiment

Hereinafter, description will be given of an RFID tag 181 that is a wireless communication device of a fourteenth exemplary embodiment. As regards the RFID tag 181 of the fourteenth embodiment, differences from the RFID tag 81 of the sixth embodiment will mainly be described. In description of the fourteenth embodiment, elements having similar configurations, operations, and functions to those of the sixth embodiment described above are designated by the same reference numerals and, in some cases, may not again be described for avoiding duplicate description.

Figure 34A:
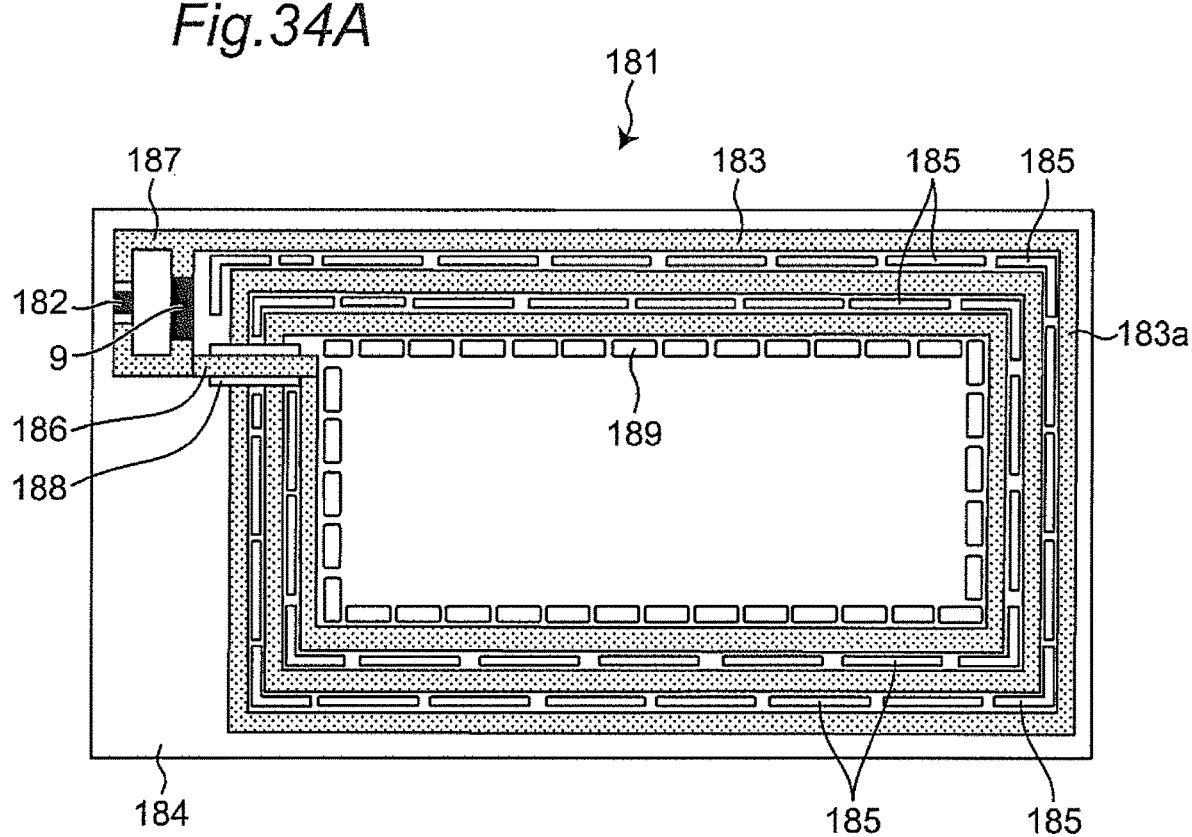
FIG. 34A is a plan view of a wireless communication device (RFID tag) of a fourteenth embodiment when attached to an article.
Figure 34B:
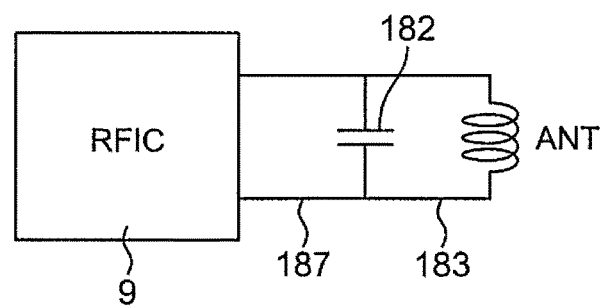
FIG. 34B is an equivalent circuit diagram showing an antenna pattern configuration in the wireless communication device of the fourteenth embodiment.

FIG. 34A is a plan view showing a configuration of the RFID tag 181 of the fourteenth embodiment. The RFID tag 181 is configured for wireless communication using a high-frequency signal with an HF-band communication frequency (carrier frequency) and is capable of wireless communication in a wide frequency band. FIG. 34B is a diagram showing, in the form of an equivalent circuit, the configuration of an antenna pattern (coil pattern) 183 in the RFID tag 181 of the fourteenth embodiment. As used herein, the HF band refers to a frequency band of 13 MHz or more and 15 MHz or less.

As shown in FIG. 34A, the RFID tag 181 comprises an antenna pattern 183 having a matching circuit of a loop portion 187 provided with the RFIC chip 9 and a capacitor element 182. In the matching circuit of the loop portion 187, the capacitor element 182 is connected at a position facing the RFIC chip 9. An antenna element 183*a* of the antenna pattern 183 in the RFID tag 181 extends from the loop portion 187 and is formed spirally. The antenna element 183*a* shown in FIG. 34A is led in a clockwise inner winding manner from the loop portion 187. A tip as a leading end of the antenna element 183*a* is directly connected via a bridge pattern 186 to the matching circuit of the loop portion 187. An insulating pattern 188 made of a heat-resistant electrically-insulating material is disposed between the bridge pattern 186 and the antenna pattern 183 so as to secure the insulation between the bridge pattern 186 and the antenna pattern 183.

In the spiral antenna element 183*a* led from the matching circuit of the loop portion 187A, a plurality of line-to-line capacitance patterns 185 generating a capacitance between adjacent paths is disposed at predetermined intervals along the path of the spiral antenna element 183*a*.

A looped shield pattern 189 is formed inside the antenna element 183*a*. The shield pattern 189 is made of a conductive material such as aluminum foil or copper foil, similar to the antenna pattern 183. The shield pattern 189 is in the shape of a completely closed loop, but it may be a partly interrupted shield pattern.

As described above, in the RFID tag 181 of the fourteenth embodiment, the plurality of LC parallel resonant circuits S are formed along the path of the antenna element 183*a* having an inductance component, these LC parallel resonant circuits S making up the "band elimination filter". Each LC parallel resonant circuit S of the plurality of LC parallel resonant circuits S in the RFID tag 181 is also set so as to resonate with frequencies in the frequency band of 2.4 to 2.5 GHz used in the "microwave oven", with line length of each LC parallel resonant circuit S being set to be shorter than ½ frequency (λ/2) of the frequency band of the heating electromagnetic wave (2.4 to 2.5 GHz).

The RFID tag 181 of the fourteenth embodiment is configured such that the antenna pattern 183 and the line-to-line capacitance pattern 185 are laminated on the surface of the antenna substrate 184. On the surface of the antenna substrate 184, the bridge pattern 186 is formed via the insulating pattern 188 on the antenna pattern 183, to make up the antenna of the RFID tag 181. Thus, the plurality of patterns (183, 185, and 186) are formed on the same surface of the antenna substrate 184, providing a configuration easy to manufacture the RFID tag 181. In the RFID tag 181 of the fourteenth embodiment, the antenna substrate 184 may not be made of a dielectric, and it may be made of a paper material for example.

As described in the sixth embodiment referring to FIG. 19C, the RFID tag 181 of the fourteenth embodiment also has a circuit configuration capable of remarkable attenuation for frequencies in the band of heating frequency (2.4 to 2.5 GHz) by the "band elimination filter" composed of the plurality of LC parallel resonant circuits S. Accordingly, the RFID tag 181 as a wireless communication device of the fourteenth embodiment is configured to be capable of wireless communication using a high-frequency signal having a HF-band communication frequency (carrier frequency) and is configured to be able to greatly suppress the occurrence of discharge in the RFID tag 181 even when an article with the RFID tag 181 is dielectrically heated in the electromagnetic wave heating apparatus (microwave oven), thereby making it possible to securely prevent the risk of ignition in the article.

Fifteenth Embodiment

Hereinafter, description will be given of an RFID tag 191 that is a wireless communication device of a fifteenth exemplary embodiment. As regards the RFID tag 191 of the fifteenth embodiment, differences from the RFID tag 81 of the sixth embodiment will mainly be described. In description of the fifteenth embodiment, elements having similar configurations, operations, and functions to those of the sixth embodiment described above are designated by the same reference numerals and, in some cases, may not again be described for avoiding duplicate description.

Figure 35A:
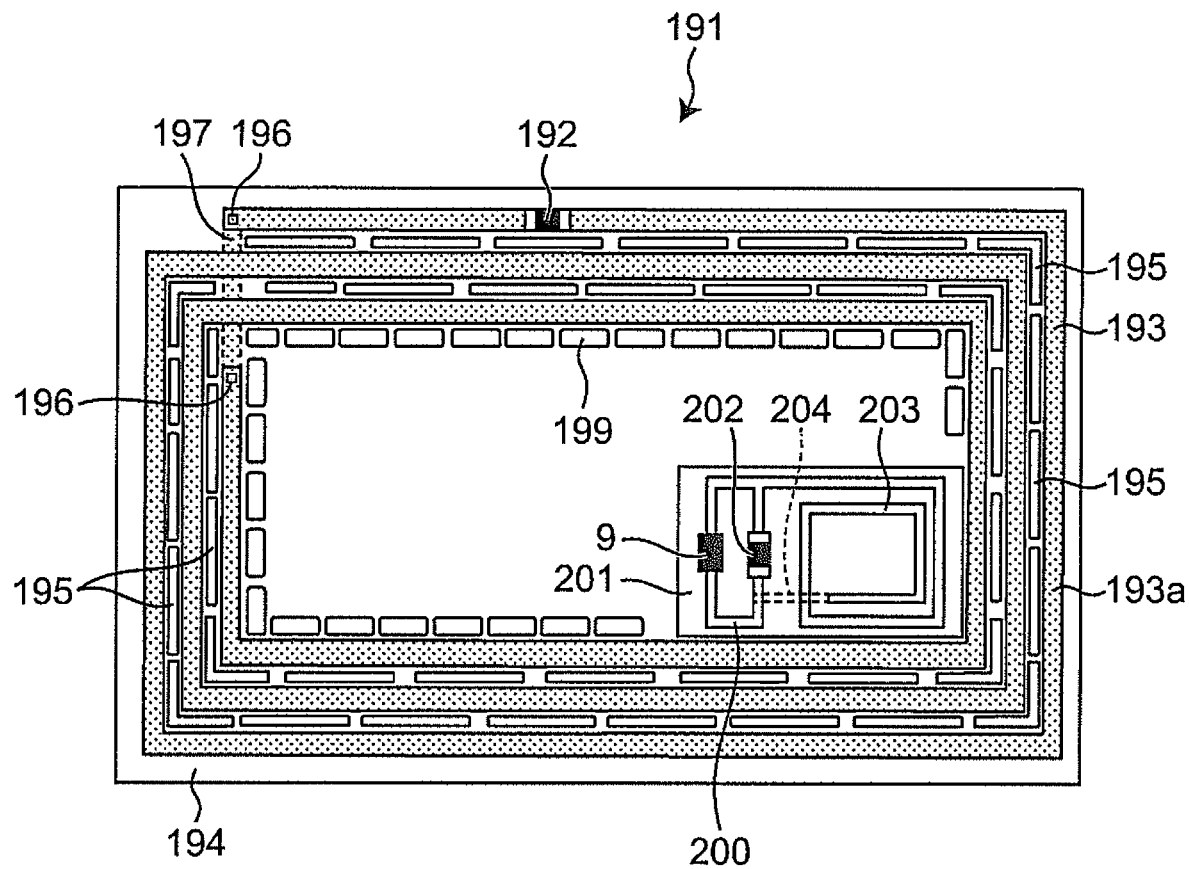
FIG. 35A is a plan view of a wireless communication device (RFID tag) of a fifteenth embodiment when attached to an article.
Figure 35B:
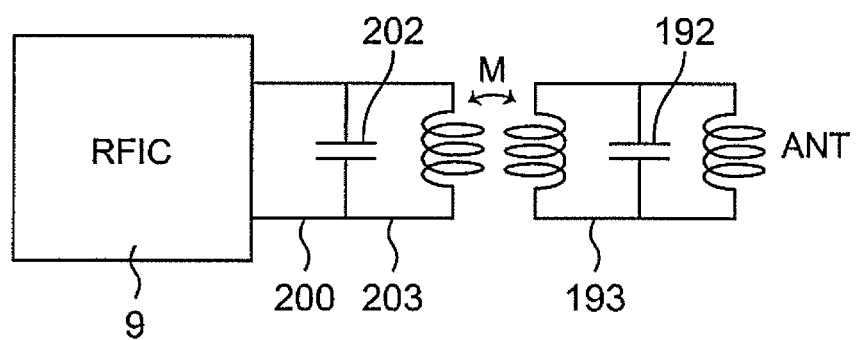
FIG. 35B is an equivalent circuit diagram showing an antenna pattern configuration in the wireless communication device of the fifteenth embodiment.

FIG. 35A is a plan view showing a configuration of the RFID tag 191 of the fifteenth embodiment. The RFID tag 191 is configured for wireless communication using a high-frequency signal with an HF-band communication frequency (carrier frequency) and is capable of wireless communication in a wide frequency band. FIG. 35B is a diagram showing, in the form of an equivalent circuit, the configuration of two coil patterns (193 and 203) including an antenna pattern in the RFID tag 191 of the fifteenth embodiment.

As shown in FIG. 35A, the RFID tag 191 of the fifteenth embodiment comprises a resonant booster circuit having the two coil patterns (193 and 203). The coil pattern (primary coil pattern) 203 on one hand of the RFID tag 191 has a matching circuit of a loop portion 200 provided with the RFIC chip 9 and a capacitor element 202. In the matching circuit of the loop portion 200, the RFIC chip 9 is connected at a position facing the capacitor element 202. The coil pattern (primary coil pattern) 203 is led spirally from the loop portion 200, with a tip as a leading end thereof being directly connected via a bridge pattern 204 to the matching circuit of the loop portion 200. The coil pattern (primary coil pattern) 203 is led in a clockwise inner winding manner from the loop portion 200.

The bridge pattern 204 may be formed on the back surface (second main surface) of the antenna substrate 194 so that the tip as the leading end of the coil pattern (primary coil pattern) 203 is connected to the loop portion 200 via an interlayer connection conductor extending through the antenna substrate 194. Otherwise, in the case where the bridge pattern 204 is formed on the front surface of the antenna substrate 194, an insulating pattern made of a heat-resistant electrically-insulating material may be disposed between the bridge pattern 204 and the primary coil pattern 203 to thereby secure the insulation between the bridge pattern 204 and the primary coil pattern 203.

The antenna pattern 193 as the other coil pattern (secondary coil pattern) in the RFID tag 191 of the fifteenth embodiment is formed so as to surround the coil pattern (primary coil pattern) 203 to configure an antenna element 193*a* formed in a clockwise inner winding manner. In the spiral antenna element 193*a* of the antenna pattern 193, a plurality of line-to-line capacitance patterns 195 generating a capacitance between the adjacent paths are disposed at predetermined intervals along the path of the antenna element 193*a*.

The antenna pattern 193 and the line-to-line capacitance pattern 195 in the RFID tag 191 of the fifteenth embodiment are formed on the front surface of the antenna substrate 194. A capacitor element 192 is disposed on the antenna element 193*a* of the antenna pattern 193. An outer end and an inner end of the spiral antenna element 193*a* are electrically connected directly to each other, via an interlayer connection conductor 196 extending through the antenna substrate 194, by a conductive path pattern 197 formed on the back surface of the antenna substrate 194.

A looped shield pattern 199 is formed inside the antenna element 183*a*. The shield pattern 199 is made of a conductive material such as aluminum foil or copper foil, similar to the antenna pattern 193. The shield pattern 199 is in the shape of a completely closed loop, but it may be a partly interrupted shield pattern.

As described above, in the RFID tag 191 of the fifteenth embodiment, the plurality of LC parallel resonant circuits S are formed along the path of the antenna element 193a in the antenna pattern 193 having an inductance component, these LC parallel resonant circuits S making up the "band elimination filter". Each LC parallel resonant circuit S of the plurality of LC parallel resonant circuits S in the RFID tag 191 is also set so as to resonate with frequencies in the frequency band of 2.4 to 2.5 GHz used in the "microwave oven". The line length of each LC parallel resonant circuit S is set to be shorter than ½ frequency ($\lambda/2$) of the frequency band of the heating electromagnetic wave (2.4 to 2.5 GHz).

Thus, the configured RFID tag 191 of the fifteenth embodiment has a circuit configuration capable of remarkable attenuation for frequencies in the band of heating frequency (2.4 to 2.5 GHz) by the "band elimination filter" composed of the plurality of LC parallel resonant circuits S. Accordingly, the RFID tag 191 of the fifteenth embodiment is configured to be capable of wireless communication using a high-frequency signal having a HF-band communication frequency (carrier frequency) and is configured to be able to greatly suppress the occurrence of discharge in the RFID tag 191 even when an article with the RFID tag 191 is dielectrically heated in the electromagnetic wave heating apparatus (microwave oven), thereby making it possible to securely prevent the risk of ignition in the article.

Sixteenth Embodiment

Hereinafter, description will be given of an RFID tag 211 that is a wireless communication device of a sixteenth exemplary embodiment. As regards the RFID tag 211 of the sixteenth embodiment, differences from the RFID tag 1 of the first embodiment will mainly be described. In description of the sixteenth embodiment, elements having similar configurations, operations, and functions to those of the first embodiment described above are designated by the same reference numerals and, in some cases, may not again be described for avoiding duplicate description.

Figure 36:
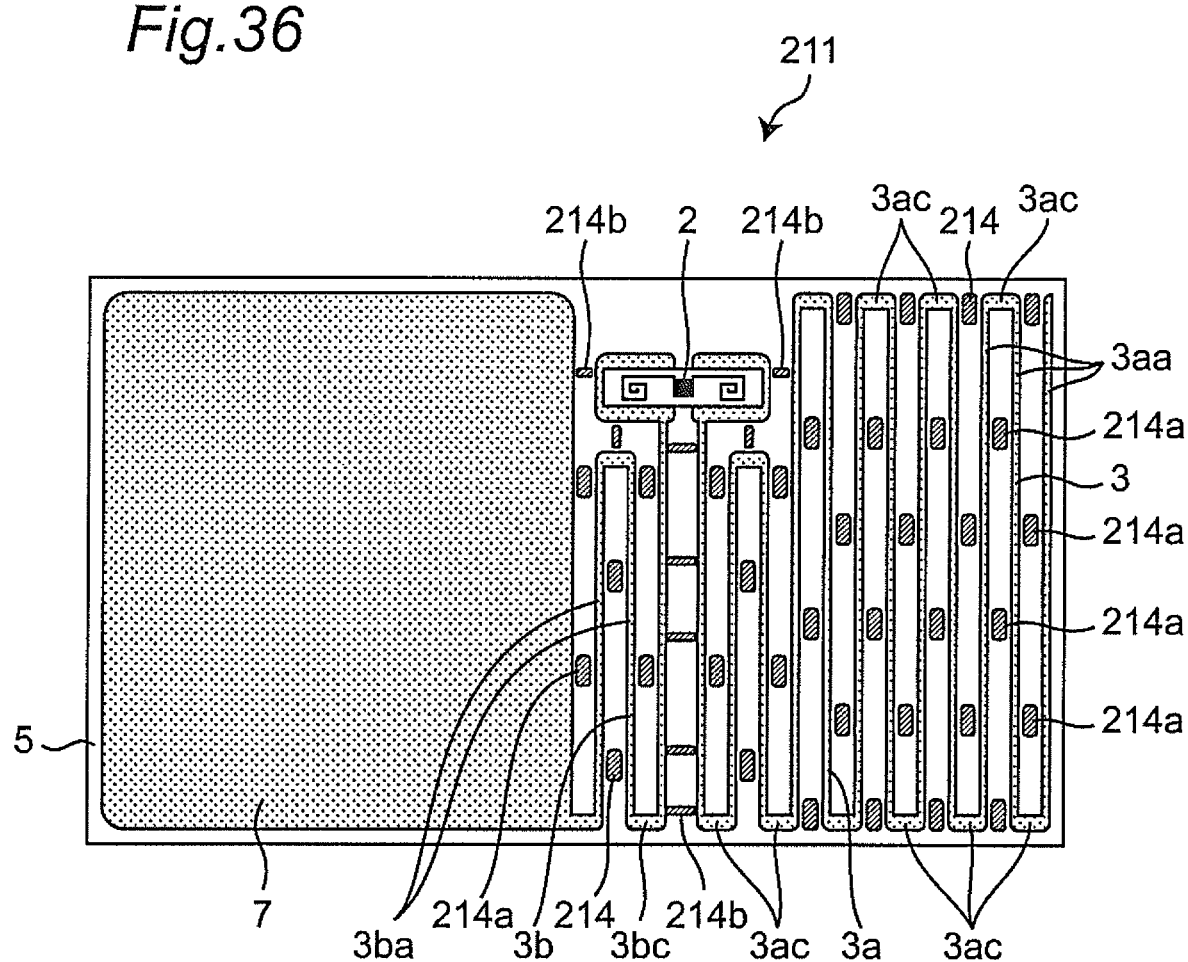
FIG. 36 is a plan view showing a wireless communication device (RFID tag) of a sixteenth embodiment.

The RFID tag 211 of the sixteenth embodiment differs from the RFID tag 1 of the first embodiment in that a line-to-line capacitance pattern 214 acting as a capacitive coupling portion is formed on the same surface (front surface) as the antenna pattern 3, with the other configurations being substantially the same as those of RFID tag 1 of the first embodiment. FIG. 36 is a plan view showing a configuration of the RFID tag 211 of the sixteenth embodiment.

The line-to-line capacitance pattern 214 includes first line-to-line capacitance electrodes 214a of widened plate shape and second line-to-line capacitance electrodes 214b of a narrowed plate shape. The first line-to-line capacitance electrodes 214a of the widened plate shape capacitively couple specific confronting regions in the meandering first antenna element 3a to each other and, similarly, capacitively couple specific confronting regions 3ba in the meandering second antenna element 3b with each other. The first line-to-line capacitance electrodes 214a are arranged to capacitively couple at least adjacent turn portions 3ac and adjacent turn portions 3bc, respectively, in the first antenna element 3a and the second antenna element 3b, respectively.

On the other hand, the second line-to-line capacitance electrodes 214b of the narrowed plate shape are disposed to capacitively couple a specific region of the first antenna element 3a and a specific region of the second antenna element 3b. The second line-to-line capacitance electrodes 214b of the narrowed plate shape are disposed to capacitively couple the first land pattern 6a and a specific region of the first antenna element 3a and is disposed to capacitively couple the second land pattern 6b and a specific region (including the widened portion 7) of the second antenna element 3b.

The first line-to-line capacitance electrodes 214a capacitively couple respective confronting regions 3aa facing each other in the first antenna element 3a, to form a loop circuit composed of the first line-to-line capacitance electrodes 214a and a part of the first antenna element 3a. This loop circuit is the electric parallel resonant circuit S. The second line-to-line capacitance electrodes 214b capacitively couple respective confronting regions 3ba facing each other in the second antenna element 3b, to form a loop circuit composed of the second line-to-line capacitance electrodes 214b and a part of the second antenna element 3b. This loop circuit forms the electric parallel resonant circuit S.

Each LC parallel resonant circuit S in the plurality of LC parallel resonant circuits S is set so as to resonate with frequencies in the frequency band of 2.4 to 2.5 GHz, with the line length of each LC parallel resonant circuit S being set to be shorter than ½ frequency of the frequency used as the predetermined communication frequency and further to be shorter than ½ wavelength ($\lambda/2$) of the frequency band of the heating electromagnetic wave (2.4 to 2.5 GHz).

As described above, the RFID tags 211 of the sixteenth embodiment provides a wireless communication device having a high safety and reliability because of preventing the risk of ignition in the RFID tag 211 even in the case where goods with the RFID tags 211 are dielectrically heated in the electromagnetic wave heating apparatus (microwave oven).

The present invention can variously be modified as follows without being limited to the above embodiments.

(1) Although in the first exemplary embodiment the confronting regions of the first antenna element 83a are rectilinear portions 83aa, this is not limitative. For example, if the first antenna element 83a is curvilinearly formed, the line-to-line capacitance patterns 85 may be arranged between curved antenna patterns facing each other. Even though the confronting regions of the first antenna element 83a are the rectilinear portions 83aa, each rectilinear portion 83aa may not be parallel with the other such that one rectilinear portion 83aa is tilted with respect to the other rectilinear portion 83aa.

(2) In the conductor patterns such as the antenna pattern and the line-to-line capacitance patterns in the RFID tag of the exemplary embodiments, their corner portions, etc. are formed from a smooth curved surface for suppressing the concentration of electric field.

Although the exemplary embodiments of the present disclosure have been described with a certain degree of detail in the embodiments, it is to be construed that the contents of disclosure of these embodiments could naturally be changed in the details of the configuration and that the combinations of elements and changes of order in the embodiments could be implemented without departing from the scope and thought of the claimed invention.

The present invention provides a product having a high versatility and usefulness as a wireless communication device attached to merchandise and especially needed for implementation of "unmanned convenience stores".

EXPLANATIONS OF LETTERS OR NUMERALS

1 RFID tag
2 RFIC package 3 antenna pattern
3a first antenna element
3b second antenna element
4 line-to-line capacitance pattern (capacitive coupling portion)
4a first line-to-line capacitance electrode (widened shape)
4b second line-to-line capacitance electrode (narrowed shape)
5 antenna substrate
6 land pattern
6a first land pattern
6b second land pattern
7 widened portion
8 lunch box
9 RFIC chip
10 inductance element
11 external connection terminal
11a first external connection terminal
11b second external connection terminal
12 insulating sheet
13 through-hole
14 metal can
81 RFID tag
83 antenna pattern
83a first antenna element
83ab extended portion
83b second antenna element
83c confronting portion
83d second antenna element
85 line-to-line capacitance pattern
85a line-to-line capacitance pattern
85b line-to-line capacitance pattern
85c line-to-line capacitance pattern
85d line-to-line capacitance pattern
87 shield pattern
87a first shield pattern
91 RFID tag
111 RFID tag
141 RFID tag
143 antenna pattern
151 RFID tag
153 antenna substrate
155 base substrate
161 RFID tag
163 cover portion
164 antenna substrate
165 fold portion
165a notch
167 perforation
168 RFID tag
169 antenna pattern
169a first antenna element
169b second antenna element
170 antenna substrate
171 line-to-line capacitance pattern
172 RFID tag
173 antenna pattern
173a antenna element
174 antenna substrate
175 line-to-line capacitance pattern
177 loop portion
181 RFID tag
182 capacitor element
183 antenna pattern
183a antenna element
184 antenna substrate
185 line-to-line capacitance pattern
186 bridge pattern
187 loop portion
188 insulating pattern
189 shield pattern
191 RFID tag
192 capacitor element
193 antenna pattern
193a antenna element
194 antenna substrate
195 line-to-line capacitance pattern
196 interlayer connection conductor
197 conductive path pattern
198 insulating pattern
199 shield pattern
200 loop portion
202 capacitor element
203 coil pattern
204 bridge pattern
211 RFID tag
214 line-to-line capacitance pattern
214a first line-to-line capacitance electrode
214b second line-to-line capacitance electrode

The invention claimed is:

1. A wireless communication device for transmitting/receiving a high-frequency signal having a predetermined communication frequency, the wireless communication device comprising:
   an antenna pattern having an inductance component;
   an RFIC element connected electrically to the antenna pattern; and
   a capacitance pattern configured to capacitively couple confronting regions at a plurality of points of the antenna pattern that face each other, such that the capacitance pattern and the confronting regions of the antenna pattern form an LC parallel resonant circuit.

2. The wireless communication device of claim 1,
   wherein the antenna pattern comprises a meandering shape having a plurality of turn portions, and
   wherein the capacitance pattern is configured to capacitively couple adjacent turn portions of the antenna pattern, respectively.

3. The wireless communication device of claim 1,
   wherein the antenna pattern is disposed on a first surface of an antenna substrate comprising a dielectric, and
   wherein the capacitance pattern is disposed on a second other surface of the antenna substrate that opposes the first surface.

4. The wireless communication device of claim 1,
   wherein the antenna pattern and the capacitance pattern are disposed on a first surface of an antenna substrate, and
   wherein the capacitance pattern comprises a conductor plate disposed between the respective confronting portions of the antenna pattern that face each other.

5. The wireless communication device of claim 4,
   wherein the antenna pattern and the capacitance pattern are laminated via a dielectric on the first surface of the antenna substrate.

6. The wireless communication device of claim 1,
   wherein the LC parallel resonant circuit comprises a line length that is shorter than ½ wavelength of the predetermined communication frequency.

7. The wireless communication device of claim 6,
   wherein the line length of the LC parallel resonant circuit is shorter than ½ wavelength of a frequency used in electromagnetic wave heating.

8. The wireless communication device of claim 1, wherein the antenna pattern has a line width that is narrower than a line width of the capacitance pattern.

9. The wireless communication device of claim 1,
wherein the antenna pattern comprises a meandering shape having a plurality of turn portions, and
wherein, in an amplitude direction of the meandering shape, a length of the antenna pattern is longer than a length of the capacitance pattern.

10. The wireless communication device of claim 1, further comprising a resin antenna substrate with the antenna pattern formed thereon.

11. The wireless communication device of claim 10, further comprising a film disposed on the resin antenna substrate, wherein the film has a heat resistance higher than that of the resin antenna substrate.

12. The wireless communication device of claim 1, wherein the antenna pattern is configured from a dipole antenna having two dipole elements, and the capacitance pattern is disposed on each of the two dipole elements.

13. The wireless communication device of claim 1, wherein the antenna pattern is configured for data communication using a communication frequency in a UHF band.

14. The wireless communication device of claim 1, wherein the antenna pattern is configured for data communication using a communication frequency in an HF band.

15. The wireless communication device of claim 1, wherein the antenna pattern comprises a resonant frequency in the absence of the capacitance pattern that is higher than the communication frequency.

16. The wireless communication device of claim 1, wherein the antenna pattern includes a land pattern that is capacitively coupled with the RFIC element.

17. A wireless communication device for transmitting/receiving a high-frequency signal having a predetermined communication frequency, the wireless communication device comprising:
an antenna pattern having an inductance component;
an RFIC element connected electrically to the antenna pattern; and
a capacitance pattern including a plurality of capacitance electrodes that are configured to capacitively couple confronting regions at a plurality of points of the antenna pattern that face each other, such that the capacitance pattern and the confronting regions of the antenna pattern form an LC parallel resonant circuit.

18. The wireless communication device of claim 17, wherein the LC parallel resonant circuit uses a resonant frequency that is higher than the predetermined communication frequency.

19. A wireless communication device for transmitting/receiving a high-frequency signal having a communication frequency, the wireless communication device comprising:
an antenna pattern having a plurality of confronting regions facing each other,
an RFIC element connected electrically to the antenna pattern; and
a plurality of looped conductor patterns disposed between each pair of the confronting regions of the antenna pattern,
wherein the plurality of the conductor patterns are spaced apart from each other between respective pairs of the confronting regions of the antenna pattern.

20. The wireless communication device of claim 17,
wherein the antenna pattern comprises a meandering shape having a plurality of turn portions, and
wherein the capacitance pattern is configured to capacitively couple adjacent turn portions of the antenna pattern, respectively.

* * * * *